(12) United States Patent
Cruce et al.

(10) Patent No.: US 10,711,090 B2
(45) Date of Patent: *Jul. 14, 2020

(54) THERMAL INSULATION

(71) Applicant: MATERIA, INC., Pasadena, CA (US)

(72) Inventors: Christopher J. Cruce, Poway, CA (US); Michael A. Giardello, Pasadena, CA (US); Brian L. Conley, Santa Monica, CA (US); Anthony R. Stephen, South Pasadena, CA (US)

(73) Assignee: MATERIA, INC., Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/122,860

(22) PCT Filed: Dec. 23, 2014

(86) PCT No.: PCT/US2014/072198
§ 371 (c)(1),
(2) Date: Aug. 31, 2016

(87) PCT Pub. No.: WO2015/134095
PCT Pub. Date: Sep. 11, 2015

(65) Prior Publication Data
US 2017/0066869 A1  Mar. 9, 2017

Related U.S. Application Data

(63) Continuation-in-part of application No. PCT/US2014/043968, filed on Jun. 24, 2014.
(Continued)

(51) Int. Cl.
*C08G 61/02* (2006.01)
*F16L 59/20* (2006.01)
(Continued)

(52) U.S. Cl.
CPC .............. *C08G 61/02* (2013.01); *B05D 7/222* (2013.01); *C08G 61/08* (2013.01); *C08L 65/00* (2013.01);
(Continued)

(58) Field of Classification Search
CPC ........ C08G 61/02; C08G 61/08; B05D 7/222; C08L 65/00; F16L 59/20; F16L 58/1054; F16L 59/14; F16L 59/028; C09D 165/00
See application file for complete search history.

(56) References Cited

U.S. PATENT DOCUMENTS 4,899,005 A  2/1990  Lane et al.
5,138,003 A  8/1992  Okumura et al.
(Continued)

FOREIGN PATENT DOCUMENTS

CN  103159914 A  6/2013
EP  0654632 B1  7/1998
(Continued)

OTHER PUBLICATIONS

Theodora W. Greene & Peter G. M. Wuts, "Protective Groups in Organic Synthesis," Second Edition, John Wiley & Sons, Inc., 1991.
(Continued)

*Primary Examiner* — John E Uselding
(74) *Attorney, Agent, or Firm* — J.A. Lindeman & Co. PLLC

(57) ABSTRACT

The present invention is directed to addressing one or more of the aforementioned concerns and relates to thermal insulation materials and thermal insulation material compositions and methods for thermally insulating pipelines and associated equipment, structures, and objects used in offshore drilling. The present invention is directed to articles of manufacture comprising the thermal insulation materials and/or thermal insulation material compositions of the
(Continued)

invention. More particularly the present invention relates to the use of ring opening metathesis polymerization polymers (ROMP polymers) and/or ROMP polymer composites for thermally insulating pipelines and associated equipment, structures, and objects used in offshore oil drilling.

20 Claims, 3 Drawing Sheets

Related U.S. Application Data

(60) Provisional application No. 61/948,196, filed on Mar. 5, 2014, provisional application No. 61/838,824, filed on Jun. 24, 2013, provisional application No. 61/948,196, filed on Mar. 5, 2014.

(51) Int. Cl.
| | |
|---|---|
| *C08G 61/08* | (2006.01) |
| *C08L 65/00* | (2006.01) |
| *F16L 58/10* | (2006.01) |
| *C09D 165/00* | (2006.01) |
| *B05D 7/22* | (2006.01) |
| *F16L 59/14* | (2006.01) |
| *F16L 59/02* | (2006.01) |
| *F16L 58/18* | (2006.01) |

(52) U.S. Cl.
CPC ........ *C09D 165/00* (2013.01); *F16L 58/1054* (2013.01); *F16L 59/028* (2013.01); *F16L 59/14* (2013.01); *F16L 59/20* (2013.01); *C08G 2261/122* (2013.01); *C08G 2261/135* (2013.01); *C08G 2261/1412* (2013.01); *C08G 2261/3324* (2013.01); *C08G 2261/3325* (2013.01); *C08G 2261/418* (2013.01); *C08G 2261/58* (2013.01); *C08G 2261/592* (2013.01); *C08G 2261/596* (2013.01); *C08G 2261/62* (2013.01); *C08G 2261/76* (2013.01); *C08G 2261/90* (2013.01); *F16L 58/181* (2013.01); *F16L 59/143* (2013.01)

(56) References Cited

U.S. PATENT DOCUMENTS

| | | |
|---|---|---|
| 5,312,940 A | 5/1994 | Grubbs et al. |
| 5,342,909 A | 8/1994 | Grubbs et al. |
| 5,900,195 A | 5/1999 | Pool et al. |
| 5,939,504 A | 8/1999 | Woodson, Jr. et al. |
| 5,977,393 A | 11/1999 | Grubbs et al. |
| 6,284,852 B1 | 9/2001 | Lynn et al. |
| 6,436,476 B1 | 8/2002 | Sage, Jr. |
| 6,486,279 B2 | 11/2002 | Lynn et al. |
| 6,552,139 B1 | 4/2003 | Herrmann et al. |
| 6,613,910 B2 | 9/2003 | Grubbs et al. |
| 6,620,955 B1 | 9/2003 | Pederson et al. |
| 6,635,768 B1 | 10/2003 | Herrmann et al. |
| 6,787,620 B2 | 9/2004 | Herrmann et al. |
| 6,800,170 B2 | 10/2004 | Kendall et al. |
| 6,838,489 B2 | 1/2005 | Bell et al. |
| 6,841,212 B2 | 1/2005 | Bicakci-Jenkins et al. |
| 6,890,650 B2 | 5/2005 | Redden |
| 6,908,970 B2 | 6/2005 | Tsunogae et al. |
| 6,921,735 B2 | 7/2005 | Hoveyda et al. |
| 7,026,495 B1 | 4/2006 | Pederson et al. |
| 7,294,717 B2 | 11/2007 | Herrmann et al. |
| 7,378,528 B2 | 5/2008 | Herrmann et al. |
| 7,652,145 B2 | 1/2010 | Herrmann et al. |
| 7,671,224 B2 | 3/2010 | Winde et al. |
| 7,687,635 B2 | 3/2010 | Verpoort et al. |
| 8,722,828 B2 | 5/2014 | Sugawara |
| 9,046,195 B2 | 6/2015 | Hoffmann |
| 2003/0055262 A1 | 3/2003 | Grubbs et al. |
| 2007/0037946 A1 | 2/2007 | Sugawara |
| 2007/0043188 A1 | 2/2007 | Schaubroeck et al. |
| 2007/0060730 A1 | 3/2007 | Jang et al. |
| 2007/0185343 A1 | 8/2007 | Verpoort et al. |
| 2008/0079260 A1 | 4/2008 | Duncan |
| 2008/0136169 A1 | 6/2008 | Duncan |
| 2008/0293905 A9 | 11/2008 | Schaubroeck et al. |
| 2010/0174068 A1 | 7/2010 | Grela et al. |
| 2012/0058332 A1 | 3/2012 | Muller et al. |
| 2014/0035186 A1 | 2/2014 | Recher et al. |
| 2014/0311606 A1 | 10/2014 | Beris et al. |
| 2015/0101698 A1 | 4/2015 | Boyd et al. |
| 2015/0114509 A1 | 4/2015 | Hoffmann |

FOREIGN PATENT DOCUMENTS

| | | |
|---|---|---|
| EP | 0271007 B2 | 3/2000 |
| EP | 1699611 B1 | 1/2008 |
| EP | 1504214 B1 | 8/2008 |
| EP | 2042537 A1 | 4/2009 |
| EP | 1757613 B1 | 1/2011 |
| EP | 2280017 A1 | 2/2011 |
| EP | 1577282 B1 | 6/2011 |
| GB | 2462149 A | 2/2010 |
| JP | S63251423 A | 10/1988 |
| JP | 08334196 A | 12/1996 |
| JP | 09014574 A | 1/1997 |
| JP | 3614933 B2 | 1/2005 |
| WO | 89/11618 A1 | 11/1989 |
| WO | 98/06552 A1 | 2/1998 |
| WO | 00/46257 A1 | 8/2000 |
| WO | 02/14376 A2 | 2/2002 |
| WO | 02/079208 A2 | 10/2002 |
| WO | 03/011455 A1 | 2/2003 |
| WO | 03/095887 A1 | 11/2003 |
| WO | 2004/067897 A2 | 8/2004 |
| WO | 2005/028402 A2 | 3/2005 |
| WO | 2005/028402 A3 | 3/2005 |
| WO | 2005/058573 A1 | 6/2005 |
| WO | 2006/111027 A1 | 10/2006 |
| WO | 2007/101818 A1 | 9/2007 |
| WO | 2008/031545 A1 | 3/2008 |
| WO | 2008/042342 A2 | 4/2008 |
| WO | 2008/054602 A2 | 5/2008 |
| WO | 2009/027686 A1 | 3/2009 |
| WO | 2010/009559 A1 | 1/2010 |
| WO | 2010/037550 A1 | 4/2010 |
| WO | 2011/033175 A1 | 3/2011 |
| WO | 2012/004665 A2 | 1/2012 |
| WO | 2012/023841 A1 | 2/2012 |
| WO | 2012/030906 A1 | 3/2012 |
| WO | 2012/168149 A1 | 12/2012 |
| WO | 2012/174502 A2 | 12/2012 |
| WO | 2013/070074 A1 | 5/2013 |
| WO | 2013/083164 A1 | 6/2013 |
| WO | WO -2013083164 A1 * | 6/2013 ............ B63B 25/12 |
| WO | 2013/154432 A1 | 10/2013 |
| WO | 2013/160722 A1 | 10/2013 |
| WO | 2015/017938 A1 | 2/2015 |
| WO | 2015-063496 A2 | 5/2015 |
| WO | 2015/079249 A1 | 6/2015 |
| WO | 2015/152726 A1 | 10/2015 |

OTHER PUBLICATIONS

Sanford et al., "New Insights into the Mechanism of Ruthenium-Catalyzed Olefin Metathesis Reactions," J. Am. Chem. Soc., 2001, 123, pp. 749-750 with supportive information.

Scholl et al., "Synthesis and Activity of a New Generation of Ruthenium-Based Olefin Metathesis Catalysts Coordinated with 1,3-Dimesityl-4,5-dihydroimidazol-2-ylidene Ligands," Org. Left., 1999, vol. 1, No. 6. pp. 953-956.

Schwab et al., "Synthesis and Applications of RuCl2(=Chr)(PR3)2: The Influence of the Alkylidene Moiety on Metathesis Activity," J. Am. Chem. Soc., 1996, 118, pp. 100-110 and supporting information.

(56) References Cited

OTHER PUBLICATIONS

English translation of JP 08334196. No Date.
English translation of JP 09014574. No Date.
International Preliminary Report on Patenability in corresponding International Application No. PCT/US2014/072198, dated Sep. 15, 2016.
International Search Report and Written Opinion in PCT/US2014/043968, dated Nov. 4, 2014.
International Preliminary Report on Patentability in PCT/US2014/043968, dated Jan. 7, 2016.
Extended European Search Report in corresponding Application No. EP 14818063, dated Aug. 3, 2016.
Machine translation of JP 3614933. No Date.
M. Giardello, "New Developments in the Commercialization of Olefin Metathesis Technology," Internet Citation, Aug. 3, 2007, pp. 1-56.
Shintaro et al., "Corrosion prevention for underground pipes," retrieved from CAPLUS, Jan. 17, 1997, Database accession No. 1997-203766, abstract.
Tooru et al., "Method for prevention of corrosion of joints of metal pipes," retrieved from CAPLUS, Dec. 17, 1996, Database accession no. 1997-134653, abstract.
Le Gac et al., "Durability of polydicyclopentadiene under high temperature, high pressure and seawater (offshore oil production conditions)," Polymer Degradation and Stability, Mar. 2013, Vol. 98, Issue 3, pp. 809-817.

\* cited by examiner

Pipe Coated with Thermal Insulation (ROMP polymer)

Simulated Field Joint Coated with Thermal Insulation (ROMP polymer)

THERMAL INSULATION

CROSS REFERENCE TO RELATED APPLICATIONS

This application is the National Stage of PCT International Application No. PCT/US2014/072198, filed Dec. 23, 2014, which claims the benefit of priority to U.S. Provisional Application No. 61/948,196, filed Mar. 5, 2014. This application is also a continuation-in-part application of PCT International Application No. PCT/US2014/043968, filed Jun. 24, 2014, which claims the benefit of priority to U.S. Provisional Application Nos. 61/838,824, filed Jun. 24, 2013, and 61/948,196, filed Mar. 5, 2014. The entire contents of these applications are incorporated herein by reference.

TECHNICAL FIELD

The present invention relates to the field of insulated pipelines and structures, particularly to the field of subsea pipelines and structures. More particularly, the present invention relates to thermal insulation materials and compositions for insulating offshore oil drilling equipment and structures, particularly subsea pipelines and structures. The present invention also relates to methods of using such thermal insulation materials and compositions to insulate offshore oil drilling equipment and structures, and articles of manufacture comprising such thermal insulation materials and compositions.

BACKGROUND

Offshore oil drilling requires the transportation of hydrocarbons from wellheads positioned underwater to shore or other surface equipment for further distribution. As temperature decreases the resistance to flow of liquids such as oil increases. Pipelines used in the transportation of oil from the underwater wellheads are generally insulated to avoid a substantial decrease in the temperature of the oil. Moreover, the underwater environment exposes pipelines and other oil drilling equipment to compressive forces, salt water corrosion, near-freezing water temperatures, possible water absorption, undersea currents, and marine life. Most pipes and pipelines used in offshore oil drilling are constructed of metal, typically some grade of steel.

Installation conditions for subterranean and subsea pipelines and equipment tend to be demanding. As such, it is possible that the material used to thermally insulate offshore drilling equipment and pipelines, including but not limited to subterranean pipelines and equipment as well as subsea pipelines and equipment may become damaged during installation of the pipeline. For example, during installation pipeline insulation undergo bending (flexural stress) due to pipe sag and reeling, particularly in what are commonly known as S-lay and J-lay installation processes.

In recent years performance requirements for thermal insulation materials have also become increasingly demanding. Recent advances in drilling technology and depletion of readily accessible sub-sea oil wells have resulted in the push toward deep water drilling where oil temperatures are typically hotter. This results in higher temperature pipelines and structures. Though several materials (e.g., polymer materials and/or polymer composite materials) with higher design temperatures have been developed, the peak use temperature of these materials has plateaued near 150-160° C. Thus, a need exists for easily applied thermal insulation materials that pass the requisite qualification tests so as to be suitable for use on subsea and subterranean pipelines with maximum flowline operating temperatures (MFOTs) above 150-160° C. These installation and performance demands, as well as other needs, have led to the introduction of a number of materials (e.g., polymer materials and/or polymer composite materials) for the purpose of insulating offshore drilling equipment and pipelines, including but not limited to subterranean pipelines and equipment as well as subsea pipelines and equipment.

Desirable characteristics and/or properties of thermal insulation materials, in particular thermal insulation materials for subsea applications include: thermal stability above 175° C.; resistance to hydrolysis above 175° C.; flexibility greater than 5% elongation at break at 25° C.; compatibility with glass microspheres; fast cure times; low thermal conductivity; high impact strength; castable (high throughput with low capital expenditure cost); rigid for robust pipe handling without external protection; can be processed in air; can be applied in thick sections without multi-layering; can be applied to complex geometries; rapid full cure under production conditions; processable in the presence of trace moisture (water). Furthermore, there has been a need in the industry for thermal insulation materials, particularly thermal insulation materials for subsea applications (e.g., thermal insulation for pipe and pipelines and other subsea equipment and structures, such as coatings for field joints, etc.) that possess all of these desirable characteristics and/or properties. Thermal stability as used herein means that a material maintains its structural integrity when subjected to elevated temperatures.

Polyurethanes have been used for insulating subsea pipelines and equipment due to somewhat general ease in processing and generally good mechanical properties. However, polyurethane insulation may suffer from hydrolytic degradation when exposed to hot-wet environments. In offshore oil fields, particularly fields where the oil temperature is high at the wellhead, there is a possibility of hydrolytic degradation of the polyurethane polymer network, particularly at elevated temperatures where water is able to ingress the polymer network, which would negatively affect the insulation capabilities of the polyurethane polymer.

Polypropylene is another polymer material that is used to insulate subsea pipelines and equipment. However, unlike polyurethanes, the application of polypropylene is a more difficult process generally requiring extrusion of multiple layers. Moreover, polypropylene does not possess attractive thermal and mechanical properties.

Polystyrene is another polymer material that is used to insulate subsea pipelines and equipment, however, polystyrene does not possess attractive thermal and mechanical properties.

Another material used for insulating subsea pipelines and equipment is rigid epoxy syntactic foam, where hollow glass or ceramic spheres are combined with the epoxy resin. This material possesses good thermal conductivity, but suffers from being very brittle and rigid, making this material susceptible to damage when exposed to high stress forces and/or sudden impacts. Moreover, these materials are difficult to remove and replace as they are attached to the surface mechanically or through the use of adhesives. Epoxy resin in general, in the absence of glass or ceramic microspheres, have poor thermal conductivity, generally require long cure cycles and also suffer from being very brittle and rigid, and well as having other limitations.

Silicones and syntactic silicones where hollow glass or ceramic spheres are combined with the silicones are another polymer material that is used to insulate subsea pipelines and equipment, however, silicones and syntactic silicones may suffer from hydrolytic degradation when exposed to hot wet environments. Moreover, silicones generally require long cure cycles.

Phenolics are another polymer material that is used to insulate subsea pipelines and equipment; however, phenolics are generally difficult to apply to such objects. These materials also suffer from being very brittle and rigid, making this material susceptible to damage when exposed to high stress forces and/or sudden impacts.

Another material for insulating subsea pipelines and equipment is elastomeric amine cured epoxy resins. While elastomeric amine cured epoxy resins may offer some advantages over polyurethanes, these materials possess several limitations, particularly in that at least two steps and specialized equipment are required to prepare such elastomeric amine cured epoxy resins. Moreover, these materials are viscous liquids (e.g., 90,000 cP at 25° C.), making the filling of complex molds difficult.

Rubber materials, including silicone rubber, are examples of other materials used to insulate subsea pipelines and equipment. These materials do not possess attractive thermal and mechanical properties, and generally require long cure cycles, as well as having other limitations.

Dicyclopentadiene polymer (pDCPD) prepared from Telene® 1650 DCPD resin is another example of a material that has been reported for use as a field joint coating material, however, this material (including similar materials such as Metton® DCPD resin and Pentam® DCPD resin) possess several limitations, which are well known in the art. Telene® 1650 DCPD resin (BF Goodrich/Telene SAS) and Metton® DCPD resin (Metton America/Hercules) are both based on a two component system comprising molybdenum (Telene SAS/BF Goodrich) or tungsten (Metton America/Hercules) pre-catalyst dissolved in DCPD monomer (B-component) and an aluminum alkyl or aluminum alkyl halide co-catalyst dissolved in DCPD monomer (A-component). These molybdenum and tungsten catalyzed DCPD resins are extremely sensitive to chemical functional groups and to air (oxygen) and moisture (water), even at trace levels. As a result of this sensitivity, such molybdenum and tungsten catalyzed DCPD resin are typically limited to being processed using Reaction Injection Molding (RIM) techniques, which require specialized and expensive processing and handling conditions and equipment, including specialized and expensive molds, injection equipment, and storage tanks. Moreover, as a further result of this sensitivity, particularly their sensitivity to chemical functional groups, such molybdenum and tungsten catalyzed DCPD resins are generally not suitable for use to prepare DCPD polymer composites.

In fact, commercially available DCPD monomer resins for use in molding of polymer articles typically contain between 0%-30% by weight of tricyclopentadiene, and lesser amounts of higher oligomers of cyclopentadiene such as tetramers and pentamers of cyclopentadiene (e.g., tetracyclopentadiene and pentacyclopentadiene).

Therefore, despite the advances achieved in the art, there continues to be need for improvements in the materials, particularly polymer materials and/or polymer composite materials, used for thermally insulating pipelines and associated equipment and structures used in offshore oil drilling.

SUMMARY

The present invention is directed to addressing one or more of the aforementioned concerns and relates to thermal insulation materials and thermal insulation material compositions and methods for thermally insulating pipelines and associated equipment, structures, and objects used in offshore drilling. The present invention is also relates to articles of manufacture comprising the thermal insulation materials and/or thermal insulation material compositions of the invention.

More particularly the present invention relates to the use of ring opening metathesis polymerization polymers (ROMP polymers) and/or ROMP polymer composites for thermally insulating pipelines and associated equipment, structures, and objects used in offshore oil drilling. ROMP polymers and/or ROMP polymer composites of the invention offer several advantages over prior art materials used for thermally insulating pipelines and associated equipment, structures, and objects used in offshore oil drilling.

In one embodiment the invention provides a cyclic olefin composition comprising 10.0 mol % to 80.0 mol % of at least one cyclic olefin containing multiunsaturation, and up to 90.0 mol % of at least one cyclic olefin containing monounsaturation.

In another embodiment the invention provides a cyclic olefin composition comprising 10.0 mol % to 70.0 mol % of at least one cyclic olefin containing multiunsaturation, and up to 90.0 mol % of at least one cyclic olefin containing monounsaturation.

In another embodiment the invention provides a cyclic olefin composition comprising 10.0 mol % to 60.0 mol % of at least one cyclic olefin containing multiunsaturation, and up to 90.0 mol % of at least one cyclic olefin containing monounsaturation.

In another embodiment the invention provides a cyclic olefin composition comprising 10.0 mol % to 50.0 mol % of at least one cyclic olefin containing multiunsaturation, and up to 90.0 mol % of at least one cyclic olefin containing monounsaturation.

In another embodiment the invention provides a cyclic olefin composition comprising 10.0 mol % to 40.0 mol % of at least one cyclic olefin containing multiunsaturation, and up to 90.0 mol % of at least one cyclic olefin containing monounsaturation.

In another embodiment the invention provides a cyclic olefin composition comprising 20.0 mol % to 80.0 mol % of at least one cyclic olefin containing multiunsaturation, and up to 80.0 mol % of at least one cyclic olefin containing monounsaturation.

In another embodiment the invention provides a cyclic olefin composition comprising 30.0 mol % to 80.0 mol % of at least one cyclic olefin containing multiunsaturation, and up to 70.0 mol % of at least one cyclic olefin containing monounsaturation.

In another embodiment the invention provides a cyclic olefin composition comprising 40.0 mol % to 80.0 mol % of at least one cyclic olefin containing multiunsaturation, and up to 60.0 mol % of at least one cyclic olefin containing monounsaturation.

In another embodiment the invention provides a cyclic olefin composition comprising 50.0 mol % to 80.0 mol % of at least one cyclic olefin containing multiunsaturation, and up to 50.0 mol % of at least one cyclic olefin containing monounsaturation.

In another embodiment the invention provides a cyclic olefin composition comprising 40.0 mol % to 70.0 mol % of at least one cyclic olefin containing multiunsaturation, and up to 60.0 mol % of at least one cyclic olefin containing monounsaturation.

In another embodiment the invention provides a cyclic olefin composition comprising 50.0 mol % to 60.0 mol % of at least one cyclic olefin containing multiunsaturation, and up to 50.0 mol % of at least one cyclic olefin containing monounsaturation.

In another embodiment the invention provides a cyclic olefin composition comprising 30.0 mol % to 60.0 mol % of at least one cyclic olefin containing multiunsaturation, and up to 70.0 mol % of at least one cyclic olefin containing monounsaturation.

In another embodiment the invention provides a cyclic olefin composition comprising 40.0 mol % to 60.0 mol % of at least one cyclic olefin containing multiunsaturation, and up to 60.0 mol % of at least one cyclic olefin containing monounsaturation.

In another embodiment the invention provides a cyclic olefin composition comprising 40.0 mol % to 60.0 mol % of at least one cyclic olefin containing multiunsaturation, and 40.0 mol % to 60.0 mol % of at least one cyclic olefin containing monounsaturation.

In another embodiment the invention provides a cyclic olefin composition comprising 40.0 mol % to 70.0 mol % of at least one cyclic olefin containing multiunsaturation, and 30.0 mol % to 60.0 mol % of at least one cyclic olefin containing monounsaturation.

In another embodiment the invention provides a cyclic olefin composition comprising 50.0 mol % to 60.0 mol % of at least one cyclic olefin containing multiunsaturation, and 40.0 mol % to 50.0 mol % of at least one cyclic olefin containing monounsaturation.

In one embodiment the invention provides a cyclic olefin composition comprising at least one cyclic olefin containing multiunsaturation, and at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted.

In one embodiment the invention provides a cyclic olefin composition comprising at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 10.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 10.0 mol % to 70.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 10.0 mol % to 70.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 10.0 mol % to 60.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 10.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a cyclic olefin composition comprising 10.0 mol % to 50.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a cyclic olefin composition comprising 10.0 mol % to 50.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a cyclic olefin composition comprising 10.0 mol % to 40.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a cyclic olefin composition comprising 10.0 mol % to 40.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a cyclic olefin composition comprising 20.0 mol % to 80.0 mol % of at least one cyclic olefin containing multiunsaturation, and up to 80.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a cyclic olefin composition comprising 20.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 80.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a cyclic olefin composition comprising 30.0 mol % to 80.0 mol % of at least one cyclic olefin containing multiunsaturation, and up to 70.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a cyclic olefin composition comprising 30.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 70.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a cyclic olefin composition comprising 40.0 mol % to 80.0 mol % of at least one cyclic olefin containing multiunsaturation, and up to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 40.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 60.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 50.0 mol % to 80.0 mol % of at least one cyclic olefin containing multiunsaturation, and up to 50.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 50.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 50.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 40.0 mol % to 70.0 mol % of at least one cyclic olefin containing multiunsaturation, and up to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 40.0 mol % to 70.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 60.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 50.0 mol % to 60.0 mol % of at least one cyclic olefin containing multiunsaturation, and up to 50.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 50.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 50.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 30.0 mol % to 60.0 mol % of at least one cyclic olefin containing multiunsaturation, and up to 70.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In one embodiment the invention provides a cyclic olefin composition comprising 30.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn); and up to 70.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn).

In one embodiment the invention provides a cyclic olefin composition comprising 40.0 mol % to 60.0 mol % of at least one cyclic olefin containing multiunsaturation, and up to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn).

In one embodiment the invention provides a cyclic olefin composition comprising 40.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn); and up to 60.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn).

In one embodiment the invention provides a cyclic olefin composition comprising 40.0 mol % to 60.0 mol % of at least one cyclic olefin containing multiunsaturation, and 40.0 mol % to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn).

In one embodiment the invention provides a cyclic olefin composition comprising 40.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn); and 40.0 mol % to 60.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn).

In one embodiment the invention provides a cyclic olefin composition comprising 40.0 mol % to 70.0 mol % of at least one cyclic olefin containing multiunsaturation, and 30.0 mol % to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn).

In one embodiment the invention provides a cyclic olefin composition comprising 40.0 mol % to 70.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn); and 30.0 mol % to 60.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn).

In one embodiment the invention provides a cyclic olefin composition comprising 50.0 mol % to 60.0 mol % of at least one cyclic olefin containing multiunsaturation, and 40.0 mol % to 50.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn).

In one embodiment the invention provides a cyclic olefin composition comprising 50.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, $-(Z^*)_n$-Fn where n is zero or 1, $Z^*$ and Fn, and functional groups (Fn); and 40.0 mol % to 50.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a resin composition comprising a cyclic olefin composition, wherein the cyclic olefin composition comprises 10.0 mol % to 70.0 mol % of at least one cyclic olefin containing multiunsaturation, and up to 90.0 mol % of at least one cyclic olefin containing monounsaturation.

In another embodiment the invention provides a resin composition comprising a cyclic olefin composition, wherein the cyclic olefin composition comprises 10.0 mol % to 60.0 mol % of at least one cyclic olefin containing multiunsaturation, and up to 90.0 mol % of at least one cyclic olefin containing monounsaturation.

In another embodiment the invention provides a resin composition comprising a cyclic olefin composition, wherein the cyclic olefin composition comprises 10.0 mol % to 50.0 mol % of at least one cyclic olefin containing multiunsaturation, and up to 90.0 mol % of at least one cyclic olefin containing monounsaturation.

In another embodiment the invention provides a resin composition comprising a cyclic olefin composition, wherein the cyclic olefin composition comprises 10.0 mol % to 40.0 mol % of at least one cyclic olefin containing multiunsaturation, and up to 90.0 mol % of at least one cyclic olefin containing monounsaturation.

In another embodiment the invention provides a resin composition comprising a cyclic olefin composition, wherein the cyclic olefin composition comprises 20.0 mol % to 80.0 mol % of at least one cyclic olefin containing multiunsaturation, and up to 80.0 mol % of at least one cyclic olefin containing monounsaturation.

In another embodiment the invention provides a resin composition comprising a cyclic olefin composition, wherein the cyclic olefin composition comprises 30.0 mol % to 80.0 mol % of at least one cyclic olefin containing multiunsaturation, and up to 70.0 mol % of at least one cyclic olefin containing monounsaturation.

In another embodiment the invention provides a resin composition comprising a cyclic olefin composition, wherein the cyclic olefin composition comprises 40.0 mol % to 80.0 mol % of at least one cyclic olefin containing multiunsaturation, and up to 60.0 mol % of at least one cyclic olefin containing monounsaturation.

In another embodiment the invention provides a resin composition comprising a cyclic olefin composition, wherein the cyclic olefin composition comprises 50.0 mol % to 80.0 mol % of at least one cyclic olefin containing multiunsaturation, and up to 50.0 mol % of at least one cyclic olefin containing monounsaturation.

In another embodiment the invention provides a resin composition comprising a cyclic olefin composition, wherein the cyclic olefin composition comprises 40.0 mol % to 70.0 mol % of at least one cyclic olefin containing multiunsaturation, and up to 60.0 mol % of at least one cyclic olefin containing monounsaturation.

In another embodiment the invention provides a resin composition comprising a cyclic olefin composition, wherein the cyclic olefin composition comprises 50.0 mol % to 60.0 mol % of at least one cyclic olefin containing multiunsaturation, and up to 50.0 mol % of at least one cyclic olefin containing monounsaturation.

In another embodiment the invention provides a resin composition comprising a cyclic olefin composition, wherein the cyclic olefin composition comprises 30.0 mol % to 60.0 mol % of at least one cyclic olefin containing multiunsaturation, and up to 70.0 mol % of at least one cyclic olefin containing monounsaturation.

In another embodiment the invention provides a resin composition comprising a cyclic olefin composition, wherein the cyclic olefin composition comprises 40.0 mol % to 60.0 mol % of at least one cyclic olefin containing multiunsaturation, and up to 60.0 mol % of at least one cyclic olefin containing monounsaturation.

In another embodiment the invention provides a resin composition comprising a cyclic olefin composition, wherein the cyclic olefin composition comprises 40.0 mol % to 60.0 mol % of at least one cyclic olefin containing multiunsaturation, and 40.0 mol % to 60.0 mol % of at least one cyclic olefin containing monounsaturation.

In another embodiment the invention provides a resin composition comprising a cyclic olefin composition, wherein the cyclic olefin composition comprises 50.0 mol % to 60.0 mol % of at least one cyclic olefin containing multiunsaturation, and 40.0 mol % to 50.0 mol % of at least one cyclic olefin containing monounsaturation.

In another embodiment the invention provides a resin composition comprising a cyclic olefin composition, wherein the cyclic olefin composition comprises at least one cyclic olefin containing multiunsaturation, and at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted. In one embodiment the invention provides a resin composition comprising a cyclic olefin composition, wherein the cyclic olefin composition comprises at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 10.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 10.0 mol % to 70.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 10.0 mol % to 70.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 10.0 mol % to 60.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 10.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 10.0 mol % to 50.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 10.0 mol % to 50.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 10.0 mol % to 40.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 10.0 mol % to 40.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 90.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 20.0 mol % to 80.0 mol % of at least one cyclic olefin containing multiunsaturation, and up to 80.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 20.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 80.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 30.0 mol % to 80.0 mol % of at least one cyclic olefin containing multiunsaturation, and up to 70.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 30.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 70.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 40.0 mol % to 80.0 mol % of at least one cyclic olefin containing multiunsaturation, and up to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 40.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and up to 60.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 50.0 mol % to 80.0 mol % of at least one cyclic olefin containing multiunsaturation, and up to 50.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment the invention provides a resin composition comprising a cyclic olefin composition, wherein the cyclic olefin composition comprises 50.0 mol % to 80.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 50.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 40.0 mol % to 70.0 mol % of at least one cyclic olefin containing multiunsaturation, and up to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 40.0 mol % to 70.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 60.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 50.0 mol % to 60.0 mol % of at least one cyclic olefin containing multiunsaturation, and up to 50.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 50.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 50.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 30.0 mol % to 60.0 mol % of at least one cyclic olefin containing multiunsaturation, and up to 70.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 30.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 70.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 40.0 mol % to 60.0 mol % of at least one cyclic olefin containing multiunsaturation, and up to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 40.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and up to 60.0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 40.0 mol % to 60.0 mol % of at least one cyclic olefin containing multiunsaturation, and 40.0 mol % to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 40.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and 40.0 mol % to 60.0 0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 40.0 mol % to 70.0 mol % of at least one cyclic olefin containing multiunsaturation, and 30.0 mol % to 60.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 40.0 mol % to 70.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and 30.0 mol % to 60.0 0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 50.0 mol % to 60.0 mol % of at least one cyclic olefin containing multiunsaturation, and 40.0 mol % to 50.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In another embodiment the invention provides a resin composition comprising a cyclic olefin composition, wherein the cyclic olefin composition comprises 50.0 mol % to 60.0 mol % of at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and 40.0 mol % to 50.0 0 mol % of at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn).

In one embodiment the invention provides a method of thermally insulating an object from a surrounding fluid, the method comprising interposing a thermal insulation material between the object and the fluid wherein the thermal insulation material comprises the reaction product of a resin composition comprising at least one cyclic olefin and a catalyst composition comprising at least one metal carbene olefin metathesis catalyst.

In one embodiment the invention provides a method of thermally insulating an object from a surrounding fluid, the method comprising interposing a thermal insulation material between the object and the fluid wherein the thermal insulation material comprises the reaction product of a resin composition comprising a cyclic olefin composition and a catalyst composition comprising at least one metal carbene olefin metathesis catalyst.

In one embodiment the invention provides a method of thermally insulating an object from a surrounding fluid, the method comprising interposing a thermal insulation material between the object and the fluid wherein the thermal insulation material comprises the reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a method of thermally insulating an object from a surrounding fluid, the method comprising interposing a thermal insulation material between the object and the fluid wherein the thermal insulation material comprises a ROMP polymer.

In another embodiment the invention provides a method of thermally insulating an object from a surrounding fluid, the method comprising interposing a thermal insulation material between the object and the fluid wherein the thermal insulation material comprises a ROMP polymer, wherein the ROMP polymer is a reaction product of a resin composition comprising a cyclic olefin composition and a catalyst composition comprising at least one metal carbene olefin metathesis catalyst.

In another embodiment the invention provides a method of thermally insulating an object from a surrounding fluid, the method comprising interposing a thermal insulation material between the object and the fluid wherein the thermal insulation material comprises a ROMP polymer, wherein the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a method of thermally insulating an object from a surrounding fluid, the method comprising interposing a thermal insulation material between the object and the fluid wherein the thermal insulation material comprises a ROMP polymer composite.

In another embodiment the invention provides a method of thermally insulating an object from a surrounding fluid, the method comprising interposing a thermal insulation material between the object and the fluid wherein the thermal insulation material comprises a ROMP polymer composite, wherein the ROMP polymer composite is a reaction product of a resin composition comprising a cyclic olefin composition and a catalyst composition comprising at least one metal carbene olefin metathesis catalyst.

In another embodiment the invention provides a method of thermally insulating an object from a surrounding fluid, the method comprising interposing a thermal insulation material between the object and the fluid wherein the thermal insulation material comprises a ROMP polymer composite, wherein the ROMP polymer composite is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment a reaction product of a resin composition comprising at least one cyclic olefin and a catalyst composition comprising at least one metal carbene olefin metathesis catalyst is used to thermally insulate any object from a surrounding environment.

In another embodiment the invention provides a reaction product of a resin composition comprising a cyclic olefin composition and a catalyst composition comprising at least one metal carbene olefin metathesis catalyst is used to thermally insulate any object from a surrounding environment.

In another embodiment a reaction product of a resin composition comprising a cyclic olefin composition and a catalyst composition comprising at least one metal carbene olefin metathesis catalyst is used to thermally insulate any object from a surrounding environment, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment a ROMP polymer is used to thermally insulate any object from a surrounding environment.

In another embodiment a ROMP polymer is used to thermally insulate any object from a surrounding environment, wherein the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment a ROMP polymer is used to thermally insulate any object from a surrounding environment, wherein the ROMP polymer is a reaction product of a resin composition comprising a cyclic olefin composition and a catalyst composition comprising at least one metal carbene olefin metathesis catalyst.

In another embodiment a ROMP polymer composite is used to thermally insulate any object from a surrounding environment.

In another embodiment a ROMP polymer composite is used to thermally insulate any object from a surrounding environment, wherein the ROMP polymer composite is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment a ROMP polymer composite is used to thermally insulate any object from a surrounding environment, wherein the ROMP polymer composite is a reaction product of a resin composition comprising a cyclic olefin composition and a catalyst composition comprising at least one metal carbene olefin metathesis catalyst.

In another embodiment a reaction product of a resin composition comprising at least one cyclic olefin and a catalyst composition comprising at least one olefin metathesis catalyst is used to thermally insulate objects, equipment, structures, systems used in offshore oil drilling.

In another embodiment a reaction product of a resin composition comprising a cyclic olefin composition and a catalyst composition comprising at least one olefin metathesis catalyst is used to thermally insulate objects, equipment, structures, systems used in offshore oil drilling.

In another embodiment a reaction product of a resin composition comprising at a cyclic olefin composition and a catalyst composition comprising at least one olefin metathesis catalyst is used to thermally insulate objects, equipment, structures, systems used in offshore oil drilling, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment a reaction product of a resin composition comprising at least one cyclic olefin and a catalyst composition comprising at least one metal carbene olefin metathesis catalyst is used to thermally insulate undersea pipes and well head equipment from sea water.

In another embodiment a reaction product of a resin composition comprising a cyclic olefin composition and a catalyst composition comprising at least one metal carbene olefin metathesis catalyst is used to thermally insulate undersea pipes and well head equipment from sea water.

In another embodiment a reaction product of a resin composition comprising a cyclic olefin composition and a catalyst composition comprising at least one metal carbene olefin metathesis catalyst is used to thermally insulate undersea pipes and well head equipment from sea water, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment thermal insulation materials of the invention are prepared by combining a resin composition comprising at least one cyclic olefin with a catalyst composition comprising at least one metal carbene olefin metathesis catalyst to form a ROMP composition, and subjecting the ROMP composition to conditions effective to polymerize the ROMP composition, thereby forming a ROMP polymer for use as a thermal insulation material.

In another embodiment thermal insulation materials of the invention are prepared by combining a resin composition comprising a cyclic olefin composition with a catalyst composition comprising at least one metal carbene olefin metathesis catalyst to form a ROMP composition, and subjecting the ROMP composition to conditions effective to polymerize the ROMP composition, thereby forming a ROMP polymer for use as a thermal insulation material.

In another embodiment thermal insulation materials of the invention are prepared by combining a resin composition comprising a cyclic olefin composition with a catalyst composition comprising at least one metal carbene olefin metathesis catalyst to form a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation, and subjecting the ROMP composition to conditions effective to polymerize the ROMP composition, thereby forming a ROMP polymer for use as a thermal insulation material.

In another embodiment thermal insulation materials of the invention are prepared by combining a resin composition comprising at least one cyclic olefin with a catalyst composition comprising at least one metal carbene olefin metathesis catalyst to form a ROMP composition, contacting the ROMP composition with a substrate material, subjecting the ROMP composition to conditions effective to polymerize the ROMP composition, thereby forming a ROMP polymer composite for use as a thermal insulation material.

In another embodiment thermal insulation materials of the invention are prepared by combining a resin composition comprising a cyclic olefin composition with a catalyst composition comprising at least one metal carbene olefin metathesis catalyst to form a ROMP composition, contacting the ROMP composition with a substrate material, subjecting the ROMP composition to conditions effective to polymerize the ROMP composition, thereby forming a ROMP polymer composite for use as a thermal insulation material.

In another embodiment thermal insulation materials of the invention are prepared by combining a resin composition comprising a cyclic olefin composition with a catalyst composition comprising at least one metal carbene olefin metathesis catalyst to form a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation, contacting the ROMP composition with a substrate material, subjecting the ROMP composition to conditions effective to polymerize the ROMP composition, thereby forming a ROMP polymer composite for use as a thermal insulation material.

In another embodiment thermal insulation materials of the invention are prepared by combining a resin composition comprising at least one cyclic olefin and at least one substrate material with a catalyst composition comprising at least one metal carbene olefin metathesis catalyst to form a ROMP composition, subjecting the ROMP composition to conditions effective to polymerize the ROMP composition, thereby forming a ROMP polymer composite for use as a thermal insulation material.

In another embodiment thermal insulation materials of the invention are prepared by combining a resin composition comprising a cyclic olefin composition and at least one substrate material with a catalyst composition comprising at least one metal carbene olefin metathesis catalyst to form a ROMP composition, subjecting the ROMP composition to conditions effective to polymerize the ROMP composition, thereby forming a ROMP polymer composite for use as a thermal insulation material.

In another embodiment thermal insulation materials of the invention are prepared by combining a resin composition comprising a cyclic olefin composition and at least one substrate material with a catalyst composition comprising at least one metal carbene olefin metathesis catalyst to form a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation, subjecting the ROMP composition to conditions effective to polymerize the ROMP composition, thereby forming a ROMP polymer composite for use as a thermal insulation material.

In another embodiment a process for providing a ROMP polymer coating for offshore applications is provided, the process comprising, providing an object surface to be coated, providing a resin composition comprising at least one cyclic olefin, providing a catalyst composition comprising at least one metal carbene olefin metathesis catalyst, combining the resin composition comprising at least one cyclic olefin and the catalyst composition comprising at least one metal carbene olefin metathesis catalyst to form a ROMP composition, contacting the object surface with the ROMP composition, and subjecting the ROMP composition to conditions effective to polymerize the ROMP composition.

In another embodiment a process for providing a ROMP polymer coating for offshore applications is provided, the process comprising, providing an object surface to be coated, providing a resin composition comprising a cyclic olefin composition, providing a catalyst composition comprising at least one metal carbene olefin metathesis catalyst, combining the resin composition comprising the cyclic olefin composition and the catalyst composition comprising at least one metal carbene olefin metathesis catalyst to form a ROMP composition, contacting the object surface with the ROMP composition, and subjecting the ROMP composition to conditions effective to polymerize the ROMP composition.

In another embodiment a process for providing a ROMP polymer coating for offshore applications is provided, the process comprising, providing an object surface to be coated, providing a resin composition comprising a one cyclic olefin composition, providing a catalyst composition comprising at least one metal carbene olefin metathesis catalyst, combining the resin composition comprising at least one cyclic olefin composition and the catalyst composition comprising at least one metal carbene olefin metathesis catalyst to form a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation, contacting the object surface with the ROMP composition, and subjecting the ROMP composition to conditions effective to polymerize the ROMP composition.

In another embodiment a process for providing a ROMP polymer coating for offshore applications is provided, the process comprising, providing an object surface to be coated, providing a resin composition comprising at least one cyclic olefin, providing a catalyst composition comprising at least one metal carbene olefin metathesis catalyst, combining the resin composition comprising at least one cyclic olefin and the catalyst composition comprising at least one metal carbene olefin metathesis catalyst to form a ROMP composition, applying the ROMP composition to the object surface, and subjecting the ROMP composition to conditions effective to polymerize the ROMP composition.

In another embodiment a process for providing a ROMP polymer coating for offshore applications is provided, the process comprising, providing an object surface to be coated, providing a resin composition comprising a cyclic olefin composition, providing a catalyst composition comprising at least one metal carbene olefin metathesis catalyst, combining the resin composition comprising the cyclic olefin composition and the catalyst composition comprising at least one metal carbene olefin metathesis catalyst to form a ROMP composition, applying the ROMP composition to the object surface, and subjecting the ROMP composition to conditions effective to polymerize the ROMP composition.

In another embodiment a process for providing a ROMP polymer coating for offshore applications is provided, the process comprising, providing an object surface to be coated, providing a resin composition comprising a one cyclic olefin composition, providing a catalyst composition comprising at least one metal carbene olefin metathesis catalyst, combining the resin composition comprising at least one cyclic olefin composition and the catalyst composition comprising at least one metal carbene olefin metathesis catalyst to form a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation, applying the ROMP composition to the object surface, and subjecting the ROMP composition to conditions effective to polymerize the ROMP composition.

In another embodiment, the invention provides a thermal insulation material comprising a resin composition comprising at least one cyclic olefin and a catalyst composition comprising at least one metal carbene olefin metathesis catalyst.

In another embodiment, the invention provides a thermal insulation material comprising a resin composition comprising a cyclic olefin composition and a catalyst composition comprising at least one metal carbene olefin metathesis catalyst.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises at least one cyclic olefin containing multiunsaturation, and at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted. In one embodiment the invention provides a thermal insulation material comprising a resin composition comprising a cyclic olefin composition and a catalyst composition comprising at least one metal carbene olefin metathesis catalyst, wherein the cyclic olefin composition comprises at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn); and at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

In another embodiment, the invention provides a thermal insulation material comprising a resin composition comprising a one cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 20.0 mol % to 80.0 mol % of at least one cyclic olefin containing multiunsaturation, and up to 80.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 30.0 mol % to 80.0 mol % of at least one cyclic olefin containing multiunsaturation, and up to 70.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 40.0 mol % to 80.0 mol % of at least one cyclic olefin containing multiunsaturation, and up to 60.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 50.0 mol % to 80.0 mol % of at least one cyclic olefin containing multiunsaturation, and up to 50.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 40.0 mol % to 70.0 mol % of at least one cyclic olefin containing multiunsaturation, and up to 60.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 50.0 mol % to 60.0 mol % of at least one cyclic olefin containing multiunsaturation, and up to 50.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 30.0 mol % to 60.0 mol % of at least one cyclic olefin containing multiunsaturation, and up to 70.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 40.0 mol % to 60.0 mol % of at least one cyclic olefin containing multiunsaturation, and up to 60.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 40.0 mol % to 60.0 mol % of at least one cyclic olefin containing multiunsaturation, and 40.0 mol % to 60.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 40.0 mol % to 70.0 mol % of at least one cyclic olefin containing multiunsaturation, and 30.0 mol % to 60.0 mol % of at least one cyclic olefin containing monounsaturation.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises 50.0 mol % to 60.0 mol % of at least one cyclic olefin containing multiunsaturation, and 40.0 mol % to 50.0 mol % of at least one cyclic olefin containing monounsaturation.

In another embodiment the invention provides a thermal insulation material, comprising: a resin composition comprising at least one cyclic olefin; and a catalyst composition comprising at least one metal carbene olefin metathesis catalyst.

In another embodiment the invention provides a thermal insulation material, comprising: a resin composition comprising a cyclic olefin composition; and a catalyst composition comprising at least one metal carbene olefin metathesis catalyst.

In another embodiment the invention provides a thermal insulation material, comprising: a resin composition comprising a one cyclic olefin composition, wherein the cyclic olefin composition comprises 10.0 mol % to 80.0 mol % of at least one cyclic olefin containing multiunsaturation, and up to 90.0 mol % of at least one cyclic olefin containing monounsaturation; and a catalyst composition comprising at least one metal carbene olefin metathesis catalyst.

In another embodiment, the invention provides a thermal insulation material, wherein the thermal insulation material comprises the reaction product of a resin composition comprising at least one cyclic olefin and a catalyst composition comprising at least one metal carbene olefin metathesis catalyst.

In another embodiment, the invention provides a thermal insulation material, wherein the thermal insulation material comprises the reaction product of a resin composition comprising a cyclic olefin composition and a catalyst composition comprising at least one metal carbene olefin metathesis catalyst.

In another embodiment, the invention provides a thermal insulation material, wherein the thermal insulation material comprises the reaction product of a resin composition comprising at least one cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation; and a catalyst composition comprising at least one metal carbene olefin metathesis catalyst.

In another embodiment, the invention provides a thermal insulation material for subsea applications comprising a resin composition comprising at least one cyclic olefin and a catalyst composition comprising at least one metal carbene olefin metathesis catalyst.

In another embodiment, the invention provides a thermal insulation material for subsea applications comprising a resin composition comprising a cyclic olefin composition and a catalyst composition comprising at least one metal carbene olefin metathesis catalyst.

In another embodiment, the invention provides a thermal insulation material for subsea applications comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment, the invention provides a thermal insulation material for subsea applications, wherein the thermal insulation material comprises the reaction product of a resin composition comprising at least one cyclic olefin and a catalyst composition comprising at least one metal carbene olefin metathesis catalyst.

In another embodiment, the invention provides a thermal insulation material for subsea applications, wherein the thermal insulation material comprises the reaction product of a resin composition comprising a cyclic olefin composition and a catalyst composition comprising at least one metal carbene olefin metathesis catalyst.

In another embodiment, the invention provides a thermal insulation material for subsea applications, wherein the thermal insulation material comprises the reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment, the invention provides a subsea thermal insulation material comprising a resin composition comprising at least one cyclic olefin and a catalyst composition comprising at least one metal carbene olefin metathesis catalyst.

In another embodiment, the invention provides a subsea thermal insulation material comprising a resin composition comprising a cyclic olefin composition and a catalyst composition comprising at least one metal carbene olefin metathesis catalyst.

In another embodiment, the invention provides a thermal insulation material comprising a resin composition comprising a cyclic olefin composition and a catalyst composition comprising at least one metal carbene olefin metathesis catalyst, wherein the cyclic olefin composition comprises at least one cyclic olefin containing multiunsaturation, and at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted.

In another embodiment, the invention provides a subsea thermal insulation material comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment, the invention provides a subsea thermal insulation material, wherein the subsea thermal insulation material comprises the reaction product of a resin composition comprising at least one cyclic olefin and a catalyst composition comprising at least one metal carbene olefin metathesis catalyst.

In another embodiment, the invention provides a subsea thermal insulation material, wherein the subsea thermal insulation material comprises the reaction product of a resin composition comprising a cyclic olefin composition and a catalyst composition comprising at least one metal carbene olefin metathesis catalyst.

In another embodiment, the invention provides a subsea thermal insulation material, wherein the subsea thermal insulation material comprises the reaction product of a resin composition comprising a cyclic olefin and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a thermal insulation material, comprising a ROMP polymer or a ROMP polymer composite.

In another embodiment the invention provides a thermal insulation material, comprising a ROMP polymer or a ROMP polymer composite, wherein the ROMP polymer or ROMP polymer composite is a reaction product of a resin composition comprising a cyclic olefin composition and a catalyst composition comprising at least one metal carbene olefin metathesis catalyst.

In another embodiment the invention provides a thermal insulation material, comprising a ROMP polymer or a ROMP polymer composite, wherein the ROMP polymer or ROMP polymer composite is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a thermal insulation material for subsea applications, wherein the thermal insulation material comprises a ROMP polymer or a ROMP polymer composite.

In another embodiment the invention provides a thermal insulation material for subsea applications, wherein the thermal insulation material comprises a ROMP polymer or a ROMP polymer composite, wherein the ROMP polymer or ROMP polymer composite is a reaction product of a resin composition comprising a cyclic olefin composition and a catalyst composition comprising at least one metal carbene olefin metathesis catalyst.

In another embodiment the invention provides a thermal insulation material for subsea applications, wherein the thermal insulation material comprises a ROMP polymer or a ROMP polymer composite, wherein the ROMP polymer or ROMP polymer composite is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a thermal insulation material composition comprising a resin composition comprising at least one cyclic olefin; and a catalyst composition comprising at least one metal carbene olefin metathesis catalyst.

In another embodiment the invention provides a thermal insulation material composition comprising a resin composition comprising a cyclic olefin composition; and a catalyst composition comprising at least one metal carbene olefin metathesis catalyst.

In another embodiment the invention provides a thermal insulation material composition comprising a resin composition comprising a cyclic olefin composition, wherein the cyclic olefin composition comprises 10.0 mol % to 80.0 mol % of at least one cyclic olefin containing multiunsaturation, and up to 90.0 mol % of at least one cyclic olefin containing monounsaturation; and a catalyst composition comprising at least one metal carbene olefin metathesis catalyst.

In another embodiment the present invention provides ROMP polymer materials for use as thermal insulation materials, where the ROMP polymer materials have good low temperature flexibility.

In another embodiment the present invention provides ROMP polymer materials for use as thermal insulation materials, where the ROMP polymer materials have good low temperature flexibility, wherein the ROMP polymer materials are a reaction product of a resin composition comprising a cyclic olefin composition and a catalyst composition comprising at least one metal carbene olefin metathesis catalyst.

In another embodiment the present invention provides ROMP polymer materials for use as thermal insulation materials, where the ROMP polymer materials have good low temperature flexibility, wherein the ROMP polymer materials are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the present invention provides ROMP polymer composite materials for use as thermal insulation materials, where the ROMP polymer composites have good low temperature flexibility.

In another embodiment the present invention provides ROMP polymer composite materials for use as thermal insulation materials, where the ROMP polymer composites have good low temperature flexibility, wherein the ROMP polymer composites are a reaction product of a resin composition comprising a cyclic olefin composition and a catalyst composition comprising at least one metal carbene olefin metathesis catalyst.

In another embodiment the present invention provides ROMP polymer composite materials for use as thermal insulation materials, where the ROMP polymer composites have good low temperature flexibility, wherein the ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the present invention provides ROMP polymer materials for use as thermal insulation materials, where the ROMP polymer materials have good low temperature impact properties.

In another embodiment the present invention provides ROMP polymer materials for use as thermal insulation materials, where the ROMP polymer materials have good low temperature impact properties, wherein the ROMP polymer materials are a reaction product of a resin composition comprising a cyclic olefin composition and a catalyst composition comprising at least one metal carbene olefin metathesis catalyst.

In another embodiment the present invention provides ROMP polymer materials for use as thermal insulation materials, where the ROMP polymer materials have good low temperature impact properties, wherein the ROMP polymer materials are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the present invention provides ROMP polymer composite materials for use as thermal insulation materials, where the ROMP polymer composites have good low temperature impact properties.

In another embodiment the present invention provides ROMP polymer composite materials for use as thermal insulation materials, where the ROMP polymer composites have good low temperature impact properties, wherein the ROMP polymer composites are a reaction product of a resin composition comprising a cyclic olefin composition and a catalyst composition comprising at least one metal carbene olefin metathesis catalyst.

In another embodiment the present invention provides ROMP polymer composite materials for use as thermal insulation materials, where the ROMP polymer composites have good low temperature impact properties, wherein the ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the present invention provides ROMP polymer materials for use as thermal insulation materials, where the ROMP polymer materials have good corrosion resistance to sea water (salt water).

In another embodiment the present invention provides ROMP polymer materials for use as thermal insulation materials, where the ROMP polymer materials have good corrosion resistance to sea water (salt water), wherein the ROMP polymer materials are a reaction product of a resin composition comprising a cyclic olefin composition and a catalyst composition comprising at least one metal carbene olefin metathesis catalyst.

In another embodiment the present invention provides ROMP polymer materials for use as thermal insulation materials, where the ROMP polymer materials have good corrosion resistance to sea water (salt water), wherein the ROMP polymer materials are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the present invention provides ROMP polymer composite materials for use as thermal insulation materials, where the ROMP polymer composites have good corrosion resistance to sea water (salt water).

In another embodiment the present invention provides ROMP polymer composite materials for use as thermal insulation materials, where the ROMP polymer composites have good corrosion resistance to sea water (salt water), wherein the ROMP polymer composites are a reaction product of a resin composition comprising a cyclic olefin composition and a catalyst composition comprising at least one metal carbene olefin metathesis catalyst.

In another embodiment the present invention provides ROMP polymer composite materials for use as thermal insulation materials, where the ROMP polymer composites have good corrosion resistance to sea water (salt water), wherein the ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the present invention provides ROMP polymer materials for use as thermal insulation materials, where the ROMP polymer materials have good thermal conductivity (e.g., low k value).

In another embodiment the present invention provides ROMP polymer materials for use as thermal insulation materials, where the ROMP polymer materials have good thermal conductivity (e.g., low k value), wherein the ROMP polymer materials are a reaction product of a resin composition comprising a cyclic olefin composition and a catalyst composition comprising at least one metal carbene olefin metathesis catalyst.

In another embodiment the present invention provides ROMP polymer materials for use as thermal insulation materials, where the ROMP polymer materials have good thermal conductivity (e.g., low k value), wherein the ROMP polymer materials are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the present invention provides ROMP polymer composite materials for use as thermal insulation materials, where the ROMP polymer composites have good thermal conductivity (e.g., low k value).

In another embodiment the present invention provides ROMP polymer composite materials for use as thermal insulation materials, where the ROMP polymer composites have good thermal conductivity (e.g., low k value), wherein the ROMP polymer composites are a reaction product of a resin composition comprising a cyclic olefin composition and a catalyst composition comprising at least one metal carbene olefin metathesis catalyst.

In another embodiment the present invention provides ROMP polymer composite materials for use as thermal insulation materials, where the ROMP polymer composites have good thermal conductivity (e.g., low k value), wherein the ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

The ROMP polymers and/or ROMP polymer composites of the invention may be applied to an object using a variety of methods known in the art. In one method, a form or mold is placed or constructed around the object to be insulated. The resin composition comprising at least one cyclic olefin and the catalyst composition comprising at least one metal carbene olefin metathesis catalyst are combined to form a ROMP composition and the ROMP composition is the applied between the object and the mold and the ROMP composition is then subjected to conditions effective to cure the ROMP composition. Once the ROMP composition has cured, the mold is removed.

The ROMP polymers and/or ROMP polymer composites of the invention may be applied to an object using a variety of methods known in the art. In one method, a form or mold is placed or constructed around the object to be insulated. The resin composition comprising a cyclic olefin composition and the catalyst composition comprising at least one metal carbene olefin metathesis catalyst are combined to form a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation, and the ROMP composition is the applied between the object and the mold and the ROMP composition is then subjected to conditions effective to cure the ROMP composition. Once the ROMP composition has cured, the mold is removed.

The ROMP polymer and/or ROMP polymer composite thermal insulation materials of the invention need not necessarily be molded around an object to be insulated. In the alternative, a ROMP polymer article and/or ROMP polymer composite article may be independently prepared and then subsequently affixed to or placed around an object to thermally insulate the object from the surrounding environment. Moreover, the means for affixing a ROMP polymer article and/or ROMP polymer composite article to an object may be by any known means including an adhesive means and/or mechanical means such as fasteners, bolts, screws, etc. For example, a ROMP polymer thermal insulation material and/or a ROMP polymer composite thermal insulation material can be pre-made into sections which are shaped to complement the object to be insulated. The pre-made sections may then be secured or affixed to the object using any known means. wherein the ROMP polymer and/or ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation The ROMP polymer and/or ROMP polymer composite thermal insulation materials of the invention, wherein the ROMP polymer and/or ROMP polymer composite thermal insulation materials are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, need not necessarily be molded around an object to be insulated. In the alternative, a ROMP polymer article and/or ROMP polymer composite article may be independently prepared and then subsequently affixed to or placed around an object to thermally insulate the object from the surrounding environment. Moreover, the means for affixing a ROMP polymer article and/or ROMP polymer composite article to an object may be by any known means including an adhesive means and/or mechanical means such as fasteners, bolts, screws, etc. For example, a ROMP polymer thermal insulation material and/or a ROMP polymer composite thermal insulation material can be pre-made into sections which are shaped to complement the object to be insulated. The pre-made sections may then be secured or affixed to the object using any known means.

The thermal insulation material compositions and/or ROMP polymer compositions and/or ROMP polymer composite compositions of the invention can be formulated so as to have a wide range of tunable cure times.

The thermal insulation material compositions and/or ROMP polymer compositions and/or ROMP polymer composite compositions of the invention can be formulated so as to have a wide range of tunable cure times, wherein the ROMP polymer compositions and/or ROMP polymer composite compositions comprise a resin composition comprising a cyclic olefin composition contacted with a catalyst composition comprising at least one metal carbene olefin metathesis catalysts.

The thermal insulation material compositions and/or ROMP polymer compositions and/or ROMP polymer composite compositions of the invention can be formulated so as to have a wide range of tunable cure times, wherein the ROMP polymer compositions and/or ROMP polymer composite compositions comprise a resin composition comprising a cyclic olefin composition contacted with a catalyst composition comprising at least one metal carbene olefin metathesis catalysts, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a method of thermally insulating an object from a surrounding fluid, the method comprising interposing a thermal insulation material between the object and the fluid wherein the thermal insulation material comprises the reaction product of at least one cyclic olefin and at least one metal carbene olefin metathesis catalyst.

In another embodiment the invention provides a method of thermally insulating an object from a surrounding fluid, the method comprising interposing a thermal insulation material between the object and the fluid wherein the thermal insulation material comprises the reaction product of a resin composition comprising a cyclic olefin composition and at least one metal carbene olefin metathesis catalyst.

In another embodiment the invention provides a method of thermally insulating an object from a surrounding fluid, the method comprising interposing a thermal insulation material between the object and the fluid wherein the thermal insulation material comprises the reaction product of a resin composition comprising a cyclic olefin composition and at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a method of thermally insulating an object from a surrounding fluid, the method comprising interposing a thermal insulation material between the object and the fluid wherein the thermal insulation material comprises the reaction product of at least one cyclic olefin and at least one metal carbene olefin metathesis catalyst, wherein the interposition of the thermal insulation material is achieved by positioning a mold a predetermined distance from the object and applying the thermal insulation material between the object and the mold, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or combinations thereof.

In another embodiment the invention provides a method of thermally insulating an object from a surrounding fluid, the method comprising interposing a thermal insulation material between the object and the fluid wherein the thermal insulation material comprises the reaction product of a resin composition comprising a cyclic olefin composition and at least one metal carbene olefin metathesis catalyst, wherein the interposition of the thermal insulation material is achieved by positioning a mold a predetermined distance from the object and applying the thermal insulation material between the object and the mold, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or combinations thereof.

In another embodiment the invention provides a method of thermally insulating an object from a surrounding fluid, the method comprising interposing a thermal insulation material between the object and the fluid wherein the thermal insulation material comprises the reaction product of a resin composition comprising a cyclic olefin composition and at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the interposition of the thermal insulation material is achieved by positioning a mold a predetermined distance from the object and applying the thermal insulation material between the object and the mold, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or combinations thereof.

In another embodiment the invention provides a method of thermally insulating an object from a surrounding fluid, the method comprising interposing a thermal insulation material between the object and the fluid where the thermal insulation material comprises a ROMP composition.

In another embodiment the invention provides a method of thermally insulating an object from a surrounding fluid, the method comprising interposing a thermal insulation material between the object and the fluid where the thermal insulation material comprises a ROMP composition, wherein the ROMP composition comprises a resin composition comprising a cyclic olefin composition contacted with a catalyst composition comprising at least one metal carbene olefin metathesis catalysts.

In another embodiment the invention provides a method of thermally insulating an object from a surrounding fluid, the method comprising interposing a thermal insulation material between the object and the fluid where the thermal insulation material comprises a ROMP composition, wherein the ROMP composition comprises a resin composition comprising a cyclic olefin composition contacted with a catalyst composition comprising at least one metal carbene olefin metathesis catalysts, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a method of thermally insulating an object from a surrounding fluid, the method comprising interposing a thermal insulation material between the object and the fluid where the thermal insulation material comprises a ROMP composition, wherein the interposition of the thermal insulation material is achieved by positioning a mold a predetermined distance from the object and applying the thermal insulation material between the object and the mold, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or combinations thereof.

In another embodiment the invention provides a method of thermally insulating an object from a surrounding fluid, the method comprising interposing a thermal insulation material between the object and the fluid where the thermal insulation material comprises a ROMP composition, wherein the ROMP composition comprises a resin composition comprising a cyclic olefin composition contacted with a catalyst composition comprising at least one metal carbene olefin metathesis catalysts, wherein the interposition of the thermal insulation material is achieved by positioning a mold a predetermined distance from the object and applying the thermal insulation material between the object and the mold, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or combinations thereof.

In another embodiment the invention provides a method of thermally insulating an object from a surrounding fluid, the method comprising interposing a thermal insulation material between the object and the fluid where the thermal insulation material comprises a ROMP composition, wherein the ROMP composition comprises a resin composition comprising a cyclic olefin composition contacted with a catalyst composition comprising at least one metal carbene olefin metathesis catalysts, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the interposition of the thermal insulation material is achieved by positioning a mold a predetermined distance from the object and applying the thermal insulation material between the object and the mold, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or combinations thereof.

In another embodiment the invention provides a method of thermally insulating an object from a surrounding fluid, the method comprising interposing a thermal insulation material between the object and the fluid, where the thermal insulation material comprises a ROMP polymer.

In another embodiment the invention provides a method of thermally insulating an object from a surrounding fluid, the method comprising interposing a thermal insulation material between the object and the fluid, where the thermal insulation material comprises a ROMP polymer, wherein the ROMP polymer is a reaction product of a resin composition comprising a cyclic olefin composition and a catalyst composition comprising at least one metal carbene olefin metathesis catalyst.

In another embodiment the invention provides a method of thermally insulating an object from a surrounding fluid, the method comprising interposing a thermal insulation material between the object and the fluid, where the thermal insulation material comprises a ROMP polymer, wherein the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a method of thermally insulating an object from a surrounding fluid, the method comprising interposing a thermal insulation material between the object and the fluid, where the thermal insulation material comprises a ROMP polymer, wherein the interposition of the thermal insulation material is achieved by positioning a mold a predetermined distance from the object and applying the thermal insulation material between the object and the mold, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or combinations thereof.

In another embodiment the invention provides a method of thermally insulating an object from a surrounding fluid, the method comprising interposing a thermal insulation material between the object and the fluid, where the thermal insulation material comprises a ROMP polymer, wherein the ROMP polymer is a reaction product of a resin composition comprising a cyclic olefin composition and a catalyst composition comprising at least one metal carbene olefin metathesis catalyst, wherein the interposition of the thermal insulation material is achieved by positioning a mold a predetermined distance from the object and applying the thermal insulation material between the object and the mold, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or combinations thereof.

In another embodiment the invention provides a method of thermally insulating an object from a surrounding fluid, the method comprising interposing a thermal insulation material between the object and the fluid, where the thermal insulation material comprises a ROMP polymer, wherein the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the interposition of the thermal insulation material is achieved by positioning a mold a predetermined distance from the object and applying the thermal insulation material between the object and the mold, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or combinations thereof.

In another embodiment the invention provides a method for coating at least a portion of at least one surface of an object with a thermal insulation material, comprising: combining a resin composition comprising at least one cyclic olefin with a catalyst composition comprising at least one metal carbene olefin metathesis catalyst, thereby forming a thermal insulation material composition; applying the thermal insulation material composition to the at least a portion of at least one surface of the object; and subjecting the thermal insulation material composition to conditions effective to promote ROMP reaction of the at least one cyclic olefin in the presence of the at least one metal carbene olefin metathesis catalyst, wherein the thermal insulation material is a ROMP polymer or a ROMP polymer composite.

In another embodiment the invention provides a method for coating at least a portion of at least one surface of an object with a thermal insulation material, comprising: combining a resin composition comprising a cyclic olefin composition with a catalyst composition comprising at least one metal carbene olefin metathesis catalyst, thereby forming a thermal insulation material composition; applying the thermal insulation material composition to the at least a portion of at least one surface of the object; and subjecting the thermal insulation material composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating at least a portion of at least one surface of an object with a thermal insulation material, comprising: combining a resin composition comprising a cyclic olefin composition with a catalyst composition comprising at least one metal carbene olefin metathesis catalyst, thereby forming a thermal insulation material composition, wherein the cyclic olefin composition comprises 10.0 mol % to 80.0 mol % of at least one cyclic olefin containing multiunsaturation, and up to 90.0 mol % of at least one cyclic olefin containing monounsaturation; applying the thermal insulation material composition to the at least a portion of at least one surface of the object; and subjecting the thermal insulation material composition to conditions effective to promote ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating at least a portion of an object with a thermal insulation material, comprising: combining a resin composition comprising at least one cyclic olefin with a catalyst composition comprising at least one metal carbene olefin metathesis catalyst, thereby forming a thermal insulation material composition; applying the thermal insulation material composition to the at least a portion of at least one surface of the object; and subjecting the thermal insulation material composition to conditions effective to promote a ROMP reaction of the at least one cyclic olefin in the presence of the at least one metal carbene olefin metathesis catalyst, wherein the thermal insulation material is a ROMP polymer or a ROMP polymer composite.

In another embodiment the invention provides a method for coating at least a portion of an object with a thermal insulation material, comprising: combining a resin composition comprising a cyclic olefin composition with a catalyst composition comprising at least one metal carbene olefin metathesis catalyst, thereby forming a thermal insulation material composition; applying the thermal insulation material composition to the at least a portion of at least one surface of the object; and subjecting the thermal insulation material composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating at least a portion of an object with a thermal insulation material, comprising: combining a resin composition comprising a cyclic olefin composition with a catalyst composition comprising at least one metal carbene olefin metathesis catalyst, thereby forming a thermal insulation material composition, wherein the cyclic olefin composition comprises 10.0 mol % to 80.0 mol % of at least one cyclic olefin containing multiunsaturation, and up to 90.0 mol % of at least one cyclic olefin containing monounsaturation; applying the thermal insulation material composition to the at least a portion of at least one surface of the object; and subjecting the thermal insulation material composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for encasing at least a portion of an object with a thermal insulation material, comprising: combining a resin composition comprising at least one cyclic olefin with a catalyst composition comprising at least one metal carbene olefin metathesis catalyst, thereby forming a thermal insulation material composition; applying the thermal insulation material composition to the at least a portion of at least one surface of the object; and subjecting the thermal insulation material composition to conditions effective to promote a ROMP reaction of the at least one cyclic olefin in the presence of the at least one metal carbene olefin metathesis catalyst, wherein the thermal insulation material is a ROMP polymer or a ROMP polymer composite.

In another embodiment the invention provides a method for encasing at least a portion of an object with a thermal insulation material, comprising: combining a resin composition comprising a cyclic olefin composition with a catalyst composition comprising at least one metal carbene olefin metathesis catalyst, thereby forming a thermal insulation material composition; applying the thermal insulation material composition to the at least a portion of at least one surface of the object; and subjecting the thermal insulation material composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for encasing at least a portion of an object with a thermal insulation material, comprising: combining a resin composition comprising a cyclic olefin composition with a catalyst composition comprising at least one metal carbene olefin metathesis catalyst, thereby forming a thermal insulation material composition, wherein the cyclic olefin composition comprises 10.0 mol % to 80.0 mol % of at least one cyclic olefin containing multiunsaturation, and up to 90.0 mol % of at least one cyclic olefin containing monounsaturation; applying the thermal insulation material composition to the at least a portion of at least one surface of the object; and subjecting the thermal insulation material composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating at least a portion of at least one surface of an object with a thermal insulation material, comprising: combining a resin composition comprising at least one cyclic olefin with a catalyst composition comprising at least one metal carbene olefin metathesis catalyst, thereby forming a ROMP composition; contacting the ROMP composition with at least a portion of at least one surface of the object; and subjecting the ROMP composition to conditions effective to promote a ROMP reaction of the at least one cyclic olefin in the presence of the at least one metal carbene olefin metathesis catalyst, wherein the thermal insulation material is a ROMP polymer or a ROMP polymer composite.

In another embodiment the invention provides a method for coating at least a portion of at least one surface of an object with a thermal insulation material, comprising: combining a resin composition comprising a cyclic olefin composition with a catalyst composition comprising at least one metal carbene olefin metathesis catalyst, thereby forming a ROMP composition; contacting the ROMP composition with at least a portion of at least one surface of the object; and subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating at least a portion of at least one surface of an object with a thermal insulation material, comprising: combining a resin composition comprising a cyclic olefin composition with a catalyst composition comprising at least one metal carbene olefin metathesis catalyst, thereby forming a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation; contacting the ROMP composition with at least a portion of at least one surface of the object; and subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating an object with a thermal insulation material, comprising: combining a resin composition comprising at least one cyclic olefin with a catalyst composition comprising at least one metal carbene olefin metathesis catalyst, thereby forming a ROMP composition; contacting the ROMP composition with at least a portion of at least one surface of the object; and subjecting the ROMP composition to conditions effective to promote a ROMP reaction of the at least one cyclic olefin in the presence of the at least one metal carbene olefin metathesis catalyst, wherein the thermal insulation material is a ROMP polymer or a ROMP polymer composite.

In another embodiment the invention provides a method for coating an object with a thermal insulation material, comprising: combining a resin composition comprising a cyclic olefin composition with a catalyst composition comprising at least one metal carbene olefin metathesis catalyst; contacting the ROMP composition with at least a portion of at least one surface of the object; and subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating an object with a thermal insulation material, comprising: combining a resin composition comprising a cyclic olefin composition with a catalyst composition comprising at least one metal carbene olefin metathesis catalyst, thereby forming a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation; contacting the ROMP composition with at least a portion of at least one surface of the object; and subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating at least a portion of at least one surface of an object with a thermal insulation material, comprising: combining a resin composition comprising at least one cyclic olefin with a catalyst composition comprising at least one metal carbene olefin metathesis catalyst, thereby forming a ROMP composition; contacting the ROMP composition with at least a portion of at least one surface of the object; and subjecting the ROMP composition to conditions effective to promote a ROMP reaction of the at least one cyclic olefin in the presence of the at least one metal carbene olefin metathesis catalyst, wherein the thermal insulation material is a ROMP polymer or a ROMP polymer composite.

In another embodiment the invention provides a method for coating at least a portion of at least one surface of an object with a thermal insulation material, comprising: combining a resin composition comprising a cyclic olefin composition with a catalyst composition comprising at least one metal carbene olefin metathesis catalyst, thereby forming a ROMP composition; contacting the ROMP composition with at least a portion of at least one surface of the object; and subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating at least a portion of at least one surface of an object with a thermal insulation material, comprising: combining a resin composition comprising a cyclic olefin with a catalyst composition comprising at least one metal carbene olefin metathesis catalyst, thereby forming a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation; contacting the ROMP composition with at least a portion of at least one surface of the object; and subjecting the ROMP composition to conditions effective to promote a ROMP reaction of the at least one cyclic olefin in the presence of the at least one metal carbene olefin metathesis catalyst, wherein the thermal insulation material is a ROMP polymer or a ROMP polymer composite.

In another embodiment the invention provides a method for encasing an object with a thermal insulation material, comprising: combining a resin composition comprising at least one cyclic olefin with a catalyst composition comprising at least one metal carbene olefin metathesis catalyst, thereby forming a ROMP composition; contacting the ROMP composition with the object; and subjecting the ROMP composition to conditions effective to promote a ROMP reaction of the at least one cyclic olefin in the presence of the at least one metal carbene olefin metathesis catalyst, wherein the thermal insulation material is a ROMP polymer or a ROMP polymer composite.

In another embodiment the invention provides a method for encasing an object with a thermal insulation material, comprising: combining a resin composition comprising a cyclic olefin composition with a catalyst composition comprising at least one metal carbene olefin metathesis catalyst; contacting the ROMP composition with the object; and subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for encasing an object with a thermal insulation material, comprising: combining a resin composition comprising a cyclic olefin composition with a catalyst composition comprising at least one metal carbene olefin metathesis catalyst, thereby forming a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation; contacting the ROMP composition with the object; and subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for encasing at least a portion of an object with a thermal insulation material, comprising: combining a resin composition comprising at least one cyclic olefin with a catalyst composition comprising at least one metal carbene olefin metathesis catalyst, thereby forming a ROMP composition; applying the ROMP composition to the at least a portion of the object; and subjecting the ROMP composition to conditions effective to promote a ROMP reaction of the at least one cyclic olefin in the presence of the at least one metal carbene olefin metathesis catalyst, wherein the thermal insulation material is a ROMP polymer or a ROMP polymer composite.

In another embodiment the invention provides a method for encasing at least a portion of an object with a thermal insulation material, comprising: combining a resin composition comprising a cyclic olefin composition with a catalyst composition comprising at least one metal carbene olefin metathesis catalyst; applying the ROMP composition to the at least a portion of the object; and subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for encasing at least a portion of an object with a thermal insulation material, comprising: combining a resin composition comprising a cyclic olefin composition with a catalyst composition comprising at least one metal carbene olefin metathesis catalyst, thereby forming a ROMP composition, wherein the cyclic olefin composition comprises 10.0 mol % to 80.0 mol % of at least one cyclic olefin containing multiunsaturation, and up to 90.0 mol % of at least one cyclic olefin containing monounsaturation; applying the ROMP composition to the at least a portion of the object; and subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

In another embodiment the invention provides a method for coating at least a portion of at least one surface of an object with a thermal insulation material, wherein the thermal insulation material is a reaction product of a resin composition comprising a cyclic olefin composition and a catalyst composition comprising at least one metal carbene olefin metathesis catalyst.

In another embodiment the invention provides a method for coating at least a portion of at least one surface of an object with a thermal insulation material, wherein the thermal insulation material is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

A process for applying a thermal insulation material composition to a pipe, comprising: placing a mold around a pipe to define a cavity between an internal surface of the mold and the pipe; injecting a thermal insulation material composition in the cavity, wherein the thermal insulation material composition comprises a resin composition comprising at least one cyclic olefin and a catalyst composition comprising at least one metal carbene olefin metathesis catalyst; and subjecting the thermal insulation material composition to conditions effective to promote a ROMP reaction between the at least one cyclic olefin and the at least one metal carbene olefin metathesis catalyst.

A process for applying a thermal insulation material composition to a pipe, comprising: placing a mold around a pipe to define a cavity between an internal surface of the mold and the pipe; injecting a thermal insulation material composition in the cavity, wherein the thermal insulation material composition comprises a resin composition comprising a cyclic olefin composition and a catalyst composition comprising at least one metal carbene olefin metathesis catalyst; and subjecting the thermal insulation material composition to conditions effective to promote a ROMP reaction between the cyclic olefin composition and the at least one metal carbene olefin metathesis catalyst.

A process for applying a thermal insulation material composition to a pipe, comprising: placing a mold around a pipe to define a cavity between an internal surface of the mold and the pipe; injecting a thermal insulation material composition in the cavity, wherein the thermal insulation material composition comprises a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation; and subjecting the thermal insulation material composition to conditions effective to promote a ROMP reaction between the at least one cyclic olefin and the at least one metal carbene olefin metathesis catalyst.

A process for applying a thermal insulation material composition to an object, comprising: placing a mold around an object to define a cavity between an internal surface of the mold and the object; injecting a thermal insulation material composition in the cavity, wherein the thermal insulation material composition comprises a resin composition comprising at least one cyclic olefin and a catalyst composition comprising at least one metal carbene olefin metathesis catalyst; and subjecting the thermal insulation material composition to conditions effective to promote a ROMP reaction between the at least one cyclic olefin and the at least one metal carbene olefin metathesis catalyst.

A process for applying a thermal insulation material composition to an object, comprising: placing a mold around an object to define a cavity between an internal surface of the mold and the object; injecting a thermal insulation material composition in the cavity, wherein the thermal insulation material composition comprises a resin composition comprising a cyclic olefin composition and a catalyst composition comprising at least one metal carbene olefin metathesis catalyst; and subjecting the thermal insulation material composition to conditions effective to promote a ROMP reaction between the cyclic olefin composition and the at least one metal carbene olefin metathesis catalyst.

A process for applying a thermal insulation material composition to an object, comprising: placing a mold around an object to define a cavity between an internal surface of the mold and the object; injecting a thermal insulation material composition in the cavity, wherein the thermal insulation material composition comprises a resin composition comprising a cyclic olefin composition and a catalyst composition comprising at least one metal carbene olefin metathesis catalyst, wherein the thermal insulation material composition comprises a resin composition comprising at least one cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation; and subjecting the thermal insulation material composition to conditions effective to promote a ROMP reaction between the at least one cyclic olefin and the at least one metal carbene olefin metathesis catalyst.

A process for applying a thermal insulation material composition to a field joint, comprising: placing a mold around a field joint to define a cavity between an internal surface of the mold and the field joint; injecting a thermal insulation material composition in the cavity, wherein the thermal insulation material composition comprises a resin composition comprising at least one cyclic olefin and a catalyst composition comprising at least one metal carbene olefin metathesis catalyst; and subjecting the thermal insulation material composition to conditions effective to promote a ROMP reaction between the at least one cyclic olefin and the at least one metal carbene olefin metathesis catalyst.

A process for applying a thermal insulation material composition to a field joint, comprising: placing a mold around a field joint to define a cavity between an internal surface of the mold and the field joint; injecting a thermal insulation material composition in the cavity, wherein the thermal insulation material composition comprises a resin composition comprising a cyclic olefin composition and a catalyst composition comprising at least one metal carbene olefin metathesis catalyst; and subjecting the thermal insulation material composition to conditions effective to promote a ROMP reaction between the cyclic olefin composition and the at least one metal carbene olefin metathesis catalyst.

A process for applying a thermal insulation material composition to a field joint, comprising: placing a mold around a field joint to define a cavity between an internal surface of the mold and the field joint; injecting a thermal insulation material composition in the cavity, wherein the thermal insulation material composition comprises a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation; and subjecting the thermal insulation material composition to conditions effective to promote a ROMP reaction between the at least one cyclic olefin and the at least one metal carbene olefin metathesis catalyst.

In another embodiment the invention provides an object at least partially encased by a thermal insulation material, wherein the thermal insulation material comprises the reaction product of at least one cyclic olefin and at least one metal carbene olefin metathesis catalyst.

In another embodiment the invention provides an object at least partially encased by a thermal insulation material, wherein the thermal insulation material comprises the reaction product of a resin composition comprising a cyclic olefin composition and a catalyst composition comprising at least one metal carbene olefin metathesis catalyst.

In another embodiment the invention provides an object at least partially encased by a thermal insulation material, wherein the thermal insulation material comprises the reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides an object at least partially encased by a thermal insulation material, where the thermal insulation material comprises a ROMP composition.

In another embodiment the invention provides an object at least partially encased by a thermal insulation material, where the thermal insulation material comprises a ROMP composition, wherein the ROMP composition comprises a resin composition comprising a cyclic olefin composition and a catalyst composition comprising at least one metal carbene olefin metathesis catalyst.

In another embodiment the invention provides an object at least partially encased by a thermal insulation material, where the thermal insulation material comprises a ROMP composition, wherein the ROMP composition comprises a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides an object at least partially encased by a thermal insulation material, where the thermal insulation material comprises a ROMP polymer or ROMP polymer composite.

In another embodiment the invention provides an object at least partially encased by a thermal insulation material, where the thermal insulation material comprises a ROMP polymer or ROMP polymer composite, where the ROMP polymer or ROMP polymer composite are a reaction product of a resin composition comprising a cyclic olefin composition and a catalyst composition comprising at least one metal carbene olefin metathesis catalyst.

In another embodiment the invention provides an object at least partially encased by a thermal insulation material, where the thermal insulation material comprises a ROMP polymer or ROMP polymer composite, where the ROMP polymer or ROMP polymer composite are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a pipe at least partially encased by a thermal insulation material, where the thermal insulation material comprises the reaction product of at least one cyclic olefin and at least one metal carbene olefin metathesis catalyst.

In another embodiment the invention provides a pipe at least partially encased by a thermal insulation material, where the thermal insulation material comprises the reaction product of a resin composition comprising a cyclic olefin composition and a catalyst composition comprising at least one metal carbene olefin metathesis catalyst.

In another embodiment the invention provides a pipe at least partially encased by a thermal insulation material, where the thermal insulation material comprises the reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a pipe at least partially encased by a thermal insulation material, where the thermal insulation material comprises a ROMP polymer or ROMP polymer composite.

In another embodiment the invention provides a pipe at least partially encased by a thermal insulation material, where the thermal insulation material comprises a ROMP polymer or ROMP polymer composite, where the ROMP polymer or ROMP polymer composite are a reaction product of a resin composition comprising a cyclic olefin composition and a catalyst composition comprising at least one metal carbene olefin metathesis catalyst.

In another embodiment the invention provides a pipe at least partially encased by a thermal insulation material, where the thermal insulation material comprises a ROMP polymer or ROMP polymer composite, where the ROMP polymer or ROMP polymer composite are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a field joint at least partially coated with a thermal insulation material, where the thermal insulation material comprises the reaction product of at least one cyclic olefin and at least one metal carbene olefin metathesis catalyst.

In another embodiment the invention provides a field joint at least partially coated with a thermal insulation material, where the thermal insulation material comprises the reaction product of a resin composition comprising a cyclic olefin composition and a catalyst composition comprising at least one metal carbene olefin metathesis catalyst.

In another embodiment the invention provides a field joint at least partially coated with a thermal insulation material, where the thermal insulation material comprises the reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a field joint at least partially coated with a thermal insulation material, where the thermal insulation material comprises a ROMP polymer or ROMP polymer composite.

In another embodiment the invention provides a field joint at least partially coated with a thermal insulation material, where the thermal insulation material comprises a ROMP polymer or ROMP polymer composite, where the ROMP polymer or ROMP polymer composite are a reaction product of a resin composition comprising a cyclic olefin composition and a catalyst composition comprising at least one metal carbene olefin metathesis catalyst.

In another embodiment the invention provides a field joint at least partially coated with a thermal insulation material, where the thermal insulation material comprises a ROMP polymer or ROMP polymer composite, where the ROMP polymer or ROMP polymer composite are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a field joint at least partially coated with a thermal insulation material, where the thermal insulation material comprises the reaction product of a resin composition comprising at least one cyclic olefin and a catalyst composition comprising at least one metal carbene olefin metathesis catalyst.

In another embodiment the invention provides a field joint at least partially coated with a thermal insulation material, where the thermal insulation material comprises the reaction product of a resin composition comprising a cyclic olefin composition and a catalyst composition comprising at least one metal carbene olefin metathesis catalyst.

In another embodiment the invention provides a field joint at least partially coated with a thermal insulation material, where the thermal insulation material comprises the reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a field joint at least partially encased with a thermal insulation material, where the thermal insulation material comprises the reaction product of at least one cyclic olefin and at least one metal carbene olefin metathesis catalyst.

In another embodiment the invention provides a field joint at least partially encased with a thermal insulation material, where the thermal insulation material comprises the reaction product of a resin composition comprising a cyclic olefin composition and a catalyst composition comprising at least one metal carbene olefin metathesis catalyst.

In another embodiment the invention provides a field joint at least partially encased with a thermal insulation material, where the thermal insulation material comprises the reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a field joint at least partially encased with a thermal insulation material, where the thermal insulation material comprises a ROMP polymer or ROMP polymer composite.

In another embodiment the invention provides a field joint at least partially encased with a thermal insulation material, where the thermal insulation material comprises a ROMP polymer or ROMP polymer composite, where the ROMP polymer or ROMP polymer composite are a reaction product of a resin composition comprising a cyclic olefin composition and a catalyst composition comprising at least one metal carbene olefin metathesis catalyst.

In another embodiment the invention provides a field joint at least partially encased with a thermal insulation material, where the thermal insulation material comprises a ROMP polymer or ROMP polymer composite, where the ROMP polymer or ROMP polymer composite are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a thermal insulation material for use in coating a field joint, the thermal insulation material comprising a resin composition comprising at least one cyclic olefin and at least one metal carbene olefin metathesis catalyst.

In another embodiment the invention provides a thermal insulation material for use in coating a field joint, the thermal insulation material comprising a resin composition comprising a cyclic olefin composition and a catalyst composition comprising at least one metal carbene olefin metathesis catalyst.

In another embodiment the invention provides a thermal insulation material for use in coating a field joint, the thermal insulation material comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides a thermal insulation material for use in coating an object, the thermal insulation material comprising a resin composition comprising at least one cyclic olefin and at least one metal carbene olefin metathesis catalyst.

In another embodiment the invention provides a thermal insulation material for use in coating an object, the thermal insulation material comprising a resin composition comprising cyclic olefin composition and a catalyst composition comprising at least one metal carbene olefin metathesis catalyst.

In another embodiment the invention provides a thermal insulation material for use in coating an object, the thermal insulation material comprising a resin composition comprising cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides for use of at least one thermal insulation material composition for coating at least a portion of at least one surface of an object, wherein the at least one thermal insulation material composition comprises a resin composition comprising at least one cyclic olefin and a catalyst composition comprising at least one metal carbene olefin metathesis catalyst.

In another embodiment the invention provides for use of at least one thermal insulation material composition for coating at least a portion of at least one surface of an object, wherein the at least one thermal insulation material composition comprises a resin composition comprising a cyclic olefin composition and a catalyst composition comprising at least one metal carbene olefin metathesis catalyst.

In another embodiment the invention provides for use of at least one thermal insulation material composition for coating at least a portion of at least one surface of an object, wherein the at least one thermal insulation material composition comprises a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides for use of at least one thermal insulation material for coating at least a portion of at least one surface of an object, wherein the at least one thermal insulation material comprises a ROMP polymer or a ROMP polymer composite.

In another embodiment the invention provides for use of at least one thermal insulation material for coating at least a portion of at least one surface of an object, wherein the at least one thermal insulation material comprises a ROMP polymer or a ROMP polymer composite, where the ROMP polymer or ROMP polymer composite are a reaction product of a resin composition comprising a cyclic olefin composition and a catalyst composition comprising at least one metal carbene olefin metathesis catalyst.

In another embodiment the invention provides for use of at least one thermal insulation material for coating at least a portion of at least one surface of an object, wherein the at least one thermal insulation material comprises a ROMP polymer or a ROMP polymer composite, where the ROMP polymer or ROMP polymer composite are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

In another embodiment the invention provides an article of manufacture comprising an object, wherein at least a portion of at least one surface of the object is coated with a ROMP polymer, wherein the ROMP polymer is a reaction product of a resin composition comprising a cyclic olefin composition and a catalyst composition comprising at least one metal carbene olefin metathesis catalyst.

In another embodiment the invention provides an article of manufacture comprising an object, wherein at least a portion of at least one surface of the object is coated with a ROMP polymer, wherein the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted.

In another embodiment the invention provides for articles of manufacture made by any of the methods described herein.

Embodiments herein are not meant to be construed in a limiting sense. Various modifications in form and detail of the embodiments of the invention, as well as other aspects and variations of the invention, will be apparent to the skilled artisan in light of the following detailed description and examples.

BRIEF DESCRIPTION OF THE DRAWINGS

Various other objects, features and attendant advantages of the present invention will be more fully appreciated as the same becomes better understood when considered in conjunction with the accompanying drawings/figures, wherein.

DETAILED DESCRIPTION

Terminology and Definitions

Figure 1:
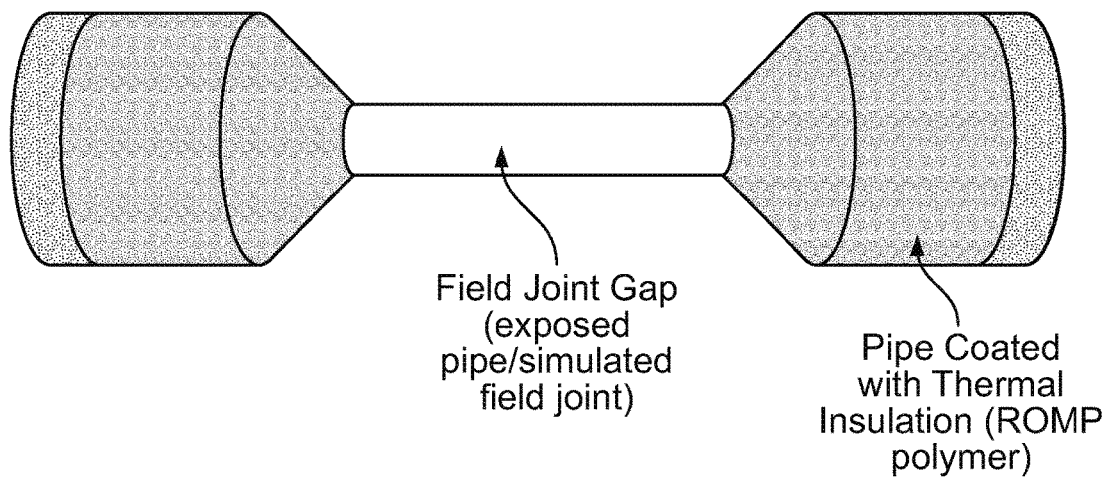
FIG. 1 shows a pipe coated with a thermal insulation material comprising a ROMP polymer of Example 2, where an exposed section of the pipe is simulating a field joint.

Unless otherwise indicated, the invention is not limited to specific reactants, substituents, catalysts, catalyst compositions, resin compositions, cyclic olefins, reaction conditions, or the like, as such may vary. It is also to be understood that the terminology used herein is for the purpose of describing particular embodiments only and is not to be interpreted as being limiting.

As used in the specification and the appended claims, the singular forms "a," "an," and "the" include plural referents unless the context clearly dictates otherwise. Thus, for example, reference to "an α-olefin" includes a single α-olefin as well as a combination or mixture of two or more α-olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl, and the like. Generally, although again not necessarily, alkyl groups herein contain 1 to about 12 carbon atoms. The term "lower alkyl" refers to an alkyl group of 1 to 6 carbon atoms, and the specific term "cycloalkyl" refers to a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term "lower alkenyl" refers to an alkenyl group of 2 to 6 carbon atoms, and the specific term "cycloalkenyl" refers to a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" refers to an alkynyl group of 2 to 6 carbon atoms. The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include linear, branched, unsubstituted, substituted, and/or heteroatom-containing alkynyl and lower alkynyl, respectively.

The term "alkoxy" as used herein refers to an alkyl group bound through a single, terminal ether linkage; that is, an "alkoxy" group may be represented as —O-alkyl where alkyl is as defined above. A "lower alkoxy" group refers to an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 5 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 5 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, —(CO)-aralkyl, —(CO)-alkaryl, —(CO)-alkenyl, or —(CO)-alkynyl, and the term "acyloxy" refers to substituents having the formula —O(CO)-alkyl, —O(CO)-aryl, —O(CO)-aralkyl, —O(CO)-alkaryl, —O(CO)-alkenyl, —O(CO)-alkynyl wherein "alkyl," "aryl," "aralkyl", alkaryl, alkenyl, and alkynyl are as defined above.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic.

The terms "halo" and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, alkynyl groups, aryl groups, and the like. The term "lower hydrocarbyl" intends a hydrocarbyl group of 1 to 6 carbon atoms, preferably 1 to 4 carbon atoms, and the term "hydrocarbylene" refers to a divalent hydrocarbyl moiety containing 1 to about 30 carbon atoms, preferably 1 to about 24 carbon atoms, most preferably 1 to about 12 carbon atoms, including linear, branched, cyclic, saturated, and unsaturated species. The term "lower hydrocarbylene" refers to a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and heteroatom-containing hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus, or silicon, typically nitrogen, oxygen, or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl"

and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include without limitation alkoxyaryl, alkylsulfanyl-substituted alkyl, N-alkylated amino alkyl, and the like. Examples of heteroaryl substituents include without limitation pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups include without limitation pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO$^-$), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), di-N—($C_1$-$C_{24}$ alkyl), N—($C_5$-$C_{24}$ aryl)-substituted carbamoyl (—(CO)—N($C_1$-$C_{24}$ alkyl)($C_5$-$C_{24}$ aryl), thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), di-N—($C_1$-$C_{24}$ alkyl), N—($C_5$-$C_{24}$ aryl)-substituted thiocarbamoyl (—(CS)—N($C_1$-$C_{24}$ alkyl)($C_5$-$C_{24}$ aryl), carbamido (—NH—(CO)—NH$_2$), cyano (—C≡N), cyanato (—O—C≡N), thiocyanato (—S—C≡N), isocyanate (—N=C=O), thioisocyanate (—N=C=S), formyl (—(CO)—H), thioformyl (—(CS)—H), amino (—NH$_2$), mono-($C_1$-$C_{24}$ alkyl)-substituted amino (—NH($C_1$-$C_{24}$ alkyl), di-($C_1$-$C_{24}$ alkyl)-substituted amino (—N($C_1$-$C_{24}$ alkyl)$_2$), mono-($C_5$-$C_{24}$ aryl)-substituted amino (—NH($C_5$-$C_{24}$ aryl), di-($C_5$-$C_{24}$ aryl)-substituted amino (—N($C_5$-$C_{24}$ aryl)$_2$), $C_2$-$C_{24}$ alkylamido (—NH—(CO)-alkyl), $C_6$-$C_{24}$ arylamido (—NH—(CO)-aryl), imino (—CR=NH where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR=N(alkyl), where R includes without limitation hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R includes without limitation hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O$^-$), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl (—SO$_2$—N(H) alkyl), $C_1$-$C_{24}$ dialkylaminosulfonyl (—SO$_2$—N(alkyl)$_2$), $C_5$-$C_{24}$ arylsulfonyl (—SO$_2$-aryl), boryl (—BH$_2$), borono (—B(OH)$_2$), boronato (—B(OR)$_2$ where R includes without limitation alkyl or other hydrocarbyl), phosphono (—P(O)(OH)$_2$), phosphonato (—P(O)(O$^-$)$_2$), phosphinato (—P(O)(O$^-$)), phospho (—PO$_2$), and phosphino (—PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically mentioned above. Analogously, the above-mentioned hydrocarbyl moieties may be further substituted with one or more functional groups or additional hydrocarbyl moieties as noted above.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The term "substrate material" as used herein, is intended to generally mean any material that the resin compositions of the invention may be contacted with, applied to, or have the substrate material incorporated in to the resin. Without limitation, such materials include reinforcing materials, such as filaments, fibers, rovings, mats, weaves, fabrics, knitted material, cloth or other known structures, glass fibers and fabrics, carbon fibers and fabrics, aramid fibers and fabrics, and polyolefin or other polymer fibers or fabrics. Other suitable substrate materials include metallic density modulators, microparticulate density modulators, such as microspheres, glass microspheres, ceramic microspheres, microballoons, cenospheres, and macroparticulate density modulators, such as glass or ceramic beads. A ROMP polymer composite may be comprised of one substrate material or a mixture of different substrate materials.

The term "polymer backbone" is intended to mean the chains of atoms in a polymer that comprise the main chain and any crosslinks, if it is a crosslinked polymer.

The term "field joint" as used herein, is intended to generally mean a connection between adjoining members or parts, made at the time of installation (i.e. in the field). The term "field joint" is a term of art often used to describe the welded ends of individual lengths of pipe. For example, pipelines used to transport oil and/or gas is most often formed from many individual pieces of pipe, for example steel pipe. During the manufacturing of individual pieces of pipe, an anti-corrosion coating is often applied to the exterior surface of the pipe in such a manner that the exterior surface of the pipe ends remains uncoated. Furthermore, the pipe may be subsequently coated with an insulation material; however, the exterior surface of the pipe ends still remains uncoated. The pipeline is formed by connecting the individual pieces of pipe by welding together the uncoated pipe ends. At least part of this welding process may take place at an onshore facility prior to loading the pipe on a lay barge or reel ship, with the remainder of the connections made offshore prior to the pipeline being deployed in offshore use. In the alternative, during the manufacturing of individual pieces of pipe, an anti-corrosion coating may be applied to the exterior surface of the pipe in such a manner that the exterior surface of the pipe ends are also coated. In this instance, the anti-corrosion coating must be removed from the pipe ends prior to welding.

As used herein, the term "octyl norbornene" and/or the abbreviation "ONB" refers to 5-octyl-2-norbornene including endo/exo stereoisomers, and mixtures thereof. As used herein, the term "tolyl norbornene" and/or the abbreviation "Tolyl-NB" refers to 5-tolyl-2-norbornene including endo/exo stereoisomers, as well as para, ortho, and/or meta structural isomers, and mixtures thereof. As used herein, the term "decyl norbornene" and/or the abbreviation "DNB" refers to 5-decyl-2-norbornene including endo/exo stereoisomers, and mixtures thereof. As used herein, the term "hexyl norbornene" and/or the abbreviation "HNB" refers to 5-hexyl-2-norbornene including endo/exo stereoisomers, and mixtures thereof. As used herein, the term "phenyl norbornene" and/or the abbreviation "Phenyl-NB" refers to 5-phenyl-2-norbornene including endo/exo stereoisomers, and mixtures thereof.

As is known in the art, weight percent (wt %) can be represented by gas chromatography (GC) percent area (area %). Hence, GC area % obtained from the GC was reported as wt %. Weight percent (wt %) and percent by weight are used interchangeably herein. Mol percent (mol %) was calculated from the weight percent (wt %) as is known in the art.

Thermal Insulation

The present invention is directed to addressing one or more of the aforementioned concerns and relates to thermal insulation materials and thermal insulation material compositions and methods for thermally insulating pipelines and associated equipment, structures, and objects used in offshore drilling. The present invention is also relates to articles of manufacture comprising the thermal insulation materials and/or thermal insulation material compositions of the invention.

It was unexpected that thermal insulation materials and/or thermal insulation material compositions and/or ROMP polymer and/or ROMP polymer compositions of the present invention would possess all of the desired characteristics and/or properties specified above for thermal insulation materials, in particular thermal insulation materials used in offshore drilling (e.g. subsea applications). As such, the thermal insulation materials and/or thermal insulation material compositions and/or ROMP polymer and/or ROMP polymer compositions of the present invention disclosed herein satisfy this need in the industry. where the ROMP polymer or ROMP polymer composite are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation.

ROMP polymers and/or ROMP polymer composites where the ROMP polymer or ROMP polymer composite are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation offer improved thermal stability and/or improved hydrolytic stability over prior art thermal insulation materials. In particular, thermal insulation materials made from ROMP polymers where the ROMP polymer or is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, offer an advantage over prior art thermal insulation materials made from polypropylene in such ROMP polymers possess improved thermal stability.

Moreover, thermal insulation materials made from ROMP polymers where the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation offer an advantage over prior art thermal insulation materials made from polyurethane and epoxy based materials, including elastomeric amine cured epoxy materials, in that cyclic olefins (cyclic olefin monomers) used to make such ROMP polymers may be selected so that the resultant ROMP polymers do not contain carbon-heteroatom bonds in the polymer backbone. Therefore, ROMP polymers where the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation are generally more hydrolytically stable than polyurethanes and/or epoxy based polymers, each of which possess carbon-heteroatom bonds in the polymer backbone. Preferentially, ROMP polymers where the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, possess a polymer backbone containing only carbon-carbon single bonds and carbon-carbon double bonds, where the carbon atoms may be substituted or unsubstituted.

Moreover, ROMP compositions of the invention used to prepare ROMP polymers and/or ROMP polymer composites, where the ROMP polymers and/or ROMP polymer composites are a reaction product of a ROMP composition, the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, are generally less sensitive to air and/or moisture than resins used to prepare polyurethane and epoxy based polymers and DCPD polymers prepared from molybdenum and tungsten catalyzed DCPD resins (e.g., Telene® DCPD Resin, Metton® DCPD Resin, Pentam® DCPD Resin). Therefore ROMP compositions comprising resin compositions comprising cyclic olefin compositions, wherein the cyclic olefin composition comprises 10.0 mol % to 80.0 mol % of at least one cyclic olefin containing multiunsaturation, and up to 90.0 mol % of at least one cyclic olefin containing monounsaturation, and catalyst compositions comprising at least one metal carbene olefin metathesis catalyst are generally more robust to a wider array of environmental conditions (e.g., temperature, humidity, etc.) Resin systems that are less sensitive to air and/or moisture offer a benefit over more sensitive resin systems, particularly if objects are to be coated (thermally insulated) at on-site marine environments, such as on boats, offshore oil rigs, offshore oil platforms, etc.

Furthermore, ROMP polymers of the invention, where the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation may be optionally hydrogenated by any known method, to provide a hydrogenated ROMP polymer for use as thermal insulation.

Furthermore, ROMP compositions of the invention, the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, offer improved ease of application over prior art resin compositions, particularly polypropylene systems. Unlike polypropylene systems, which are primarily limited to extrusion, ROMP compositions of the invention, the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, can be applied to an object and/or object surface by a variety of means including but not limited to pouring, casting, infusing, injecting, molding, spraying, rotationally molding, centrifugally casting, pultrusion, extrusion, etc. Moreover, ROMP compositions of the invention, the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, also offer improved ease of application over prior art resin compositions based on epoxy resins (e.g., elastomeric amine cured epoxy materials). Unlike epoxy based resin systems (e.g., elastomeric amine cured epoxy materials), which are synthesized in at least two steps, ROMP compositions of the invention, the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, simply require a single mixing step (e.g. a resin composition comprising a cyclic olefin composition is mixed with a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation) prior to application to an object surface or addition to a mold. Unlike DCPD resin systems containing molybdenum or tungsten two-component catalyst systems (e.g., Telene® DCPD Resin, Metton® DCPD Resin, Pentam® DCPD Resin), which require specialized and expensive processing and handling conditions and equipment, including specialized and expensive molds, injection equipment, and storage tanks, cyclic olefin compositions and/or resin compositions and/or ROMP compositions of the invention the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation can be applied to an object and/or object surface by a variety of means including but not limited to simple casting.

Furthermore, ROMP compositions of the invention the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, possess much lower viscosity over a broader range of temperatures than epoxy based resin systems. The low viscosity of ROMP compositions of the invention the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, is particularly advantageous as it promotes flow especially when filling complex molds. Moreover, the low viscosity of cyclic olefin resin compositions also allows for high loading of substrate materials (e.g. glass or ceramic microspheres) which may enhance the insulating capabilities of the resulting ROMP polymer. Suitable resin compositions for use with this invention having a viscosity at 25° C. ranging from about 1 centipoise to about 200 centipoise (1 cP-200 cP). Viscosities typically range from 1-150 cP, 1-100 cP, 5-100 cP, 5-150 cP, 5-25 cP, 5-50 cP, 5-15 cP, 5-20 cP at 25° C. At other temperatures −20° C., −10° C., 0° C., 5° C., 15° C., 25° C., 30° C., 40° C., 50° C., 60° C., viscosities may range from 1-150 cP, 1-100 cP, 5-100 cP, 5-150 cP, 5-25 cP, 5-50 cP, 5-15 cP, 5-20 cP.

A particular benefit of the ROMP compositions of the invention, the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, is that these compositions are easy to handle and can be easily formulated such that the resultant ROMP polymer(s) meet the needs/requirements of the application or service. For example, ROMP compositions the ROMP composition comprising a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, used to prepare ROMP polymers of the invention can be easily formulated such that the resultant ROMP polymer(s) may exhibit a range of physical, mechanical and/or thermal properties spanning the range from elastomeric behavior and/or properties to rigid thermoset behavior and/or properties depending on the needs/requirements of the application.

ROMP polymers and/or ROMP polymer composites of the present invention where the ROMP polymer and/or ROMP polymer composite is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation can be used to thermally insulate any object from a surrounding environment or surrounding material, where the surrounding environment or surrounding material may be a gas (e.g. air), a fluid (liquid) (e.g., sea water, fresh water), or a solid (e.g. ice or subterranean solids as in the case of a buried pipeline), or a mixture thereof. In particular, ROMP polymers and/or ROMP polymer composites of the present invention where the ROMP polymer and/or ROMP polymer composite is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation are suitable for thermal insulation of objects, such as oil pipelines in cold water (e.g. cold sea water, cold fresh water) and for insulating wellhead equipment. The ROMP polymers and/or ROMP polymer composites of the present invention where the ROMP polymer and/or ROMP polymer composite is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, may also be used for insulating other objects including but not limited to pipes, pipelines, pipe fittings, hose, hose fitting, tanks, containers, drums, manifolds, risers, field joints, configurations designated as Christmas trees (oil field Christmas tree, subsea Christmas tree), jumpers, spool pieces, configurations designated as pipeline end termination (PLET), configurations designated as pipeline end manifolds (PLEM), and other sub-sea architectures and equipment. The ROMP polymers and/or ROMP polymer composites of the present invention where the ROMP polymers and/or ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation may also be used to coat other objects such as robotic parts, devices and vehicles used in sub-sea applications. Moreover, ROMP polymers and/or ROMP polymer composites of the present invention where the ROMP polymers and/or ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation may be used to construct thermal insulation structures such as configurations designated as subsea dog houses.

While ROMP polymers and/or ROMP polymer composites of the invention where the ROMP polymers and/or ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation are well suited for coating objects which are to be submerged in water (e.g. fresh water, salt water, sea water, etc.) the ROMP polymers and/or ROMP polymer composites may also be used to coat objects which are not exposed to an aqueous environment.

ROMP polymers and/or ROMP polymer composites of the present invention where the ROMP polymers and/or ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation may be used for coating (insulating) objects (e.g., pipes and/or other subsea structures) where the temperature of materials (e.g., hydrocarbons, oil, gas, etc.) transported by the objects (e.g., pipes and/or other structures) is greater than or equal to 160° C. Therefore, by default, ROMP polymers and/or ROMP polymer composites of the present invention where the ROMP polymers and/or ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation of the present invention may also be used for coating (insulating) objects (e.g., pipes and/or other subsea structures) where the temperature of materials (e.g., hydrocarbons, oil, gas, etc.) transported by the objects (e.g., pipes and/or other subsea structures) is less than 160° C.

ROMP polymers and/or ROMP polymer composites of the present invention where the ROMP polymers and/or ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation of the present invention have thermal conductivity values of less than 0.180 W/m*K, as determined by ASTM C518, as tested on heat flow instrument (FOX-50, Laser-Comp). ROMP polymers and/or ROMP polymer composites of the present invention where the ROMP polymers and/or ROMP polymer composites are a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation of the present invention may be further reduced by the addition of glass microspheres. These and other aspects and benefits of the invention will be apparent to the skilled artesian in light of the following detailed description and examples herein.

Adhesion Promoters

Adhesion promoters that may be used in the present invention disclosed herein are generally compounds containing at least two isocyanate groups (such as, for example, methylene diphenyl diisocyanate and hexamethylene diisocyanate). The adhesion promoter may be a diisocyanate, triisocyanate, or polyisocyanate (i.e., containing four or more isocyanate groups). The adhesion promoter may be a mixture of at least one diisocyanate, triisocyanate, or polyisocyanate. In a more particular aspect of the invention, the adhesion promoter comprises, or is limited to, a diisocyanate compound, or mixtures of diisocyanate compounds.

In general, adhesion promoters that may be used in the present invention may be any compound having at least two isocyanate groups. Suitable adhesion promoters include, without limitation, isocyanate compounds comprising at least two isocyanate groups, and wherein the compounds are selected from hydrocarbyl, substituted hydrocarbyl, heteroatom-containing hydrocarbyl, substituted heteroatom-containing hydrocarbyl, and functionalized hydrocarbyl compounds. As described above, suitable hydrocarbyl adhesion promoter compounds generally include alkyl, cycloalkyl, alkylene, alkenyl, alkynyl, aryl, cycloalkyl, alkaryl, and aralkyl compounds. Substituted heteroatom-containing, and functionalized hydrocarbyl adhesion promoter compounds include the afore-mentioned hydrocarbyl compounds, as well as the variations thereof noted hereinabove.

Adhesion promoters that may be used in the present invention may be an alkyl diisocyanate. An alkyl diisocyanate refers to a linear, branched, or cyclic saturated or unsaturated hydrocarbon group typically although not necessarily containing 1 to about 24 carbon atoms, preferably a diisocyanate containing 2 to about 12 carbon atoms, and more preferably a diisocyanate containing 6 to 12 carbon atoms such as hexamethylene diisocyanate (HDI), octamethylene diisocyanate, decamethylene diisocyanate, and the like. Cycloalkyl diisocyanates contain cyclic alkyl group, typically having 4 to 16 carbon atoms. A preferred cycloalkyl diisocyanate containing 6 to about 12 carbon atoms are cyclohexyl, cyclooctyl, cyclodecyl, and the like. A more preferred cycloalkyl diisocyanate originates as a condensation product of acetone called 5-isocyanato-1-(isocyanatomethyl)-1,3,3-trimethyl-cyclohexane, commonly known as Isophorone diisocyanate (IPDI) and the isomers of isocyanato-[(isocyanatocyclohexyl)methyl]cyclohexane ($H_{12}$MDI). $H_{12}$MDI is derived from the hydrogenated form of the aryl diisocyanate methylene diphenyl diisocyanate (MDI).

Adhesion promoters that may be used in the present invention may be an aryl diisocyanate. Aryl diisocyanates refers to aromatic diisocyanates containing a single aromatic ring or multiple aromatic rings that are fused together, directly linked, or indirectly linked (such that the different aromatic rings are bound to a common group such as a methylene or ethylene moiety). Preferred aryl diisocyanates contain 5 to 24 carbon atoms, and particularly preferred aryl diisocyanates contain 5 to 14 carbon atoms. Exemplary aryl diisocyanates contain one aromatic ring or two fused or linked aromatic rings, e.g., phenyl, tolyl, xylyl, naphthyl, biphenyl, diphenylether, benzophenone, and the like. Preferred aromatic diisocyanates include toluene diisocyanates, tetramethylxylene diisocyanate (TMXDI), and methylene diphenyl diisocyanate (MDI), which may comprise any mixture of its three isomers, 2.2'-MDI, 2,4'-MDI, and 4,4'-MDI.

Adhesion promoters that may be used in the present invention may be a polymer-containing isocyanate, such as, for example, diisocyanates. Polymer-containing isocyanates refers to a polymer-containing two or more terminal and/or pendant alkyl or aryl isocyanate groups. The polymer-containing isocyanates generally have to have a minimal solubility in the resin to provide improved mechanical properties. Preferred polymer-containing isocyanates include, but are not limited to, PM200 (poly MDI), Lupranate® (poly MDI from BASF), Krasol® isocyanate terminated polybutadiene prepolymers, such as, for example, Krasol® LBD2000 (TDI based), Krasol® LBD3000 (TDI based), Krasol® NN-22 (MDI based), Krasol® NN-23 (MDI based), Krasol® NN-25 (MDI based), and the like. Krasol® isocyanate terminated polybutadiene prepolymers are available from Cray Valley.

Adhesion promoters that may be used in the present invention may be a trimer of alkyl diisocyanates and aryl diisocyanates. In its simplest form, any combination of polyisocyanate compounds may be trimerized to form an isocyanurate ring containing isocyanate functional groups. Trimers of alkyl diisocyanate and aryl diisocyanates may also be referred to as isocyanurates of alkyl diisocyanate or aryl diisocyanate. Preferred alkyl diisocyanate and aryl diisocyanate trimers include, but are not limited to, hexamethylene diisocyanate trimer (HDIt), isophorone diisocyanate trimer, toluene diisocyanate trimer, tetramethylxylene diisocyanate trimer, methylene diphenyl diisocyanate trimers, and the like. More preferred adhesion promoters are toluene diisocyanates, tetramethylxylene diisocyanate (TMXDI), and methylene diphenyl diisocyanate (MDI) including any mixture of its three isomers 2.2'-MDI, 2,4'-MDI and 4,4'-MDI; liquid MDI; solid MDI; hexamethylenediisocyanatetrimer (HDIt); hexamethylenediisocyanate (HDI); isophorone diisocyanate (IPDI); 4,4'-methylene bis (cyclohexyl isocyanate) (H12MDI); polymeric MDI (PM200); MDI prepolymer (Lupranate® 5080); liquid carbodiimide modified 4,4'-MDI (Lupranate® MM103); liquid MDI (Lupranate® MI); liquid MDI (Mondur® ML); and liquid MDI (Mondur® MLQ). Even more preferred adhesion promoters are methylene diphenyl diisocyanate (MDI) including any mixture of its three isomers 2,2'-MDI, 2,4'-MDI and 4,4'-MDI; liquid MDI; solid MDI; hexamethylenediisocyanatetrimer (HDIt); hexamethylene diisocyanate (HDI); isophorone diisocyanate (IPDI); 4,4'-methylene bis (cyclohexyl isocyanate) (H12MDI); polymeric MDI (PM200); MDI prepolymer (Lupranate® 5080); liquid carbodiimide modified 4,4'-MDI (Lupranate® MM103); liquid MDI) (Lupranate® MI); liquid MDI (Mondur® ML); liquid MDI (Mondur® MLQ).

Any concentration of adhesion promoter which improves the mechanical properties of the olefin composite (e.g. ROMP polymer composite) is sufficient for the invention. In general, suitable amounts of adhesion promoter range from 0.001-50 phr, particularly 0.05-10 phr, more particularly 0.1-10 phr, or even more particularly 0.5-4.0 phr. One or more adhesion promoters may be used in the present invention.

Additional adhesion promoters suitable for use in the present invention comprise functionalized silanes of the formula $Fn-(A)_n-Si(Y^*)_3$, wherein $Y^*$ is selected from halide (preferably chloride) or OR; Fn is a functional group selected from acrylate, methacrylate, allyl, vinyl, alkene, cycloalkene, or norbornene; A is a divalent linking group selected from hydrocarbylene, substituted hydrocarbylene, heteroatom-containing hydrocarbylene, or substituted heteroatom-containing hydrocarbylene; n is 0 or 1; and R is selected from hydrocarbyl, substituted hydrocarbyl, heteroatom-containing hydrocarbyl, or substituted heteroatom-containing hydrocarbyl, preferably lower alkyl, more preferably methyl, ethyl, or isopropyl; and a peroxide selected from dialkyl and diaryl peroxides. Additional adhesion promoters for use in the present invention and methods for their use include those disclosed in International Pat. App. No. PCT/US00/03002, the contents of which are incorporated herein by reference.

Cyclic Olefins

Resin compositions and/or cyclic olefin compositions that may be used with the present invention disclosed herein comprise one or more cyclic olefins. In general, any cyclic olefin suitable for the metathesis reactions disclosed herein may be used. Such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition or as part of a resin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a co-monomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In general, the cyclic olefin may be represented by the structure of formula (A)

(A)

wherein J, $R^{A1}$, and $R^{A2}$ are as follows:

$R^{A1}$ and $R^{A2}$ is selected independently from the group consisting of hydrogen, hydrocarbyl (e.g., $C_1$-$C_{20}$ alkyl, $C_5$-$C_{20}$ aryl, $C_5$-$C_{30}$ aralkyl, or $C_5$-$C_{30}$ alkaryl), substituted hydrocarbyl (e.g., substituted $C_1$-$C_{20}$ alkyl, $C_5$-$C_{20}$ aryl, $C_5$-$C_{30}$ aralkyl, or $C_5$-$C_{30}$ alkaryl), heteroatom-containing hydrocarbyl (e.g., $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl), and substituted heteroatom-containing hydrocarbyl (e.g., substituted $C_1$-$C_{20}$ heteroalkyl, $C_5$-$C_{20}$ heteroaryl, heteroatom-containing $C_5$-$C_{30}$ aralkyl, or heteroatom-containing $C_5$-$C_{30}$ alkaryl) and, if substituted hydrocarbyl or substituted heteroatom-containing hydrocarbyl, wherein the substituents may be functional groups ("Fn") such as phosphonato, phosphoryl, phosphanyl, phosphino, sulfonato, $C_1$-$C_{20}$ alkylsulfanyl, $C_5$-$C_{20}$ arylsulfanyl, $C_1$-$C_{20}$ alkylsulfonyl, $C_5$-$C_{20}$ arylsulfonyl, $C_1$-$C_{20}$ alkylsulfinyl, $C_5$-$C_{20}$ arylsulfinyl, sulfonamido, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge). $R^{A1}$ and $R^{A2}$ may itself be one of the aforementioned groups, such that the Fn moiety is directly bound to the olefinic carbon atom indicated in the structure. In the latter case, however, the functional group will generally not be directly bound to the olefinic carbon through a heteroatom containing one or more lone pairs of electrons, e.g., an oxygen, sulfur, nitrogen, or phosphorus atom, or through an electron-rich metal or metalloid such as Ge, Sn, As, Sb, Se, Te, etc. With such functional groups, there will normally be an intervening linkage $Z^*$, such that $R^{A1}$ and/or $R^{A2}$ then has the structure —$(Z^*)_n$-Fn wherein n is 1, Fn is the functional group, and $Z^*$ is a hydrocarbylene linking group such as an alkylene, substituted alkylene, heteroalkylene, substituted heteroalkene, arylene, substituted arylene, heteroarylene, or substituted heteroarylene linkage.

J is a saturated or unsaturated hydrocarbylene, substituted hydrocarbylene, heteroatom-containing hydrocarbylene, or substituted heteroatom-containing hydrocarbylene linkage, wherein when J is substituted hydrocarbylene or substituted heteroatom-containing hydrocarbylene, the substituents may include one or more —$(Z^*)_n$-Fn groups, wherein n is zero or 1, and Fn and $Z^*$ are as defined previously. Additionally, two or more substituents attached to ring carbon (or other) atoms within J may be linked to form a bicyclic or polycyclic olefin. J will generally contain in the range of approximately 5 to 14 ring atoms, typically 5 to 8 ring atoms, for a monocyclic olefin, and, for bicyclic and polycyclic olefins, each ring will generally contain 4 to 8, typically 5 to 7, ring atoms.

Mono-unsaturated cyclic olefins encompassed by structure (A) may be represented by the structure (B)

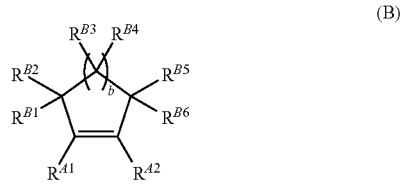

(B)

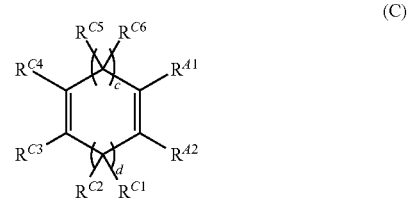

(C)

wherein b is an integer generally although not necessarily in the range of 1 to 10, typically 1 to 5, $R^{A1}$ and $R^{A2}$ are as defined above for structure (A), and $R^{B1}$, $R^{B2}$, $R^{B3}$, $R^{B4}$, $R^{B5}$, and $R^{B6}$ are independently selected from the group consisting of hydrogen, hydrocarbyl, substituted hydrocarbyl, heteroatom-containing hydrocarbyl, substituted heteroatom-containing hydrocarbyl and —$(Z^*)_n$-Fn where n, $Z^*$ and Fn are as defined previously, and wherein if any of the $R^{B1}$ through $R^{B6}$ moieties is substituted hydrocarbyl or substituted heteroatom-containing hydrocarbyl, the substituents may include one or more —$(Z^*)_n$-Fn groups. Accordingly, $R^{B1}$, $R^{B2}$, $R^{B3}$, $R^{B4}$, $R^{B5}$, and $R^{B6}$ may be, for example, hydrogen, hydroxyl, $C_1$-$C_{20}$ alkyl, $C_5$-$C_{20}$ aryl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, amino, amido, nitro, etc.

Furthermore, any of the $R^{B1}$, $R^{B2}$, $R^{B3}$, $R^{B4}$, $R^{B5}$, and $R^{B6}$ moieties can be linked to any of the other $R^{B1}$, $R^{B2}$, $R^{B3}$, $R^{B4}$, $R^{B5}$, and $R^{B6}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn are as defined previously, and functional groups (Fn) provided above.

Examples of monounsaturated, monocyclic olefins encompassed by structure (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

Monocyclic diene reactants encompassed by structure (A) may be generally represented by the structure (C)

wherein c and d are independently integers in the range of 1 to about 8, typically 2 to 4, preferably 2 (such that the reactant is a cyclooctadiene), $R^{A1}$ and $R^{A2}$ are as defined above for structure (A), and $R^{C1}$, $R^{C2}$, $R^{C3}$, $R^{C4}$, $R^{C5}$, and $R^{C6}$ are defined as for $R^{B1}$ through $R^{B6}$. In this case, it is preferred that $R^{C3}$ and $R^{C4}$ be non-hydrogen substituents, in which case the second olefinic moiety is tetrasubstituted. Examples of monocyclic diene reactants include, without limitation, 1,3-cyclopentadiene, 1,3-cyclohexadiene, 1,4-cyclohexadiene, 5-ethyl-1,3-cyclohexadiene, 1,3-cycloheptadiene, cyclohexadiene, 1,5-cyclooctadiene, 1,3-cyclooctadiene, and substituted analogs thereof. Triene reactants are analogous to the diene structure (C), and will generally contain at least one methylene linkage between any two olefinic segments.

Bicyclic and polycyclic olefins encompassed by structure (A) may be generally represented by the structure (D)

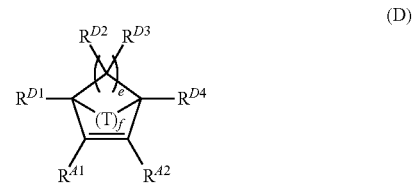

(D)

wherein $R^{A1}$ and $R^{A2}$ are as defined above for structure (A), $R^{D1}$, $R^{D2}$, $R^{D3}$, and $R^{D4}$ are as defined for $R^{B1}$ through $R^{B6}$, e is an integer in the range of 1 to 8 (typically 2 to 4) f is generally 1 or 2; T is lower alkylene or alkenylene (generally substituted or unsubstituted methyl or ethyl), $CHR^{G1}$, $C(R^{G1})_2$, O, S, N—$R^{G1}$, P—$R^{G1}$, O=P—$R^{G1}$, $Si(R^{G1})_2$, B—$R^{G1}$, or As—$R^{G1}$ where $R^{G1}$ is alkyl, alkenyl, cycloalkyl, cycloalkenyl, aryl, alkaryl, aralkyl, or alkoxy. Furthermore, any of the $R^{D1}$, $R^{D2}$, $R^{D3}$, and $R^{D4}$ moieties can be linked to any of the other $R^{D1}$, $R^{D2}$, $R^{D3}$, and $R^{D4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn are as defined previously, and functional groups (Fn) provided above.

Cyclic olefins encompassed by structure (D) are in the norbornene family. As used herein, norbornene means any compound that includes at least one norbornene or substituted norbornene moiety, including without limitation norbornene, substituted norbornene(s), norbornadiene, substituted norbornadiene(s), polycyclic norbornenes, and substituted polycyclic norbornene(s). Norbornenes within this group may be generally represented by the structure (E)

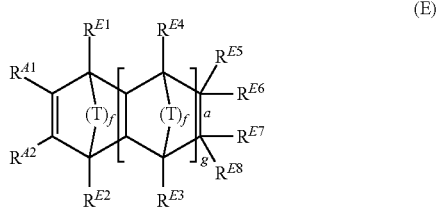

wherein $R^{41}$ and $R^{42}$ are as defined above for structure (A), T is as defined above for structure (D), $R^{E1}$, $R^{E2}$, $R^{E3}$, $R^{E4}$, $R^{E5}$, $R^{E6}$, $R^{E7}$, and $R^{E8}$ are as defined for $R^{B1}$ through $R^{B6}$, and "a" represents a single bond or a double bond, f is generally 1 or 2, "g" is an integer from 0 to 5, and when "a" is a double bond one of $R^{E5}$, $R^{E6}$ and one of $R^{E7}$, $R^{E8}$ is not present.

Furthermore, any of the $R^{E5}$, $R^{E6}$, $R^{E7}$, and $R^{E8}$ moieties can be linked to any of the other $R^{E5}$, $R^{E6}$, $R^{E7}$, and $R^{E8}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The cyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn are as defined previously, and functional groups (Fn) provided above.

More preferred cyclic olefins possessing at least one norbornene moiety have the structure (F):

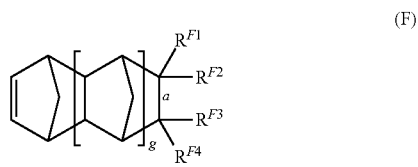

wherein, $R^{F1}$, $R^{F2}$, $R^{F3}$, and $R^{F4}$, are as defined for $R^{B1}$ through $R^{B6}$, and "a" represents a single bond or a double bond, "g" is an integer from 0 to 5, and when "a" is a double bond one of $R^{F1}$, $R^{F2}$ and one of $R^{F3}$, $R^{F4}$ is not present.

Furthermore, any of the $R^{F1}$, $R^{F2}$, $R^{F3}$, and $R^{F4}$ moieties can be linked to any of the other $R^{F1}$, $R^{F2}$, $R^{F3}$, and $R^{F4}$ moieties to provide a substituted or unsubstituted alicyclic group containing 4 to 30 ring carbon atoms or a substituted or unsubstituted aryl group containing 6 to 18 ring carbon atoms or combinations thereof and the linkage may include heteroatoms or functional groups, e.g., the linkage may include without limitation an ether, ester, thioether, amino, alkylamino, imino, or anhydride moiety. The alicyclic group can be monocyclic, bicyclic, or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn are as defined previously, and functional groups (Fn) provided above.

One route for the preparation of hydrocarbyl substituted and functionally substituted norbornenes employs the Diels-Alder cycloaddition reaction in which cyclopentadiene or substituted cyclopentadiene is reacted with a suitable dienophile at elevated temperatures to form the substituted norbornene adduct generally shown by the following reaction Scheme 1:

SCHEME 1

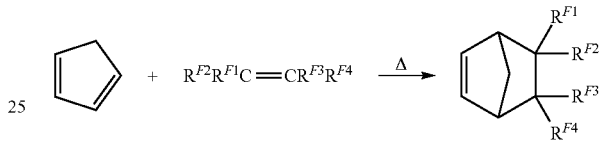

wherein $R^{F1}$ to $R^{F4}$ are as previously defined for structure (F).

Other norbornene adducts can be prepared by the thermal pyrolysis of dicyclopentadiene in the presence of a suitable dienophile. The reaction proceeds by the initial pyrolysis of dicyclopentadiene to cyclopentadiene followed by the Diels-Alder cycloaddition of cyclopentadiene and the dienophile to give the adduct shown below in Scheme 2:

SCHEME 2

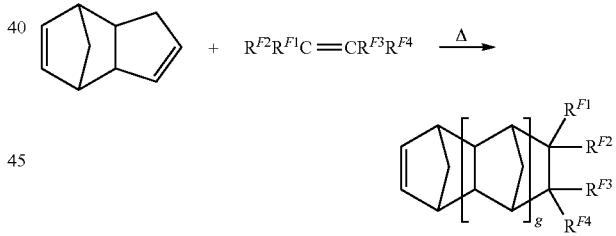

wherein "g" is an integer from 0 to 5, and $R^{F1}$ to $R^{F4}$ are as previously defined for structure (F).

Norbornadiene and higher Diels-Alder adducts thereof similarly can be prepared by the thermal reaction of cyclopentadiene and dicyclopentadiene in the presence of an acetylenic reactant as shown below in Scheme 3:

SCHEME 3

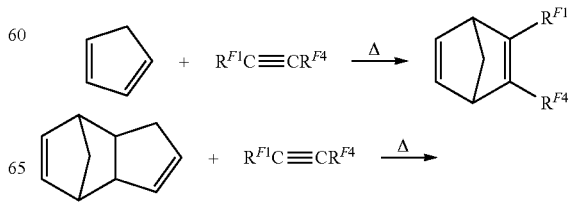

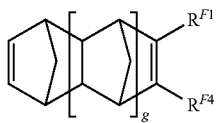

wherein "g" is an integer from 0 to 5, $R^{F1}$ and $R^{F4}$ are as previously defined for structure (F)

Examples of bicyclic and polycyclic olefins thus include, without limitation, dicyclopentadiene (DCPD); trimer and other higher order oligomers of cyclopentadiene including without limitation tricyclopentadiene (cyclopentadiene trimer), cyclopentadiene tetramer, and cyclopentadiene pentamer; ethylidenenorbornene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5,6-dimethoxycarbonylnorbornene; endo,endo-5,6-dimethoxycarbonylnorbornene; 2,3-dimethoxynorbornene; norbornadiene; tricycloundecene; tetracyclododecene; 8-methyltetracyclododecene; 8-ethyltetracyclododecene; 8-methoxycarbonyltetracyclododecene; 8-methyl-8-tetracyclododecene; 8-cyanotetracyclododecene; pentacyclopentadecene; pentacyclohexadecene; and the like, and their structural isomers, stereoisomers, and mixtures thereof. Additional examples of bicyclic and polycyclic olefins include, without limitation, $C_2$-$C_{12}$ hydrocarbyl substituted norbornenes such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like. It is well understood by one in the art that bicyclic and polycyclic olefins as disclosed herein may consist of a variety of structural isomers and/or stereoisomers, any and all of which are suitable for use in the present invention. Any reference herein to such bicyclic and polycyclic olefins unless specifically stated includes mixtures of any and all such structural isomers and/or stereoisomers.

Preferred cyclic olefins include $C_5$ to $C_{24}$ unsaturated hydrocarbons. Also preferred are $C_5$ to $C_{24}$ cyclic hydrocarbons that contain one or more (typically 2 to 12) heteroatoms such as O, N, S, or P. For example, crown ether cyclic olefins may include numerous O heteroatoms throughout the cycle, and these are within the scope of the invention. In addition, preferred cyclic olefins are $C_5$ to $C_{24}$ hydrocarbons that contain one or more (typically 2 or 3) olefins. For example, the cyclic olefin may be mono-, di-, or tri-unsaturated. Examples of cyclic olefins include without limitation cyclooctene, cyclododecene, and (c,t,t)-1,5,9-cyclododecatriene.

The cyclic olefins may also comprise multiple (typically 2 or 3) rings. For example, the cyclic olefin may be mono-, di-, or tri-cyclic. When the cyclic olefin comprises more than one ring, the rings may or may not be fused. Preferred examples of cyclic olefins that comprise multiple rings include norbornene, dicyclopentadiene, tricyclopentadiene, and 5-ethylidene-2-norbornene.

The cyclic olefin may also be substituted, for example, a $C_5$ to $C_{24}$ cyclic hydrocarbon wherein one or more (typically 2, 3, 4, or 5) of the hydrogens are replaced with non-hydrogen substituents. Suitable non-hydrogen substituents may be chosen from the substituents described hereinabove. For example, functionalized cyclic olefins, i.e., $C_5$ to $C_{24}$ cyclic hydrocarbons wherein one or more (typically 2, 3, 4, or 5) of the hydrogens are replaced with functional groups, are within the scope of the invention. Suitable functional groups may be chosen from the functional groups described hereinabove. For example, a cyclic olefin functionalized with an alcohol group may be used to prepare a telechelic polymer comprising pendent alcohol groups. Functional groups on the cyclic olefin may be protected in cases where the functional group interferes with the metathesis catalyst, and any of the protecting groups commonly used in the art may be employed. Acceptable protecting groups may be found, for example, in Greene et al., Protective Groups in Organic Synthesis, 3rd Ed. (New York: Wiley, 1999). Examples of functionalized cyclic olefins include without limitation 2-hydroxymethyl-5-norbornene, 2-[(2-hydroxyethyl)carboxylate]-5-norbornene, cydecanol, 5-n-hexyl-2-norbornene, 5-n-butyl-2-norbornene.

Cyclic olefins incorporating any combination of the abovementioned features (i.e., heteroatoms, substituents, multiple olefins, multiple rings) are suitable for the methods disclosed herein. Additionally, cyclic olefins incorporating any combination of the abovementioned features (i.e., heteroatoms, substituents, multiple olefins, multiple rings) are suitable for the invention disclosed herein.

The cyclic olefins useful in the methods disclosed herein may be strained or unstrained. It will be appreciated that the amount of ring strain varies for each cyclic olefin compound, and depends upon a number of factors including the size of the ring, the presence and identity of substituents, and the presence of multiple rings. Ring strain is one factor in determining the reactivity of a molecule towards ring-opening olefin metathesis reactions. Highly strained cyclic olefins, such as certain bicyclic compounds, readily undergo ring opening reactions with olefin metathesis catalysts. Less strained cyclic olefins, such as certain unsubstituted hydrocarbon monocyclic olefins, are generally less reactive. In some cases, ring opening reactions of relatively unstrained (and therefore relatively unreactive) cyclic olefins may become possible when performed in the presence of the olefinic compounds disclosed herein. Additionally, cyclic olefins useful in the invention disclosed herein may be strained or unstrained.

The resin compositions and/or cyclic olefin compositions of the present invention may comprise a plurality of cyclic olefins. A plurality of cyclic olefins may be used to prepare metathesis polymers from the olefinic compound. For example, two cyclic olefins selected from the cyclic olefins described hereinabove may be employed in order to form metathesis products that incorporate both cyclic olefins. Where two or more cyclic olefins are used, one example of a second cyclic olefin is a cyclic alkenol, i.e., a $C_5$-$C_{24}$ cyclic hydrocarbon wherein at least one of the hydrogen substituents is replaced with an alcohol or protected alcohol moiety to yield a functionalized cyclic olefin.

The use of a plurality of cyclic olefins, and in particular when at least one of the cyclic olefins is functionalized, allows for further control over the positioning of functional groups within the products. For example, the density of cross-linking points can be controlled in polymers and macromonomers prepared using the methods disclosed herein. Control over the quantity and density of substituents and functional groups also allows for control over the physical properties (e.g., melting point, tensile strength, glass transition temperature, etc.) of the products. Control over these and other properties is possible for reactions using only a single cyclic olefin, but it will be appreciated that the use of a plurality of cyclic olefins further enhances the range of possible metathesis products and polymers formed.

More preferred cyclic olefins include dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like. Even more preferred cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_2$-$C_{12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like.

Cyclic olefins include dicyclopentadiene, tricyclopentadiene, and higher order oligomers of cyclopentadiene, such as cyclopentadiene tetramer, cyclopentadiene pentamer, and the like, 5-tolyl-2-norbornene, 5-phenyl-2-norbornene, $C_2$-$C_{12}$ hydrocarbyl substituted norbornenes, such as 5-hexyl-2-norbornene, 5-octyl-2-norbornene, 5-decyl-2-norbornene, 5-dodecyl-2-norbornene, and the like.

Cyclic olefins that contain multiunsaturation include dicyclopentadiene, tricyclopentadiene, and higher order oligomers of cyclopentadiene, such as cyclopentadiene tetramer, cyclopentadiene pentamer, and the like, and 5-vinyl-2-norbornene, 5-ethylidene-2-norbornene, 5-isopropenyl-2-norbornene, 5-propenyl-2-norbornene, 5-butenyl-2-norbornene, and the like.

Cyclic olefins that contain multiunsaturation include dicyclopentadiene, tricyclopentadiene, and higher order oligomers of cyclopentadiene, such as cyclopentadiene tetramer, cyclopentadiene pentamer, and the like.

Cyclic olefins that contain multiunsaturation include dicyclopentadiene, tricyclopentadiene, and higher order oligomers of cyclopentadiene, such as cyclopentadiene tetramer.

Cyclic olefins that contain multiunsaturation include dicyclopentadiene, tricyclopentadiene, and tetracyclopentadiene.

An example of a cyclic olefin that contains multiunsaturation is dicyclopentadiene.

An example of a cyclic olefin that contains multiunsaturation is tricyclopentadiene.

An example of a cyclic olefin that contains multiunsaturation is tetracyclopentadiene.

Cyclic olefins that contain monounsaturation include 5-tolyl-2-norbornene, 5-phenyl-2-norbornene, 5-butyl-2-norbornene, 5-hexyl-2-norbornene, 5-octyl-2-norbornene, 5-decyl-2-norbornene, 5-dodecyl-2-norbornene.

Cyclic olefins that contain monounsaturation include 5-tolyl-2-norbornene, 5-phenyl-2-norbornene.

Cyclic olefins that contain monounsaturation include 5-butyl-2-norbornene, 5-hexyl-2-norbornene, 5-octyl-2-norbornene, 5-decyl-2-norbornene, 5-dodecyl-2-norbornene Cyclic olefins that contain monounsaturation include 5-hexyl-2-norbornene, 5-octyl-2-norbornene, 5-decyl-2-norbornene.

Cyclic olefins that contain monounsaturation include 5-hexyl-2-norbornene, 5-octyl-2-norbornene, 5-decyl-2-norbornene, and 5-tolyl-2-norbornene.

Cyclic olefins that contain monounsaturation include 5-hexyl-2-norbornene, 5-octyl-2-norbornene, 5-decyl-2-norbornene, 5-tolyl-2-norbornene, and 5-phenyl-2-norbornene.

Cyclic olefins that contain monounsaturation include 5-octyl-2-norbornene and 5-decyl-2-norbornene.

Cyclic olefins that contain monounsaturation include $C_2$-$C_{12}$ hydrocarbyl substituted norbornenes.

Cyclic olefins that contain monounsaturation include $C_4$-$C_{12}$ hydrocarbyl substituted norbornenes.

Cyclic olefins that contain monounsaturation include $C_6$-$C_{12}$ hydrocarbyl substituted norbornenes.

Cyclic olefins that contain monounsaturation include $C_6$-$C_{10}$ hydrocarbyl substituted norbornenes.

An example of a cyclic olefin that contains monounsaturation is 5-octyl-2-norbornene.

An example of a cyclic olefin that contains monounsaturation is 5-decyl-2-norbornene.

An example of a cyclic olefin that contains monounsaturation is 5-hexyl-2-norbornene.

An example of a cyclic olefin that contains monounsaturation is 5-phenyl-2-norbornene.

An example of a cyclic olefin that contains monounsaturation is 5-tolyl-2-norbornene.

An example of a cyclic olefin that contains monounsaturation is 5-butyl-2-norbornene.

An example of a cyclic olefin that contains monounsaturation is 5-dodecyl-2-norbornene.

It will be appreciated that the cyclic olefin compositions of the invention and for use in the invention comprise at least one cyclic olefin containing multiunsaturation and at least one cyclic olefin containing monounsaturation, where the amount of at least one cyclic olefin containing multiunsaturation may be present in an amount that ranges from 10.0 mol % to 80.0 mol %, 10.0 mol % to 70.0 mol %, 10.0 mol % to 60.0 mol %, 10.0 mol % to 50.0 mol %, 10.0 mol % to 40.0 mol %, 10.0 mol % to 30.0 mol %, 10.0 mol % to 20.0 mol %, 20.0 mol % to 80.0 mol %, 20.0 mol % to 70.0 mol %, 20.0 mol % to 60.0 mol %, 20.0 mol % to 50.0 mol %, 20.0 mol % to 40.0 mol %, 20.0 mol % to 30.0 mol %, 30.0 mol % to 80.0 mol %, 30.0 mol % to 70.0 mol %, 30.0 mol % to 60.0 mol %, 30.0 mol % to 50.0 mol %, 30.0 mol % to 40.0 mol %, 40.0 mol % to 80.0 mol %, 40.0 mol % to 70.0 mol %, 40.0 mol % to 60.0 mol %, 40.0 mol % to 50.0 mol %, 50.0 mol % to 80.0 mol %, 50.0 mol % to 70.0 mol %, 50.0 mol % to 60.0 mol %, 60.0 mol % to 80.0 mol %, 60.0 mol % to 70.0 mol %, or 70.0 mol % to 80.0 mol %; and where the amount of at least one cyclic olefin containing monounsaturation may be present in an amount that ranges from 10.0 mol % to 90.0 mol %, 10.0 mol % to 80.0 mol %, 10.0 mol % to 70.0 mol %, 10.0 mol % to 60.0 mol %, 10.0 mol % to 50.0 mol %, 10.0 mol % to 40.0 mol %, 10.0 mol % to 30.0 mol %, 10.0 mol % to 20.0 mol %, 20.0 mol % to 90.0 mol %, 20.0 mol % to 80.0 mol %, 20.0 mol % to 70.0 mol %, 20.0 mol % to 60.0 mol %, 20.0 mol % to 50.0 mol %, 20.0 mol % to 40.0 mol %, 20.0 mol % to 30.0 mol %, 30.0 mol % to 90.0 mol %, 30.0 mol % to 80.0 mol %, 30.0 mol % to 70.0 mol %, 30.0 mol % to 60.0 mol %, 30.0 mol % to 50.0 mol %, 30.0 mol % to 40.0 mol %, 40.0 mol % to 90.0 mol %, 40.0 mol % to 80.0 mol %, 40.0 mol % to 70.0 mol %, 40.0 mol % to 60.0 mol %, 40.0 mol % to 50.0 mol %, 50.0 mol % to 90.0 mol %, 50.0 mol % to 80.0 mol %, 50.0 mol % to 70.0 mol %, 50.0 mol % to 60.0 mol %, 60.0 mol % to 90.0 mol %, 60.0 mol % to 80.0 mol %, 60.0 mol % to 70.0 mol %, 70.0 mol % to 90.0 mol %, 70.0 mol % to 80.0 mol %, or 80.0 mol % to 90.0 mol %.

It will be appreciated that the cyclic olefin compositions of the invention and for use in the invention comprise at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); where the amount of at least one cyclic olefin containing multiunsaturation may be present in an amount that ranges from 10.0 mol % to 80.0 mol %, 10.0 mol % to 70.0 mol %, 10.0 mol % to 60.0 mol %, 10.0 mol % to 50.0 mol %, 10.0 mol % to 40.0 mol %, 10.0 mol % to 30.0 mol %, 10.0 mol % to 20.0 mol %, 20.0 mol % to 80.0 mol %, 20.0 mol % to 70.0 mol %, 20.0 mol % to 60.0 mol %, 20.0 mol % to 50.0 mol %, 20.0 mol % to 40.0 mol %, 20.0 mol % to 30.0 mol %, 30.0 mol % to 80.0 mol %, 30.0 mol % to 70.0 mol %, 30.0 mol % to 60.0 mol %, 30.0 mol % to 50.0 mol %, 30.0 mol % to 40.0 mol %, 40.0 mol % to 80.0 mol %, 40.0 mol % to 70.0 mol %, 40.0 mol % to 60.0 mol %, 40.0 mol % to 50.0 mol %, 50.0 mol % to 80.0 mol %, 50.0 mol % to 70.0 mol %, 50.0 mol % to 60.0 mol %, 60.0 mol % to 80.0 mol %, 60.0 mol % to 70.0 mol %, or 70.0 mol % to 80.0 mol %; and where the amount of at least one cyclic olefin containing monounsaturation may be present in an amount that ranges from 10.0 mol % to 90.0 mol %, 10.0 mol % to 80.0 mol %, 10.0 mol % to 70.0 mol %, 10.0 mol % to 60.0 mol %, 10.0 mol % to 50.0 mol %, 10.0 mol % to 40.0 mol %, 10.0 mol % to 30.0 mol %, 10.0 mol % to 20.0 mol %, 20.0 mol % to 90.0 mol %, 20.0 mol % to 80.0 mol %, 20.0 mol % to 70.0 mol %, 20.0 mol % to 60.0 mol %, 20.0 mol % to 50.0 mol %, 20.0 mol % to 40.0 mol %, 20.0 mol % to 30.0 mol %, 30.0 mol % to 90.0 mol %, 30.0 mol % to 80.0 mol %, 30.0 mol % to 70.0 mol %, 30.0 mol % to 60.0 mol %, 30.0 mol % to 50.0 mol %, 30.0 mol % to 40.0 mol %, 40.0 mol % to 90.0 mol %, 40.0 mol % to 80.0 mol %, 40.0 mol % to 70.0 mol %, 40.0 mol % to 60.0 mol %, 40.0 mol % to 50.0 mol %, 50.0 mol % to 90.0 mol %, 50.0 mol % to 80.0 mol %, 50.0 mol % to 70.0 mol %, 50.0 mol % to 60.0 mol %, 60.0 mol % to 90.0 mol %, 60.0 mol % to 80.0 mol %, 60.0 mol % to 70.0 mol %, 70.0 mol % to 90.0 mol %, 70.0 mol % to 80.0 mol %, or 80.0 mol % to 90.0 mol %.

It will be appreciated that the cyclic olefin compositions of the invention and for use in the invention comprise at least one cyclic olefin containing multiunsaturation and at least one cyclic olefin containing monounsaturation, where the amount of at least one cyclic olefin containing multiunsaturation may be present in an amount that ranges from 10.0 mol % to 80.0 mol %, 10.0 mol % to 70.0 mol %, 10.0 mol % to 60.0 mol %, 10.0 mol % to 50.0 mol %, 10.0 mol % to 40.0 mol %, 10.0 mol % to 30.0 mol %, 10.0 mol % to 20.0 mol %, 20.0 mol % to 80.0 mol %, 20.0 mol % to 70.0 mol %, 20.0 mol % to 60.0 mol %, 20.0 mol % to 50.0 mol %, 20.0 mol % to 40.0 mol %, 20.0 mol % to 30.0 mol %, 30.0 mol % to 80.0 mol %, 30.0 mol % to 70.0 mol %, 30.0 mol % to 60.0 mol %, 30.0 mol % to 50.0 mol %, 30.0 mol % to 40.0 mol %, 40.0 mol % to 80.0 mol %, 40.0 mol % to 70.0 mol %, 40.0 mol % to 60.0 mol %, 40.0 mol % to 50.0 mol %, 50.0 mol % to 80.0 mol %, 50.0 mol % to 70.0 mol %, 50.0 mol % to 60.0 mol %, 60.0 mol % to 80.0 mol %, 60.0 mol % to 70.0 mol %, or 70.0 mol % to 80.0 mol %; and where the amount of at least one cyclic olefin containing monounsaturation may be present in an amount that ranges from up to 90.0 mol %, up to 80.0 mol %, up to 70.0 mol %, up to 60.0 mol %, up to 50.0 mol %, up to 40.0 mol %, up to 30.0 mol %, up to 20.0 mol %.

It will be appreciated that the cyclic olefin compositions of the invention and for use in the invention comprise at least one cyclic olefin containing multiunsaturation, wherein the at least one cyclic olefin containing multiunsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); and at least one cyclic olefin containing monounsaturation, wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn); where the amount of at least one cyclic olefin containing multiunsaturation may be present in an amount that ranges from 10.0 mol % to 80.0 mol %, 10.0 mol % to 70.0 mol %, 10.0 mol % to 60.0 mol %, 10.0 mol % to 50.0 mol %, 10.0 mol % to 40.0 mol %, 10.0 mol % to 30.0 mol %, 10.0 mol % to 20.0 mol %, 20.0 mol % to 80.0 mol %, 20.0 mol % to 70.0 mol %, 20.0 mol % to 60.0 mol %, 20.0 mol % to 50.0 mol %, 20.0 mol % to 40.0 mol %, 20.0 mol % to 30.0 mol %, 30.0 mol % to 80.0 mol %, 30.0 mol % to 70.0 mol %, 30.0 mol % to 60.0 mol %, 30.0 mol % to 50.0 mol %, 30.0 mol % to 40.0 mol %, 40.0 mol % to 80.0 mol %, 40.0 mol % to 70.0 mol %, 40.0 mol % to 60.0 mol %, 40.0 mol % to 50.0 mol %, 50.0 mol % to 80.0 mol %, 50.0 mol % to 70.0 mol %, 50.0 mol % to 60.0 mol %, 60.0 mol % to 80.0 mol %, 60.0 mol % to 70.0 mol %, or 70.0 mol % to 80.0 mol %; and where the amount of at least one cyclic olefin containing monounsaturation may be present in an amount that ranges from up to 90.0 mol %, up to 80.0 mol %, up to 70.0 mol %, up to 60.0 mol %, up to 50.0 mol %, up to 40.0 mol %, up to 30.0 mol %, up to 20.0 mol %.

Metal Carbene Olefin Metathesis Catalysts

A metal carbene olefin metathesis catalyst that may be used in the invention disclosed herein, is preferably a Group 8 transition metal complex having the structure of formula (I)

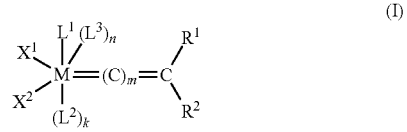

in which:

M is a Group 8 transition metal;

$L^1$, $L^2$, and $L^3$ are neutral electron donor ligands;

n is 0 or 1, such that $L^3$ may or may not be present;

m is 0, 1, or 2;

k is 0 or 1;

$X^1$ and $X^2$ are anionic ligands; and $R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

Additionally, in formula (I), one or both of $R^1$ and $R^2$ may have the structure —$(W)_n$—$U^+V^-$, in which W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1. Furthermore, $R^1$ and $R^2$ may be taken together to form an indenylidene moiety.

Preferred catalysts contain Ru or Os as the Group 8 transition metal, with Ru particularly preferred.

Numerous embodiments of the catalysts useful in the reactions disclosed herein are described in more detail infra. For the sake of convenience, the catalysts are described in groups, but it should be emphasized that these groups are not meant to be limiting in any way. That is, any of the catalysts useful in the invention may fit the description of more than one of the groups described herein.

A first group of catalysts, then, are commonly referred to as First Generation Grubbs-type catalysts, and have the structure of formula (I). For the first group of catalysts, M is a Group 8 transition metal, m is 0, 1, or 2, and n, $X^1$, $X^2$, $L^1$, $L^2$, $L^3$, $R^1$, and $R^2$ are described as follows.

For the first group of catalysts, n is 0, and $L^1$ and $L^2$ are independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Preferred trisubstituted phosphines are of the formula $PR^{H1}R^{H2}R^{H3}$, where $R^{H1}$, $R^{H2}$, and $R^{H3}$ are each independently substituted or unsubstituted aryl or $C_1$-$C_{10}$ alkyl, particularly primary alkyl, secondary alkyl, or cycloalkyl. In the most preferred, $L^1$ and $L^2$ are independently selected from the group consisting of trimethylphosphine ($PMe_3$), triethylphosphine ($PEt_3$), tri-n-butylphosphine ($PBu_3$), tri(ortho-tolyl)phosphine (P-o-tolyl$_3$), tri-tert-butylphosphine (P-tert-Bu$_3$), tricyclopentylphosphine (PCyclopentyl$_3$), tricyclohexylphosphine ($PCy_3$), triisopropylphosphine (P-i-Pr$_3$), trioctylphosphine ($POct_3$), triisobutylphosphine, (P-i-Bu$_3$), triphenylphosphine ($PPh_3$), tri(pentafluorophenyl)phosphine ($P(C_6F_5)_3$), methyldiphenylphosphine ($PMePh_2$), dimethylphenylphosphine ($PMe_2Ph$), and diethylphenylphosphine ($PEt_2Ph$). Alternatively, $L^1$ and $L^2$ may be independently selected from phosphabicycloalkane (e.g., monosubstituted 9-phosphabicyclo-[3.3.1]nonane, or monosubstituted 9-phosphabicyclo[4.2.1]nonane] such as cyclohexylphoban, isopropylphoban, ethylphoban, methylphoban, butylphoban, pentylphoban and the like).

$X^1$ and $X^2$ are anionic ligands, and may be the same or different, or are linked together to form a cyclic group, typically although not necessarily a five- to eight-membered ring. In preferred embodiments, $X^1$ and $X^2$ are each independently hydrogen, halide, or one of the following groups: $C_1$-$C_{20}$ alkyl, $C_5$-$C_{24}$ aryl, $C_1$-$C_{20}$ alkoxy, $C_5$-$C_{24}$ aryloxy, $C_2$-$C_{20}$ alkoxycarbonyl, $C_6$-$C_{24}$ aryloxycarbonyl, $C_2$-$C_{24}$ acyl, $C_2$-$C_{24}$ acyloxy, $C_1$-$C_{20}$ alkylsulfonato, $C_5$-$C_{24}$ arylsulfonato, $C_1$-$C_{20}$ alkylsulfanyl, $C_5$-$C_{24}$ arylsulfanyl, $C_1$-$C_{20}$ alkylsulfinyl, $NO_3$, —N=C=O, —N=C=S, or $C_5$-$C_{24}$ arylsulfinyl. Optionally, $X^1$ and $X^2$ may be substituted with one or more moieties selected from $C_1$-$C_{12}$ alkyl, $C_1$-$C_{12}$ alkoxy, $C_5$-$C_{24}$ aryl, and halide, which may, in turn, with the exception of halide, be further substituted with one or more groups selected from halide, $C_1$-$C_6$ alkyl, $C_1$-$C_6$ alkoxy, and phenyl. In more preferred embodiments, $X^1$ and $X^2$ are halide, benzoate, $C_2$-$C_6$ acyl, $C_2$-$C_6$ alkoxycarbonyl, $C_1$-$C_6$ alkyl, phenoxy, $C_1$-$C_6$ alkoxy, $C_1$-$C_6$ alkylsulfanyl, aryl, or $C_1$-$C_6$ alkylsulfonyl. In even more preferred embodiments, $X^1$ and $X^2$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethane-sulfonate. In the most preferred embodiments, $X^1$ and $X^2$ are each chloride.

$R^1$ and $R^2$ are independently selected from hydrogen, hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), heteroatom-containing hydrocarbyl (e.g., heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and substituted heteroatom-containing hydrocarbyl (e.g., substituted heteroatom-containing $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, $C_6$-$C_{24}$ aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In preferred catalysts, $R^1$ is hydrogen and $R^2$ is selected from $C_1$-$C_{20}$ alkyl, $C_2$-$C_{20}$ alkenyl, and $C_5$-$C_{24}$ aryl, more preferably $C_1$-$C_6$ alkyl, $C_2$-$C_6$ alkenyl, and $C_5$-$C_{14}$ aryl. Still more preferably, $R^2$ is phenyl, vinyl, methyl, isopropyl, or t-butyl, optionally substituted with one or more moieties selected from $C_1$-$C_6$ alkyl, $C_1$-$C_6$ alkoxy, phenyl, and a functional group Fn as defined earlier herein. Most preferably, $R^2$ is phenyl or vinyl substituted with one or more moieties selected from methyl, ethyl, chloro, bromo, iodo, fluoro, nitro, dimethylamino, methyl, methoxy, and phenyl. Optimally, $R^2$ is phenyl or —CH=C(CH$_3$)$_2$.

Any two or more (typically two, three, or four) of $X^1$, $X^2$, $L^1$, $L^2$, $L^3$, $R^1$, and $R^2$ can be taken together to form a cyclic group, including bidentate or multidentate ligands, as disclosed, for example, in U.S. Pat. No. 5,312,940, the disclosure of which is incorporated herein by reference. When any of $X^1$, $X^2$, $L^1$, $L^2$, $L^3$, $R^1$, and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of catalysts, commonly referred to as Second Generation Grubbs-type catalysts, have the structure of formula (I), wherein $L^1$ is a carbene ligand having the structure of formula (II)

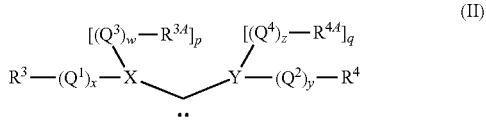

(II)

such that the complex may have the structure of formula (III)

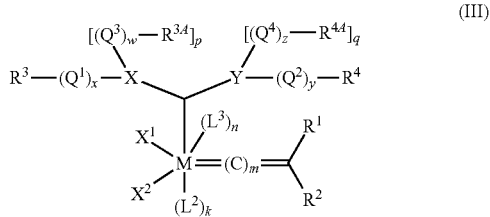

(III)

wherein M, m, n, $X^1$, $X^2$, $L^2$, $L^3$, $R^1$, and $R^2$ are as defined for the first group of catalysts, and the remaining substituents are as follows;

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N;

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents on adjacent atoms within $Q^1$, $Q^2$, $Q^3$, and $Q^4$ may be linked to form an additional cyclic group; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl. In addition, X and Y may be independently selected from carbon and one of the heteroatoms mentioned above, preferably no more than one of X or Y is carbon. Also, $L^2$ and $L^3$ may be taken together to form a single bindentate electron-donating heterocyclic ligand. Furthermore, $R^1$ and $R^2$ may be taken together to form an indenylidene moiety. Moreover, $X^1$, $X^2$, $L^2$, $L^3$, X and Y may be further coordinated to boron or to a carboxylate.

In addition, any two or more of $X^1$, $X^2$, $L^1$, $L^2$, $L^3$, $R^1$, $R^2$, $R^3$, $R^{3A}$, $R^4$, $R^{4A}$, $Q^1$, $Q^2$, $Q^3$ and $Q^4$ can be taken together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support. Any two or more of $X^1$, $X^2$, $L^1$, $L^2$, $L^3$, $R^1$, $R^2$, $R^3$, $R^{3A}$, $R^4$, and $R^{4A}$ can also be taken to be -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and arylalkylene groups, and Fn is a functional group, or together to form a cyclic group, and any one or more of $X^1$, $X^2$, $L^2$, $L^3$, $Q^1$, $Q^2$, $Q^3$, $Q^4$, $R^1$, $R^2$, $R^3$, $R^{3A}$, $R^4$, and $R^{4A}$ may be attached to a support.

A particular class of carbene ligands having the structure of formula (II), where $R^{3A}$ and $R^{4A}$ are linked to form a cyclic group and at least one of X or Y is a nitrogen, or at least one of $Q^3$ or $Q^4$ is a heteroatom-containing hydrocarbylene or substituted heteroatom-containing hydrocarbylene, where at least one heteroatom is a nitrogen, are commonly referred to as N-heterocyclic carbene (NHC) ligands.

Preferably, $R^{3A}$ and $R^{4A}$ are linked to form a cyclic group so that the carbene ligand has the structure of formula (IV)

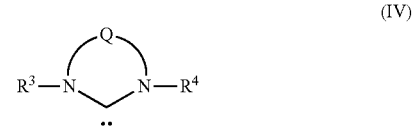

(IV)

wherein $R^3$ and $R^4$ are as defined for the second group of catalysts above, with preferably at least one of $R^3$ and $R^4$, and more preferably both $R^3$ and $R^4$, being alicyclic or aromatic of one to about five rings, and optionally containing one or more heteroatoms and/or substituents. Q is a linker, typically a hydrocarbylene linker, including substituted hydrocarbylene, heteroatom-containing hydrocarbylene, and substituted heteroatom-containing hydrocarbylene linkers, wherein two or more substituents on adjacent atoms within Q may also be linked to form an additional cyclic structure, which may be similarly substituted to provide a fused polycyclic structure of two to about five cyclic groups. Q is often, although not necessarily, a two-atom linkage or a three-atom linkage.

Examples of N-heterocyclic carbene (NHC) ligands and acyclic diaminocarbene ligands suitable as $L^1$ thus include, but are not limited to, the following where DIPP or DiPP is diisopropylphenyl and Mes is 2,4,6-trimethylphenyl:

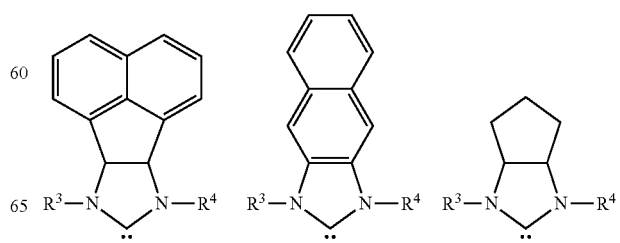

-continued

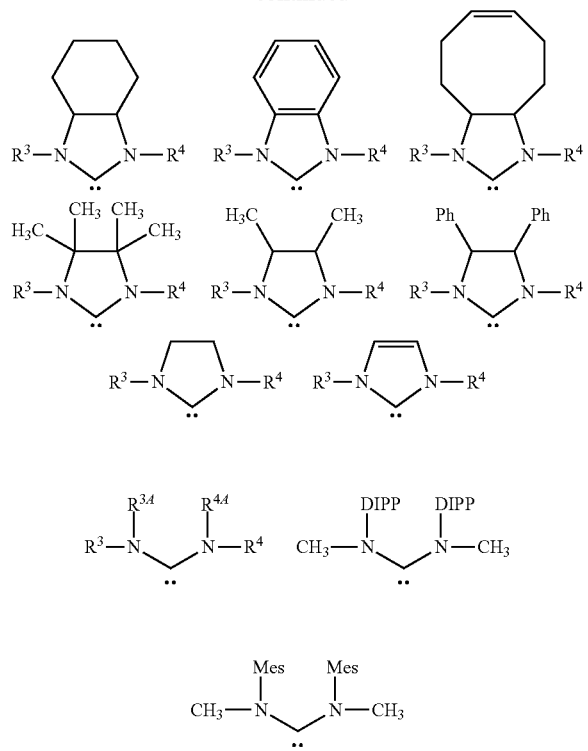

Additional examples of N-heterocyclic carbene (NHC) ligands and acyclic diaminocarbene ligands suitable as $L^1$ thus include, but are not limited to the following:

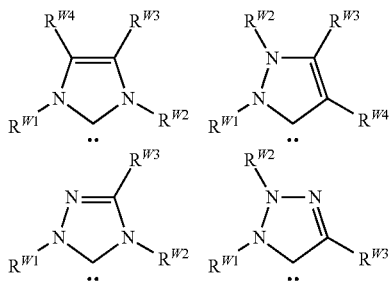

wherein $R^{W1}$, $R^{W2}$, $R^{W3}$, $R^{W4}$ are independently hydrogen, unsubstituted hydrocarbyl, substituted hydrocarbyl, or heteroatom containing hydrocarbyl, and where one or both of $R^{W3}$ and $R^{W4}$ may be in independently selected from halogen, nitro, amido, carboxyl, alkoxy, aryloxy, sulfonyl, carbonyl, thio, or nitroso groups.

Additional examples of N-heterocyclic carbene (NHC) ligands suitable as $L^1$ are further described in U.S. Pat. Nos. 7,378,528; 7,652,145; 7,294,717; 6,787,620; 6,635,768; and 6,552,139, the contents of each are incorporated herein by reference.

Additionally, thermally activated N-Heterocyclic Carbene Precursors as disclosed in U.S. Pat. No. 6,838,489, the contents of which are incorporated herein by reference, may also be used with the present invention.

When M is ruthenium, then, the preferred complexes have the structure of formula (V)

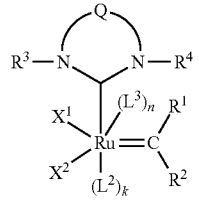

(V)

In a more preferred embodiment, Q is a two-atom linkage having the structure —$CR^{11}R^{12}$—$CR^{13}R^{14}$— or —$CR^{11}$=$CR^{13}$—, preferably —$CR^{11}R^{12}$—$CR^{13}R^{14}$—, wherein $R^{11}$, $R^{12}$, $R^{13}$, and $R^{14}$ are independently selected from hydrogen, hydrocarbyl, substituted hydrocarbyl, heteroatom-containing hydrocarbyl, substituted heteroatom-containing hydrocarbyl, and functional groups. Examples of functional groups here include without limitation carboxyl, $C_1$-$C_{20}$ alkoxy, $C_5$-$C_{24}$ aryloxy, $C_2$-$C_{20}$ alkoxycarbonyl, $C_5$-$C_{24}$ alkoxycarbonyl, $C_2$-$C_{24}$ acyloxy, $C_1$-$C_{20}$ alkylthio, $C_5$-$C_{24}$ arylthio, $C_1$-$C_{20}$ alkylsulfonyl, and $C_1$-$C_{20}$ alkylsulfinyl, optionally substituted with one or more moieties selected from $C_1$-$C_{12}$ alkyl, $C_1$-$C_{12}$ alkoxy, $C_5$-$C_{14}$ aryl, hydroxyl, sulfhydryl, formyl, and halide. $R^{11}$, $R^{12}$, $R^{13}$, and $R^{14}$ are preferably independently selected from hydrogen, $C_1$-$C_{12}$ alkyl, substituted $C_1$-$C_{12}$ alkyl, $C_1$-$C_{12}$ heteroalkyl, substituted $C_1$-$C_{12}$ heteroalkyl, phenyl, and substituted phenyl. Alternatively, any two of $R^{11}$, $R^{12}$, $R^{13}$, and $R^{14}$ may be linked together to form a substituted or unsubstituted, saturated or unsaturated ring structure, e.g., a $C_4$-$C_{12}$ alicyclic group or a $C_5$ or $C_6$ aryl group, which may itself be substituted, e.g., with linked or fused alicyclic or aromatic groups, or with other substituents. In one further aspect, any one or more of $R^{11}$, $R^{12}$, $R^{13}$, and $R^{14}$ comprises one or more of the linkers. Additionally, $R^3$ and $R^4$ may be unsubstituted phenyl or phenyl substituted with one or more substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Furthermore, $X^1$ and $X^2$ may be halogen.

When $R^3$ and $R^4$ are aromatic, they are typically although not necessarily composed of one or two aromatic rings, which may or may not be substituted, e.g., $R^3$ and $R^4$ may be phenyl, substituted phenyl, biphenyl, substituted biphenyl, or the like. In one preferred embodiment, $R^3$ and $R^4$ are the same and are each unsubstituted phenyl or phenyl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, $C_6$-$C_{24}$ aralkyl, $C_6$-$C_{24}$ alkaryl, or halide. Preferably, any substituents present are hydrogen, $C_1$-$C_{12}$ alkyl, $C_1$-$C_{12}$ alkoxy, $C_5$-$C_{14}$ aryl, substituted $C_5$-$C_{14}$ aryl, or halide. As an example, $R^3$ and $R^4$ are mesityl (i.e., Mes as defined herein).

In a third group of catalysts having the structure of formula (I), M, m, n, $X^1$, $X^2$, $R^1$, and $R^2$ are as defined for the first group of catalysts, $L^1$ is a strongly coordinating neutral electron donor ligand such as any of those described for the first and second group of catalysts, and $L^2$ and $L^3$ are weakly coordinating neutral electron donor ligands in the form of optionally substituted heterocyclic groups. Again, n is zero or 1, such that $L^3$ may or may not be present. Generally, in the third group of catalysts, $L^2$ and $L^3$ are optionally substituted five- or six-membered monocyclic groups containing 1 to 4, preferably 1 to 3, most preferably 1 to 2 heteroatoms, or are optionally substituted bicyclic or polycyclic structures composed of 2 to 5 such five- or six-membered monocyclic groups. If the heterocyclic group is substituted, it should not be substituted on a coordinating heteroatom, and any one cyclic moiety within a heterocyclic group will generally not be substituted with more than 3 substituents.

For the third group of catalysts, examples of $L^2$ and $L^3$ include, without limitation, heterocycles containing nitrogen, sulfur, oxygen, or a mixture thereof.

Examples of nitrogen-containing heterocycles appropriate for $L^2$ and $L^3$ include pyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, and carbazole. Additionally, the nitrogen-containing heterocycles may be optionally substituted on a non-coordinating heteroatom with a non-hydrogen substitutent.

Examples of sulfur-containing heterocycles appropriate for $L^2$ and $L^3$ include thiophene, 1,2-dithiole, 1,3-dithiole, thiepin, benzo(b)thiophene, benzo(c)thiophene, thionaphthene, dibenzothiophene, 2H-thiopyran, 4H-thiopyran, and thioanthrene.

Examples of oxygen-containing heterocycles appropriate for $L^2$ and $L^3$ include 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, and dibenzofuran.

Examples of mixed heterocycles appropriate for $L^2$ and $L^3$ include isoxazole, oxazole, thiazole, isothiazole, 1,2,3-oxadiazole, 1,2,4-oxadiazole, 1,3,4-oxadiazole, 1,2,3,4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine.

Preferred $L^2$ and $L^3$ ligands are aromatic nitrogen-containing and oxygen-containing heterocycles, and particularly preferred $L^2$ and $L^3$ ligands are monocyclic N-heteroaryl ligands that are optionally substituted with 1 to 3, preferably 1 or 2, substituents. Specific examples of particularly preferred $L^2$ and $L^3$ ligands are pyridine and substituted pyridines, such as 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5-dichloro-4-methylpyridine, 3,5-dimethyl-4-bromopyridine, 3,5-dimethylpyridine, 4-methylpyridine, 3,5-diisopropylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, and the like.

In general, any substituents present on $L^2$ and/or $L^3$ are selected from halo, $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ alkaryl, substituted $C_6$-$C_{24}$ alkaryl, $C_6$-$C_{24}$ heteroalkaryl, substituted $C_6$-$C_{24}$ heteroalkaryl, $C_6$-$C_{24}$ aralkyl, substituted $C_6$-$C_{24}$ aralkyl, $C_6$-$C_{24}$ heteroaralkyl, substituted $C_6$-$C_{24}$ heteroaralkyl, and functional groups, with suitable functional groups including, without limitation, $C_1$-$C_{20}$ alkoxy, $C_5$-$C_{24}$ aryloxy, $C_2$-$C_{20}$ alkylcarbonyl, $C_6$-$C_{24}$ arylcarbonyl, $C_2$-$C_{20}$ alkylcarbonyloxy, $C_6$-$C_{24}$ arylcarbonyloxy, $C_2$-$C_{20}$ alkoxycarbonyl, $C_6$-$C_{24}$ aryloxycarbonyl, halocarbonyl, $C_2$-$C_{20}$ alkylcarbonato, $C_6$-$C_{24}$ arylcarbonato, carboxy, carboxylato, carbamoyl, mono-($C_1$-$C_{20}$ alkyl)-substituted carbamoyl, di-($C_1$-$C_{20}$ alkyl)-substituted carbamoyl, di-N—($C_1$-$C_{20}$ alkyl), N—($C_5$-$C_{24}$ aryl)-substituted carbamoyl, mono-($C_5$-$C_{24}$ aryl)-substituted carbamoyl, di-($C_6$-$C_{24}$ aryl)-substituted carbamoyl, thiocarbamoyl, mono-($C_1$-$C_{20}$ alkyl)-substituted thiocarbamoyl, di-($C_1$-$C_{20}$ alkyl)-substituted thiocarbamoyl, di-N—($C_1$-$C_{20}$ alkyl)-N—($C_6$-$C_{24}$ aryl)-substituted thiocarbamoyl, mono-($C_6$-$C_{24}$ aryl)-substituted thiocarbamoyl, di-($C_6$-$C_{24}$ aryl)-substituted thiocarbamoyl, carbamido, formyl, thioformyl, amino, mono-($C_1$-$C_{20}$ alkyl)-substituted amino, di-($C_1$-$C_{20}$ alkyl)-substituted amino, mono-($C_5$-$C_{24}$ aryl)-substituted amino, di-($C_5$-$C_{24}$ aryl)-substituted amino, di-N—($C_1$-$C_{20}$ alkyl), N—($C_5$-$C_{24}$ aryl)-substituted amino, $C_2$-$C_{20}$ alkylamido, $C_6$-$C_{24}$ arylamido, imino, $C_1$-$C_{20}$ alkylimino, $C_5$-$C_{24}$ arylimino, nitro, and nitroso. In addition, two adjacent substituents may be taken together to form a ring, generally a five- or six-membered alicyclic or aryl ring, optionally containing 1 to 3 heteroatoms and 1 to 3 substituents as above.

Preferred substituents on $L^2$ and $L^3$ include, without limitation, halo, $C_1$-$C_{12}$ alkyl, substituted $C_1$-$C_{12}$ alkyl, $C_1$-$C_{12}$ heteroalkyl, substituted $C_1$-$C_{12}$ heteroalkyl, $C_5$-$C_{14}$ aryl, substituted $C_5$-$C_{14}$ aryl, $C_5$-$C_{14}$ heteroaryl, substituted $C_5$-$C_{14}$ heteroaryl, $C_6$-$C_{16}$ alkaryl, substituted $C_6$-$C_{16}$ alkaryl, $C_6$-$C_{16}$ heteroalkaryl, substituted $C_6$-$C_{16}$ heteroalkaryl, $C_6$-$C_{16}$ aralkyl, substituted $C_6$-$C_{16}$ aralkyl, $C_6$-$C_{16}$ heteroaralkyl, substituted $C_6$-$C_{16}$ heteroaralkyl, $C_1$-$C_{12}$ alkoxy, $C_5$-$C_{14}$ aryloxy, $C_2$-$C_{12}$ alkylcarbonyl, $C_6$-$C_{14}$ arylcarbonyl, $C_2$-$C_{12}$ alkylcarbonyloxy, $C_6$-$C_{14}$ arylcarbonyloxy, $C_2$-$C_{12}$ alkoxycarbonyl, $C_6$-$C_{14}$ aryloxycarbonyl, halocarbonyl, formyl, amino, mono-($C_1$-$C_{12}$ alkyl)-substituted amino, di-($C_1$-$C_{12}$ alkyl)-substituted amino, mono-($C_5$-$C_{14}$ aryl)-substituted amino, di-($C_5$-$C_{14}$ aryl)-substituted amino, and nitro.

Of the foregoing, the most preferred substituents are halo, $C_1$-$C_6$ alkyl, $C_1$-$C_6$ haloalkyl, $C_1$-$C_6$ alkoxy, phenyl, substituted phenyl, formyl, N,N-di($C_1$-$C_6$ alkyl)amino, nitro, and nitrogen heterocycles as described above (including, for example, pyrrolidine, piperidine, piperazine, pyrazine, pyrimidine, pyridine, pyridazine, etc.).

In certain embodiments, $L^2$ and $L^3$ may also be taken together to form a bidentate or multidentate ligand containing two or more, generally two, coordinating heteroatoms such as N, O, S, or P, with preferred such ligands being diimine ligands of the Brookhart type. One representative bidentate ligand has the structure of formula (VI)

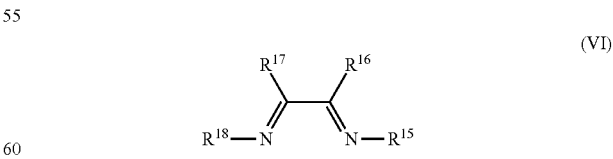

(VI)

wherein $R^{15}$, $R^{16}$, $R^{17}$, and $R^{18}$ hydrocarbyl (e.g., $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), substituted hydrocarbyl (e.g., substituted $C_1$-$C_{20}$ alkyl, $C_2$-$C_{20}$ alkenyl, $C_2$-$C_{20}$ alkynyl, $C_5$-$C_{24}$ aryl, $C_6$-$C_{24}$ alkaryl, or $C_6$-$C_{24}$ aralkyl), heteroatom-containing hydrocarbyl (e.g., $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or substituted heteroatom-containing hydrocarbyl (e.g., substituted $C_1$-$C_{20}$ heteroalkyl, $C_5$-$C_{24}$ heteroaryl, heteroatom-containing $C_6$-$C_{24}$ aralkyl, or heteroatom-containing $C_6$-$C_{24}$ alkaryl), or (1) $R^{15}$ and $R^{16}$, (2) $R^{17}$ and $R^{18}$, (3) $R^{16}$ and $R^{17}$, or (4) both $R^{15}$ and $R^{16}$, and $R^{17}$ and $R^{18}$, may be taken together to form a ring, i.e., an N-heterocycle. Preferred cyclic groups in such a case are five- and six-membered rings, typically aromatic rings.

In a fourth group of catalysts that have the structure of formula (I), two of the substituents are taken together to form a bidentate ligand or a tridentate ligand. Examples of bidentate ligands include, but are not limited to, bisphosphines, dialkoxides, alkyldiketonates, and aryldiketonates. Specific examples include —P(Ph)$_2$CH$_2$CH$_2$P(Ph)$_2$-, —As(Ph)$_2$CH$_2$CH$_2$As(Ph)$_2$-, —P(Ph)$_2$CH$_2$CH$_2$C(CF$_3$)$_2$O—, binaphtholate dianions, pinacolate dianions, —P(CH$_3$)$_2$(CH$_2$)$_2$P(CH$_3$)$_2$—, and —OC(CH$_3$)$_2$(CH$_3$)$_2$CO—. Preferred bidentate ligands are —P(Ph)$_2$CH$_2$CH$_2$P(Ph)$_2$- and —P(CH$_3$)$_2$(CH$_2$)$_2$P(CH$_3$)$_2$—. Tridentate ligands include, but are not limited to, (CH$_3$)$_2$NCH$_2$CH$_2$P(Ph)CH$_2$CH$_2$N(CH$_3$)$_2$. Other preferred tridentate ligands are those in which any three of $X^1$, $X^2$, $L^1$, $L^2$, $L^3$, $R^1$, and $R^2$ (e.g., $X^1$, $L^1$, and $L^2$) are taken together to be cyclopentadienyl, indenyl, or fluorenyl, each optionally substituted with $C_2$-$C_{20}$ alkenyl, $C_2$-$C_{20}$ alkynyl, $C_1$-$C_{20}$ alkyl, $C_5$-$C_{20}$ aryl, $C_1$-$C_{20}$ alkoxy, $C_2$-$C_{20}$ alkenyloxy, $C_2$-$C_{20}$ alkynyloxy, $C_5$-$C_{20}$ aryloxy, $C_2$-$C_{20}$ alkoxycarbonyl, $C_1$-$C_{20}$ alkylthio, $C_1$-$C_{20}$ alkylsulfonyl, or $C_1$-$C_{20}$ alkylsulfinyl, each of which may be further substituted with $C_1$-$C_6$ alkyl, halide, $C_1$-$C_6$ alkoxy or with a phenyl group optionally substituted with halide, $C_1$-$C_6$ alkyl, or $C_1$-$C_6$ alkoxy. More preferably, in compounds of this type, X, $L^1$, and $L^2$ are taken together to be cyclopentadienyl or indenyl, each optionally substituted with vinyl, $C_1$-$C_{10}$ alkyl, $C_5$-$C_{20}$ aryl, $C_1$-$C_{10}$ carboxylate, $C_2$-$C_{10}$ alkoxycarbonyl, $C_1$-$C_{10}$ alkoxy, or $C_5$-$C_{20}$ aryloxy, each optionally substituted with $C_1$-$C_6$ alkyl, halide, $C_1$-$C_6$ alkoxy or with a phenyl group optionally substituted with halide, $C_1$-$C_6$ alkyl or $C_1$-$C_6$ alkoxy. Most preferably, X, $L^1$ and $L^2$ may be taken together to be cyclopentadienyl, optionally substituted with vinyl, hydrogen, methyl, or phenyl. Tetradentate ligands include, but are not limited to O$_2$C(CH$_2$)$_2$P(Ph)(CH$_2$)$_2$P(Ph)(CH$_2$)$_2$CO$_2$, phthalocyanines, and porphyrins.

Complexes wherein Y is coordinated to the metal are examples of a fifth group of catalysts, and are commonly called "Grubbs-Hoveyda" catalysts. Grubbs-Hoveyda metathesis-active metal carbene complexes may be described by the formula (VII)

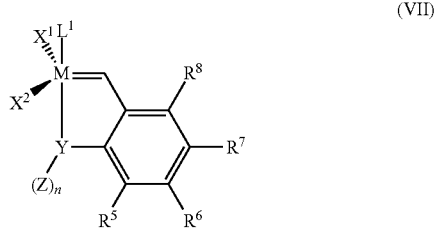

(VII)

wherein,

M is a Group 8 transition metal, particularly Ru or Os, or, more particularly, Ru;

$X^1$, $X^2$, and $L^1$ are as previously defined herein for the first and second groups of catalysts;

Y is a heteroatom selected from N, O, S, and P; preferably Y is O or N;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein "A" and Fn have been defined above; and any combination of Y, Z, $R^5$, $R^6$, $R^7$, and $R^8$ can be linked to form one or more cyclic groups;

n is 0, 1, or 2, such that n is 1 for the divalent heteroatoms O or S, and n is 2 for the trivalent heteroatoms N or P; and Z is a group selected from hydrogen, alkyl, aryl, functionalized alkyl, functionalized aryl where the functional group(s) may independently be one or more or the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ may be linked to a support. Additionally, $R^5$, $R^6$, $R^7$, $R^8$, and Z may independently be thioisocyanate, cyanato, or thiocyanato.

Examples of complexes comprising Grubbs-Hoveyda ligands suitable in the invention include:

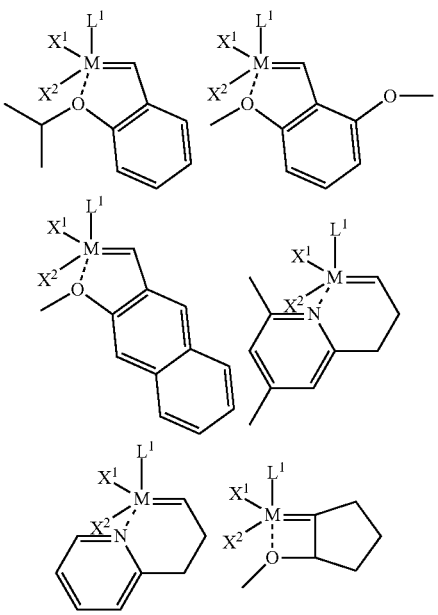

wherein, $L^1$, $X^1$, $X^2$, and M are as described for any of the other groups of catalysts. Suitable chelating carbenes and carbene precursors are further described by Pederson et al. (U.S. Pat. Nos. 7,026,495 and 6,620,955, the disclosures of both of which are incorporated herein by reference) and Hoveyda et al. (U.S. Pat. No. 6,921,735 and WO0214376, the disclosures of both of which are incorporated herein by reference).

Other useful complexes include structures wherein $L^2$ and $R^2$ according to formulae (I), (III), or (V) are linked, such as styrenic compounds that also include a functional group for attachment to a support. Examples in which the functional group is a trialkoxysilyl functionalized moiety include, but are not limited to, the following:

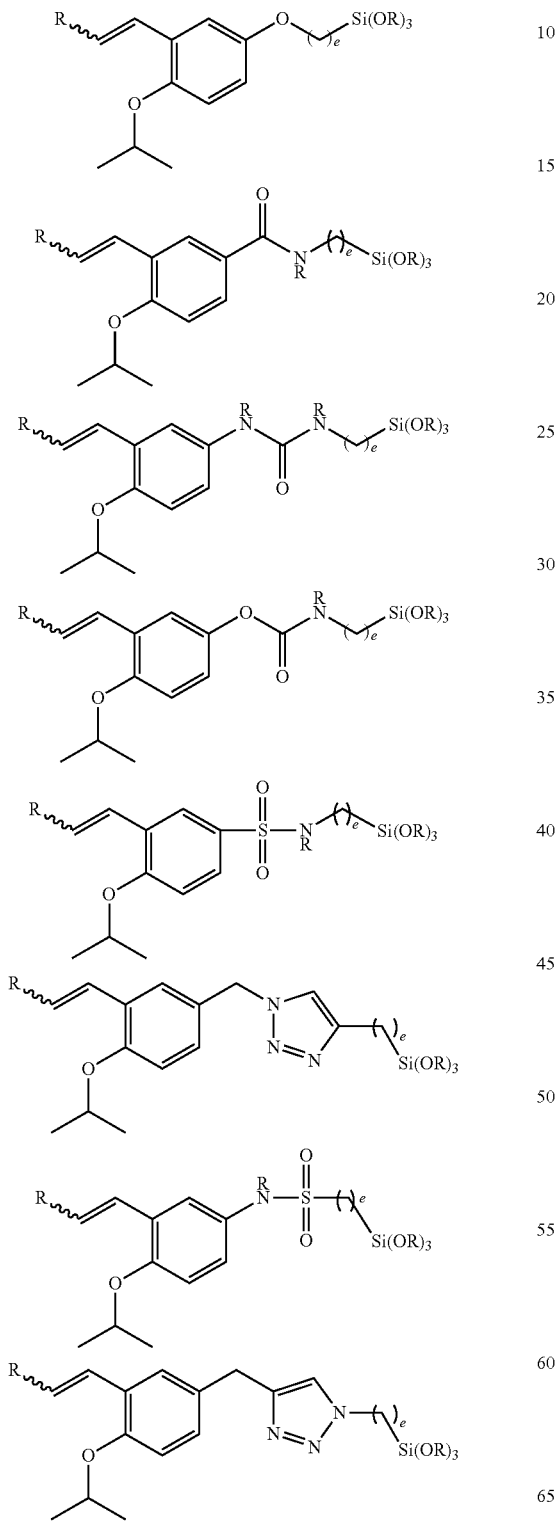

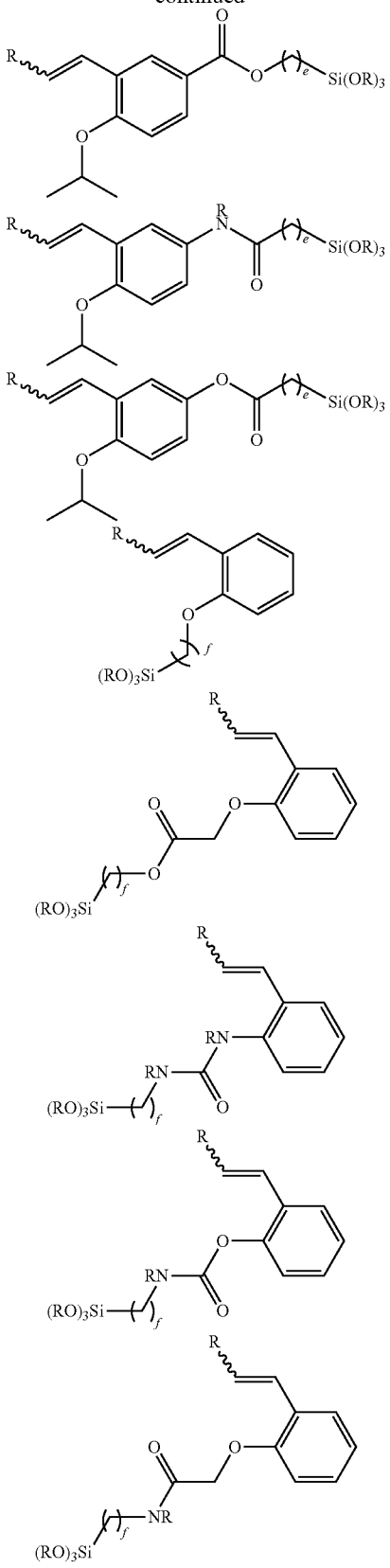

Further examples of complexes having linked ligands include those having linkages between a neutral NHC ligand and an anionic ligand, a neutral NHC ligand and an alkylidine ligand, a neutral NHC ligand and an L² ligand, a neutral NHC ligand and an L³ ligand, an anionic ligand and an alkylidine ligand, and any combination thereof. While the possible structures are too numerous to list herein, some suitable structures based on formula (III) include:

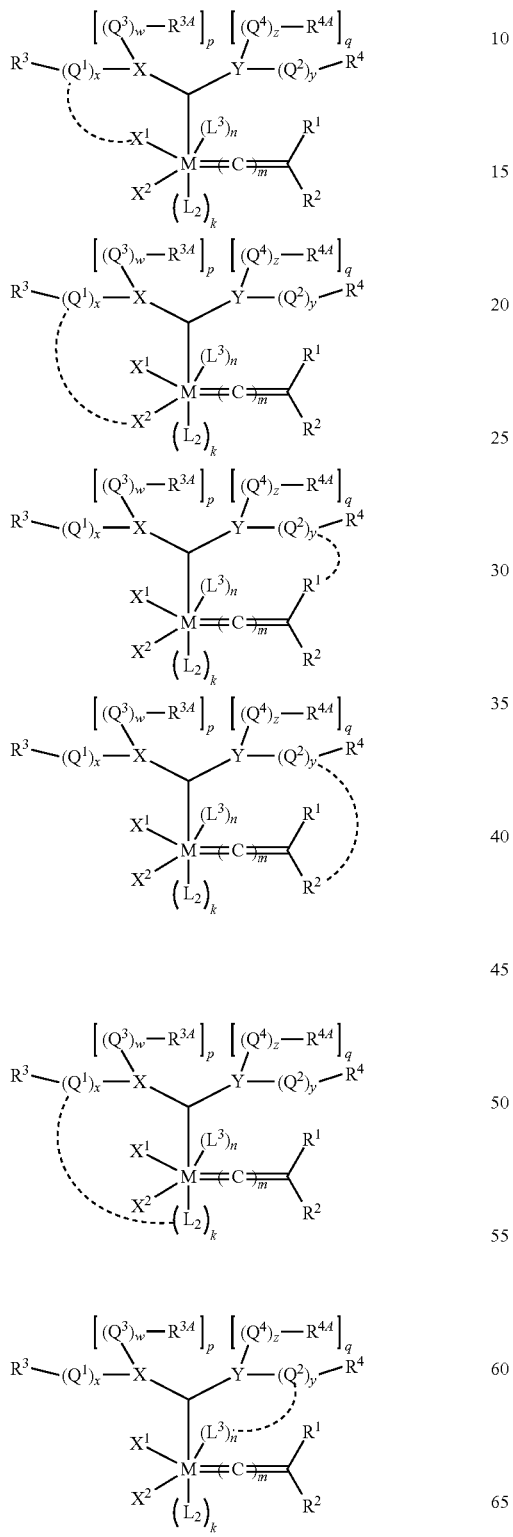

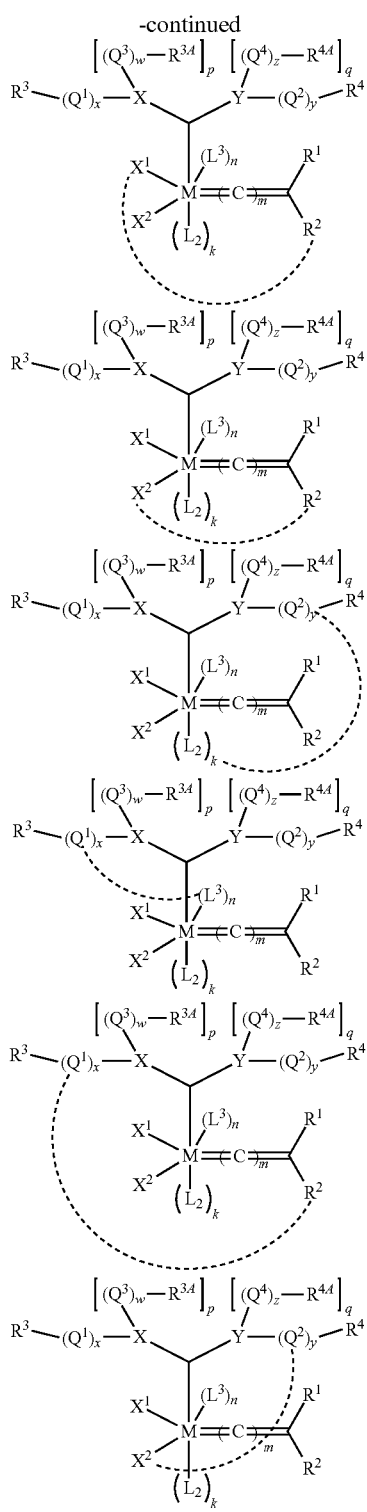

In addition to the catalysts that have the structure of formula (I), as described above, other transition metal carbene complexes include, but are not limited to:

neutral ruthenium or osmium metal carbene complexes containing metal centers that are formally in the +2 oxidation state, have an electron count of 16, are penta-coordinated, and are of the general formula (IX);

neutral ruthenium or osmium metal carbene complexes containing metal centers that are formally in the +2 oxidation state, have an electron count of 18, are hexa-coordinated, and are of the general formula (X);

cationic ruthenium or osmium metal carbene complexes containing metal centers that are formally in the +2 oxidation state, have an electron count of 14, are tetra-coordinated, and are of the general formula (XI); and cationic ruthenium or osmium metal carbene complexes containing metal centers that are formally in the +2 oxidation state, have an electron count of 14 or 16, are tetra-coordinated or penta-coordinated, respectively, and are of the general formula (XII)

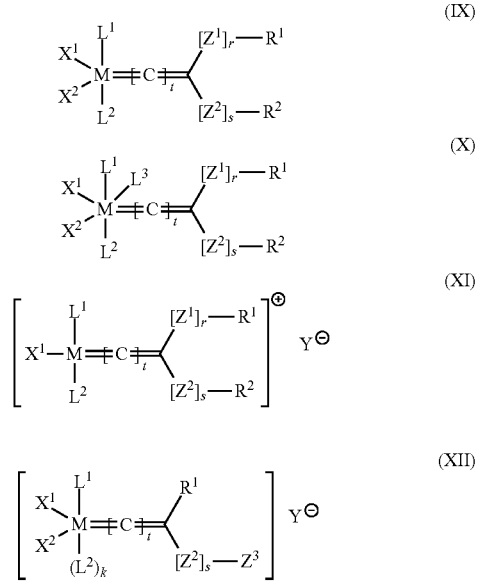

(IX)

(X)

(XI)

(XII)

wherein:

M, $X^1$, $X^2$, $L^1$, $L^2$, $L^3$, $R^1$, and $R^2$ are as defined for any of the previously defined four groups of catalysts;

r and s are independently zero or 1;

t is an integer in the range of zero to 5;

k is an integer in the range of zero to 1;

Y is any non-coordinating anion (e.g., a halide ion, $BF_4^-$, etc.);

$Z^1$ and $Z^2$ are independently selected from —O—, —S—, —$NR^2$—, —$PR^2$—, —P(=O)$R^2$—, —P(O$R^2$)—, —P(=O)(O$R^2$)—, —C(=O)—, —C(=O)O—, —OC(=O)—, —OC(=O)O—, —S(=O)—, —S(=O)$_2$—, —, and an optionally substituted and/or optionally heteroatom-containing $C_1$-$C_{20}$ hydrocarbylene linkage;

$Z^3$ is any cationic moiety such as —P($R^2$)$_3^+$ or —N($R^2$)$_3^+$; and any two or more of $X^1$, $X^2$, $L^1$, $L^2$, $L^3$, $Z^1$, $Z^2$, $Z^3$, $R^1$, and $R^2$ may be taken together to form a cyclic group, e.g., a multidentate ligand, and wherein any one or more of $X^1$, $X^2$, $L^1$, $L^2$, $L^3$, $Z^1$, $Z^2$, $Z^3$, $R^1$, and $R^2$ may be attached to a support.

Additionally, another group of metal carbene olefin metathesis catalysts that may be used in the invention disclosed herein, is a Group 8 transition metal complex having the structure of formula (XIII):

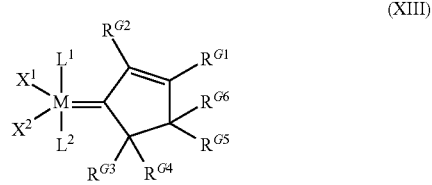

(XIII)

wherein M is a Group 8 transition metal, particularly ruthenium or osmium, or more particularly, ruthenium;

$X^1$, $X^2$, $L^1$ and $L^2$ are as defined for the first and second groups of catalysts defined above; and $R^{G1}$, $R^{G2}$, $R^{G3}$, $R^{G4}$, $R^{G5}$, and $R^{G6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{G1}$, $R^{G2}$, $R^{G3}$, $R^{G4}$, $R^{G5}$, and $R^{G6}$ may be linked together to form a cyclic group, or any one or more of the $R^{G1}$, $R^{G2}$, $R^{G3}$, $R^{G4}$, $R^{G5}$, and $R^{G6}$ may be attached to a support.

Additionally, one preferred embodiment of the Group 8 transition metal complex of formula XIII is a Group 8 transition metal complex of formula (XIV):

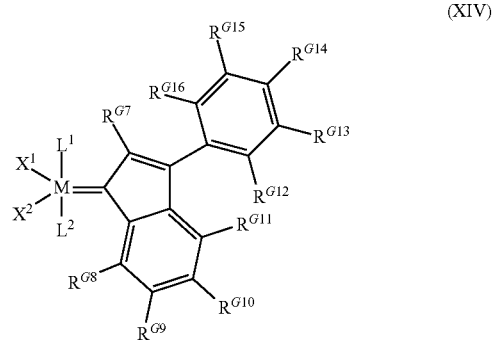

(XIV)

wherein M, $X^1$, $X^2$, $L^1$, $L^2$, are as defined above for Group 8 transition metal complex of formula XIII; and $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ are as defined above for $R^{G1}$, $R^{G2}$, $R^{G3}$, $R^{G4}$, $R^{G5}$, and $R^{G6}$ for Group 8 transition metal complex of formula XIII or any one or more of the $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ may be linked together to form a cyclic group, or any one or more of the $R^{G7}$, $R^{G8}$, $R^{G9}$, $R^{G10}$, $R^{G11}$, $R^{G12}$, $R^{G13}$, $R^{G14}$, $R^{G15}$ and $R^{G16}$ may be attached to a support.

Additionally, another preferred embodiment of the Group 8 transition metal complex of formula XIII is a Group 8 transition metal complex of formula (XV):

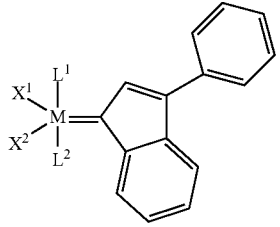

(XV)

wherein M, $X^1$, $X^2$, $L^1$, $L^2$, are as defined above for Group 8 transition metal complex of formula XIII.

Additionally, another group of olefin metathesis catalysts that may be used in the invention disclosed herein, is a Group 8 transition metal complex comprising a Schiff base ligand having the structure of formula (XVI):

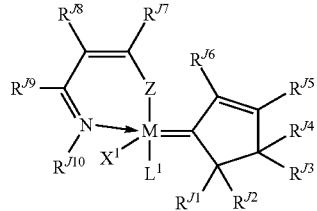

(XVI)

wherein M is a Group 8 transition metal, particularly ruthenium or osmium, or more particularly, ruthenium;

$X^1$, and $L^1$ are as defined for the first and second groups of catalysts defined above;

Z is selected from the group consisting of oxygen, sulfur, selenium, $NR^{J11}$, $PR^{J11}$, $AsR^{J11}$, and $SbR^{J11}$; and $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be linked together to form a cyclic group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{J11}$ may be attached to a support.

Additionally, one preferred embodiment of the Group 8 transition metal complex of formula (XVI) is a Group 8 transition metal complex comprising a Schiff base ligand having the structure of formula (XVII):

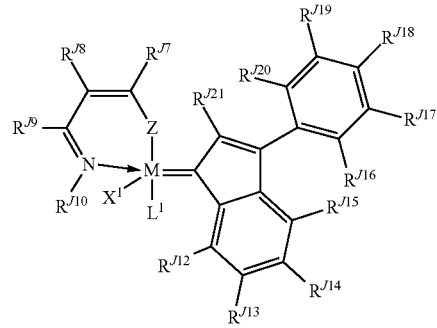

(XVII)

wherein M, $X^1$, $L^1$, Z, $R^{J7}$, $R^{J8}$, $R^{J9}$, $R^{J10}$, and $R^{J11}$ are as defined above for Group 8 transition metal complex of formula XVI; and $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ are as defined above for $R^{J1}$, $R^{J2}$, $R^{J3}$, $R^{J4}$, $R^{J5}$, and $R^{J6}$ for Group 8 transition metal complex of formula XVI, or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be linked together to form a cyclic group, or any one or more of the $R^{J7}$, $R^{J8}$, $R^{J9}$, $R^{J10}$, $R^{J11}$, $R^{J12}$, $R^{J13}$, $R^{J14}$, $R^{J15}$, $R^{J16}$, $R^{J17}$, $R^{J18}$, $R^{J19}$, $R^{J20}$, and $R^{J21}$ may be attached to a support.

Additionally, another preferred embodiment of the Group 8 transition metal complex of formula (XVI) is a Group 8 transition metal complex comprising a Schiff base ligand having the structure of formula (XVIII):

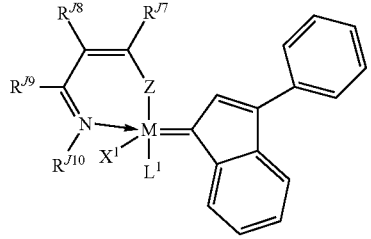

(XVIII)

wherein M, $X^1$, $L^1$, Z, $R^{J7}$, $R^{J8}$, $R^{J9}$, $R^{J10}$, and $R^{J11}$ are as defined above for Group 8 transition metal complex of formula (XVI).

Additionally, another group of olefin metathesis catalysts that may be used in the invention disclosed herein, is a Group 8 transition metal complex comprising a Schiff base ligand having the structure of formula (XIX):

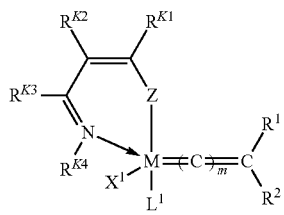

(XIX)

wherein M is a Group 8 transition metal, particularly ruthenium or osmium, or more particularly, ruthenium;

$X^1$, $L^1$, $R^1$, and $R^2$ are as defined for the first and second groups of catalysts defined above;

Z is selected from the group consisting of oxygen, sulfur, selenium, $NR^{K5}$, $PR^{K5}$, $AsR^{K5}$, and $SbR^{K5}$;

m is 0, 1, or 2; and $R^{K1}$, $R^{K2}$, $R^{K3}$, $R^{K4}$, and $R^{K5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, and $R^{K5}$ may be linked together to form a cyclic group, or any one or more of the $R^{K1}$, $R^{K2}$, $R^{K3}$, $R^{K4}$ and $R^{K5}$, may be attached to a support.

In addition, catalysts of formulas (XVI) to (XIX) may be optionally contacted with an activating compound, where at least partial cleavage of a bond between the Group 8 transition metal and at least one Schiff base ligand occurs, wherein the activating compound is either a metal or silicon compound selected from the group consisting of copper (I) halides; zinc compounds of the formula $Zn(R^{Y1})_2$, wherein $R^{Y1}$ is halogen, $C_1$-$C_7$ alkyl or aryl; tin compounds represented by the formula $SnR^{Y2}R^{Y3}R^{Y4}R^{Y5}$ wherein each of $R^{Y2}$, $R^{Y3}$, $R^{Y4}$ and $R^{Y5}$ is independently selected from the group consisting of halogen, $C_1$-$C_{20}$ alkyl, $C_3$-$C_{10}$ cycloalkyl, aryl, benzyl and $C_2$-$C_7$ alkenyl; and silicon compounds represented by the formula $SiR^{Y6}R^{Y7}R^{Y8}R^{Y9}$ wherein each of $R^{Y6}$, $R^{Y7}$, $R^{Y8}$, $R^{Y9}$ is independently selected from the group consisting of hydrogen, halogen, $C_1$-$C_{20}$ alkyl, halo, $C_1$-$C_7$ alkyl, aryl, heteroaryl, and vinyl. In addition, catalysts of formulas (XVI) to (XIX) may be optionally contacted with an activating compound where at least partial cleavage of a bond between the Group 8 transition metal and at least one Schiff base ligand occurs, wherein the activating compound is an inorganic acid such as hydrogen iodide, hydrogen bromide, hydrogen chloride, hydrogen fluoride, sulfuric acid, nitric acid, iodic acid, periodic acid, perchloric acid, HOClO, $HOClO_2$ and $HOIO_3$. In addition, catalysts of formulas (XVI) to (XIX) may be optionally contacted with an activating compound where at least partial cleavage of a bond between the Group 8 transition metal and at least one Schiff base ligand occurs, wherein the activating compound is an organic acid such as sulfonic acids including but not limited to methanesulfonic acid, aminobenzenesulfonic acid, benzenesulfonic acid, napthalenesulfonic acid, sulfanilic acid and trifluoromethanesulfonic acid; monocarboxylic acids including but not limited to acetoacetic acid, barbituric acid, bromoacetic acid, bromobenzoic acid, chloroacetic acid, chlorobenzoic acid, chlorophenoxyacetic acid, chloropropionic acid, cis-cinnamic acid, cyanoacetic acid, cyanobutyric acid, cyanophenoxyacetic acid, cyanopropionic acid, dichloroacetic acid, dichloroacetylacetic acid, dihydroxybenzoic acid, dihydroxymalic acid, dihydroxytartaric acid, dinicotinic acid, diphenylacetic acid, fluorobenzoic acid, formic acid, furancarboxylic acid, furoic acid, glycolic acid, hippuric acid, iodoacetic acid, iodobenzoic acid, lactic acid, lutidinic acid, mandelic acid, α-naphtoic acid, nitrobenzoic acid, nitrophenylacetic acid, o-phenylbenzoic acid, thioacetic acid, thiophene-carboxylic acid, trichloroacetic acid, and trihydroxybenzoic acid; and other acidic substances such as but not limited to picric acid and uric acid.

In addition, other examples of catalysts that may be used with the present invention are located in the following disclosures, each of which is incorporated herein by reference, U.S. Pat. Nos. 7,687,635; 7,671,224; 6,284,852; 6,486,279; and 5,977,393; International Publication Number WO2010/037550; and U.S. patent application Ser. Nos. 12/303,615; 10/590,380; 11/465,651 (Publication No.: US 2007/0043188); and Ser. No. 11/465,651 (Publication No.: US 2008/0293905 Corrected Publication); and European Pat. Nos. EP1757613B1 and EP1577282B1.

Non-limiting examples of catalysts that may be used to prepare supported complexes and in the reactions disclosed herein include the following, some of which for convenience are identified throughout this disclosure by reference to their molecular weight:

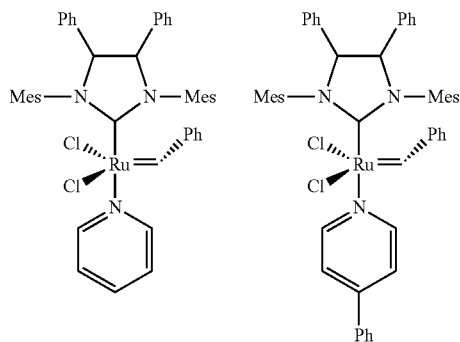

99
-continued
100
-continued
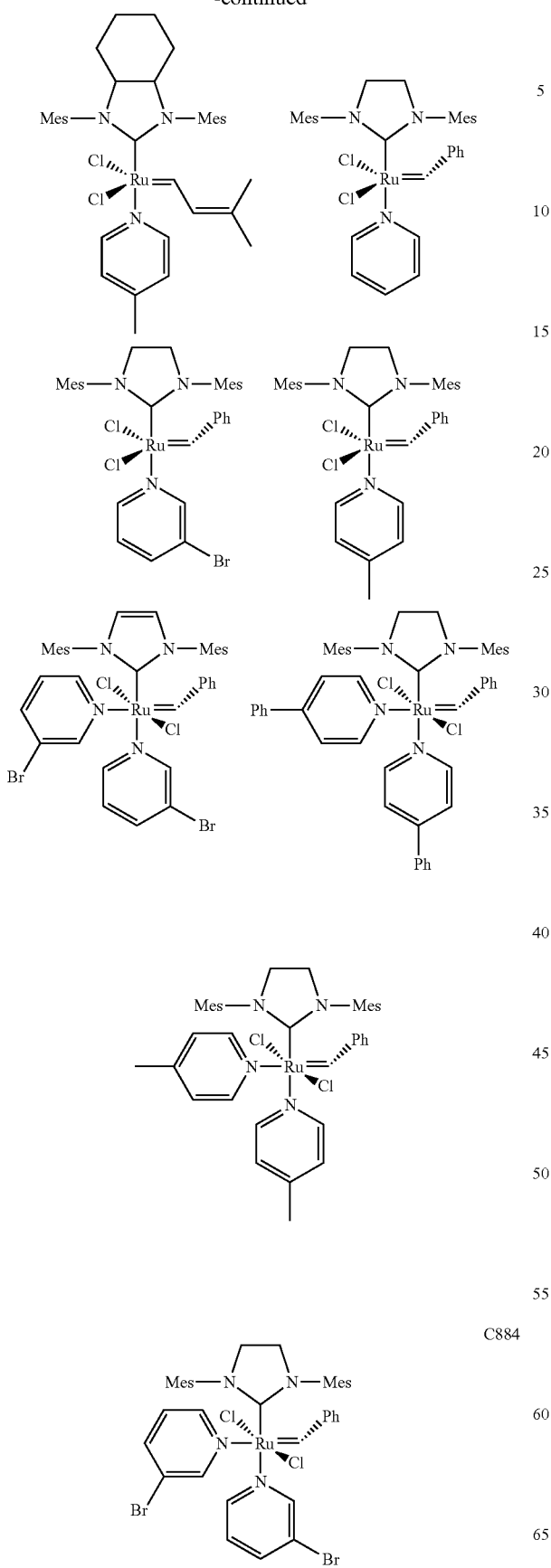
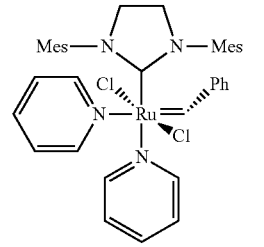
C727
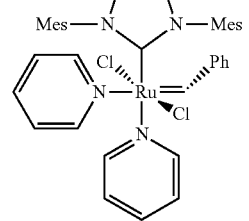
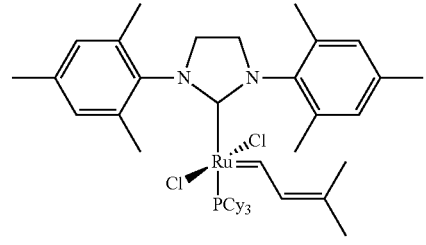
C827
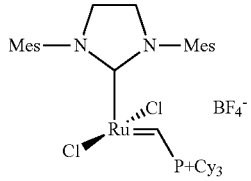
C859
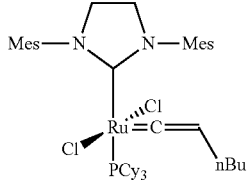
C841-n
C884
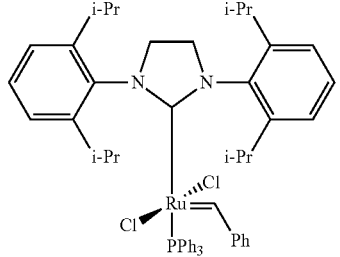
C916

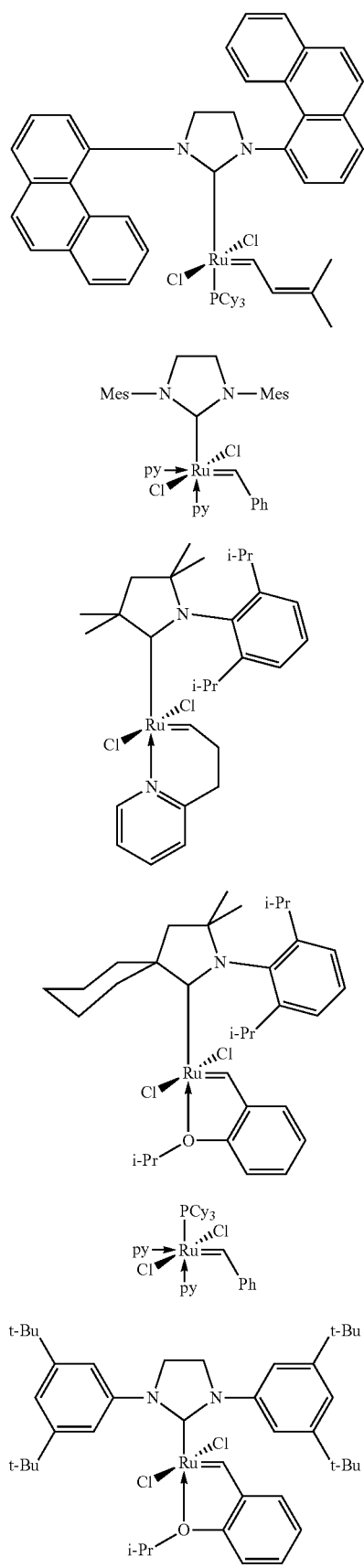
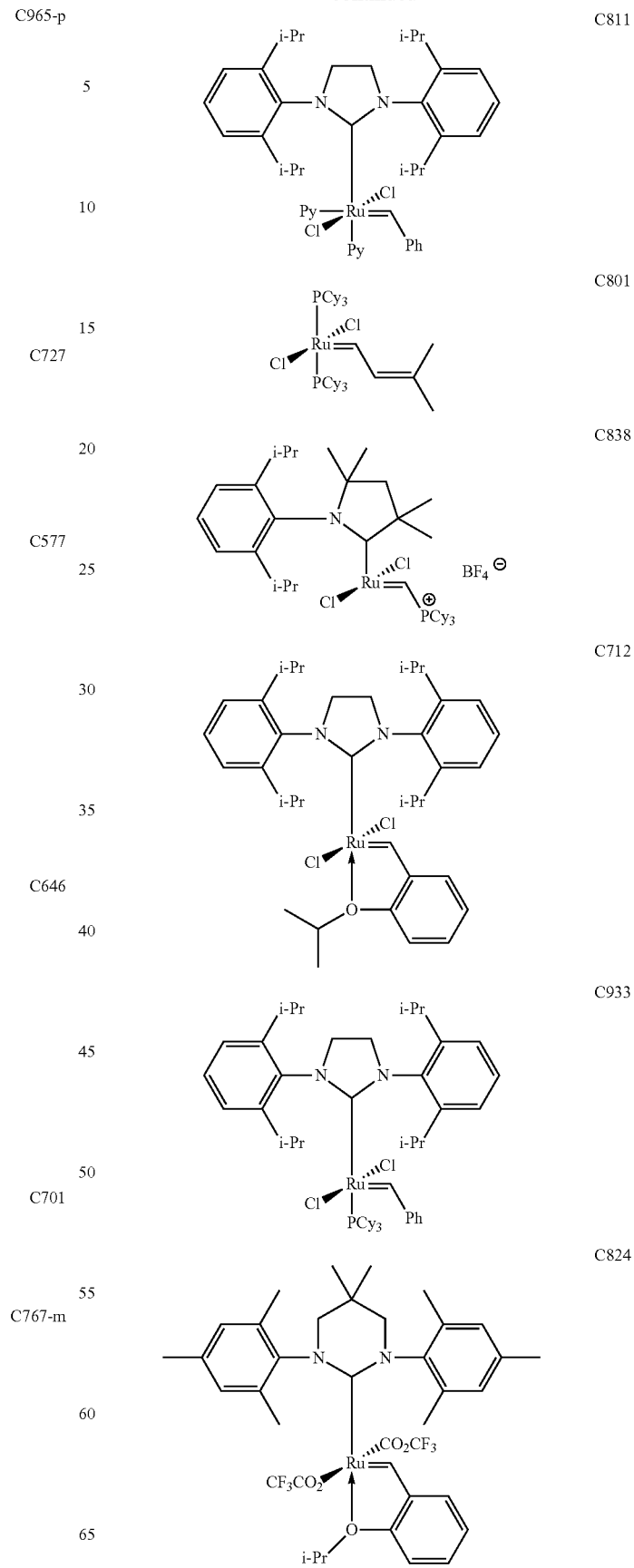

-continued
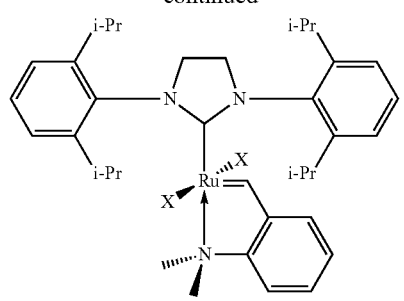
C697 (X = Cl)
C785 (X = Br)
C879 (X = I)
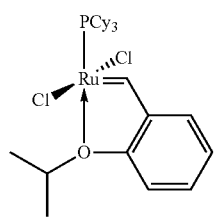
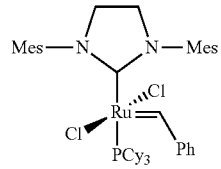
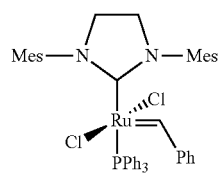
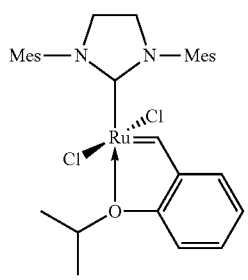
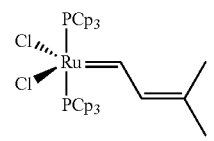
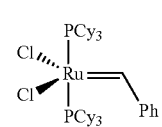
-continued
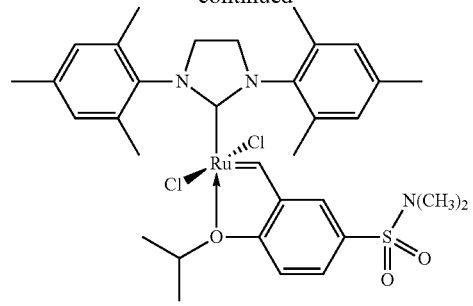
C601
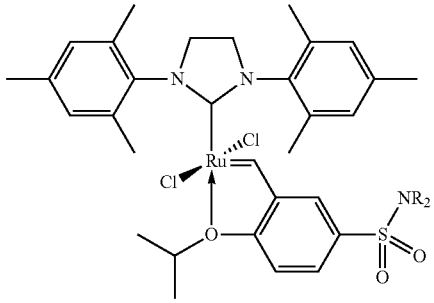
C848
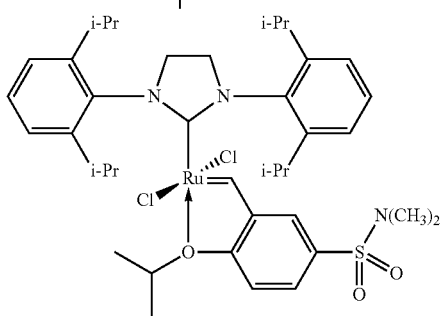
C831
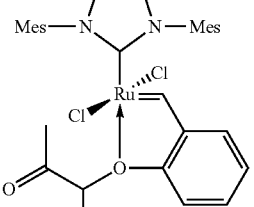
C627
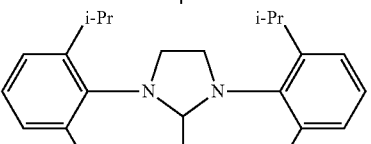
C716
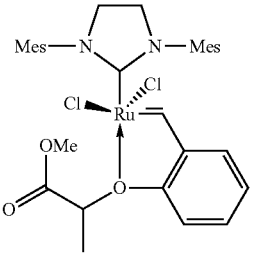
C823

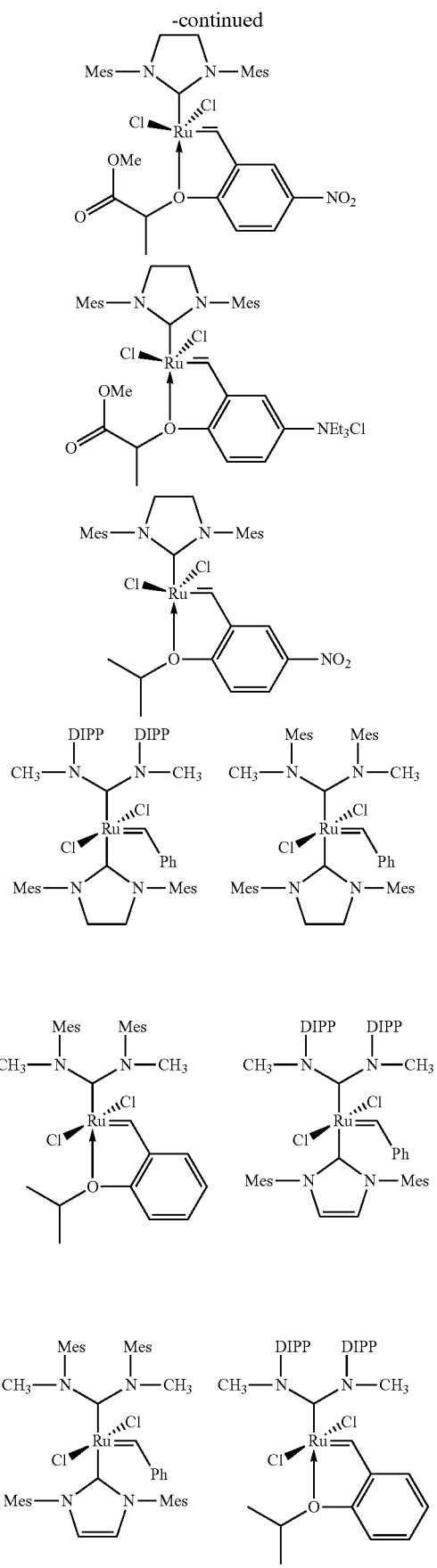
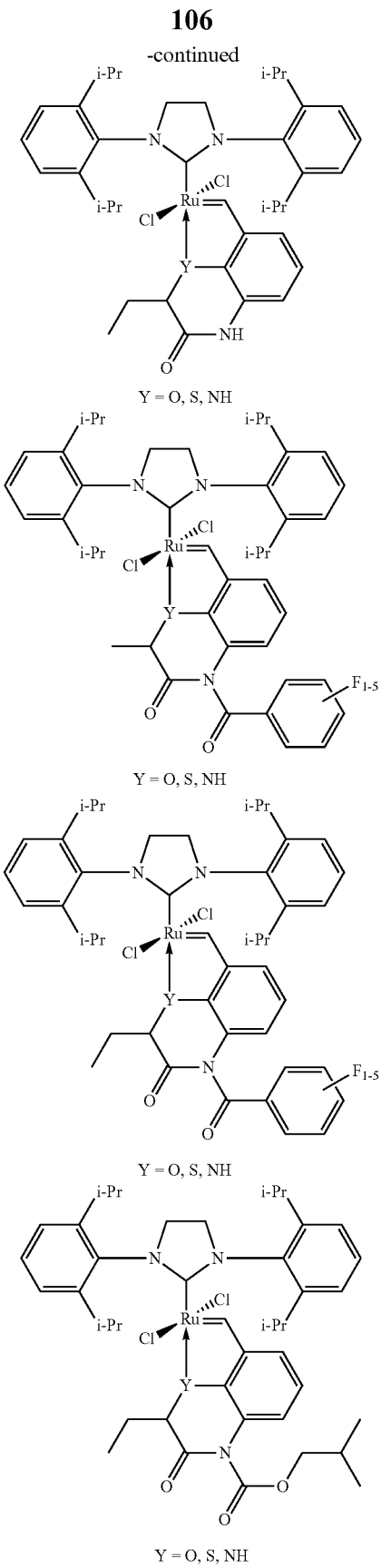
In the foregoing molecular structures and formulae, Ph represents phenyl, Cy represents cyclohexyl, Cp represents cyclopentyl, Me represents methyl, Bu represents n-butyl, t-Bu represents tert-butyl, i-Pr represents isopropyl, py represents pyridine (coordinated through the N atom), Mes represents mesityl (i.e., 2,4,6-trimethylphenyl), DiPP and DIPP represents 2,6-diisopropylphenyl, and MiPP represents 2-isopropylphenyl.

Further examples of catalysts useful to prepare supported complexes and in the reactions disclosed herein include the following: ruthenium (II) dichloro(3-methyl-2-butenylidene) bis(tricyclopentylphosphine) (C716); ruthenium (II) dichloro(3-methyl-2-butenylidene) bis(tricyclohexylphosphine) (C801); ruthenium (II) dichloro(phenylmethylene) bis(tricyclohexylphosphine) (C823); ruthenium (II) (1,3-bis-(2,4,6-trimethylphenyl)-2-imidazolidinylidene) dichloro(phenylmethylene) (triphenylphosphine) (C830); ruthenium (II) dichloro(phenylvinylidene) bis(tricyclohexylphosphine) (C835); ruthenium (II) dichloro(tricyclohexylphosphine) (o-isopropoxyphenylmethylene) (C601); ruthenium (II) (1,3-bis-(2, 4,6-trimethylphenyl)-2-imidazolidinylidene) dichloro(phenylmethylene) bis(3-bromopyridine) (C884); [1,3-bis-(2,4,6-trimethylphenyl)-2-imidazolidinylidene]dichloro(o-isopropoxyphenylmethylene) ruthenium(II) (C627); [1,3-bis-(2,4,6-trimethylphenyl)-2-imidazolidinylidene]dichloro(benzylidene) (triphenylphosphine) ruthenium(II) (C831); [1,3-bis-(2,4,6-trimethylphenyl)-2-imidazolidinylidene]dichloro(benzylidene)(methyldiphenylphosphine)ruthenium(II) (C769); [1,3-bis-(2,4,6-trimethylphenyl)-2-imidazolidinylidene]dichloro(benzylidene)(tricyclohexylphosphine)ruthenium(II) (C848); [1,3-bis-(2,4,6-trimethylphenyl)-2-imidazolidinylidene]dichloro(benzylidene) (diethylphenylphosphine) ruthenium(II) (C735); [1,3-bis-(2,4,6-trimethylphenyl)-2-imidazolidinylidene]dichloro(benzylidene)(tri-n-butylphosphine)ruthenium(II) (C771); [1,3-bis-(2,4,6-trimethylphenyl)-2-imidazolidinylidene]dichloro(3-methyl-2-butenylidene)(triphenylphosphine)ruthenium(II) (C809); [1,3-bis-(2,4,6-trimethylphenyl)-2-imidazolidinylidene]dichloro(3-methyl-2-butenylidene)(methyldiphenylphosphine)ruthenium(II) (C747); [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethylphenyl)-2-imidazolidinylidene]dichloro(3-methyl-2-butenylidene)(diethylphenylphosphine)ruthenium(II) (C713); [1,3-bis-(2,4,6-trimethylphenyl)-2-imidazolidinylidene]dichloro(3-methyl-2-butenylidene) (tri-n-butylphosphine)ruthenium(II) (C749); [1,3-bis-(2,4,6-trimethylphenyl)-2-imidazolidinylidene]dichloro(phenylindenylidene)(triphenylphosphine)ruthenium (II) (C931); [1,3-bis-(2,4,6-trimethylphenyl)-2-imidazolidinylidene]dichloro(phenylindenylidene) (methylphenylphosphine) ruthenium(II) (C869); [1,3-bis-(2, 4,6-trimethylphenyl)-2-imidazolidinylidene]dichloro(phenylindenylidene) (tricyclohexylphosphine) ruthenium(II) (C949); [1,3-bis-(2,4,6-trimethylphenyl)-2-imidazolidinylidene]dichloro(phenylindenylidene)(diethylphenylphosphine)ruthenium(II) (C835); and [1,3-bis-(2,4,6-trimethylphenyl)-2-imidazolidinylidene]dichloro (phenylindenylidene)(tri-n-butylphosphine)ruthenium(II) (C871).

Still further catalysts useful in ROMP reactions, and/or in other metathesis reactions, such as ring-closing metathesis, cross metathesis, ring-opening cross metathesis, self-metathesis, ethenolysis, alkenolysis, acyclic diene metathesis polymerization, and combinations thereof, include the following structures:

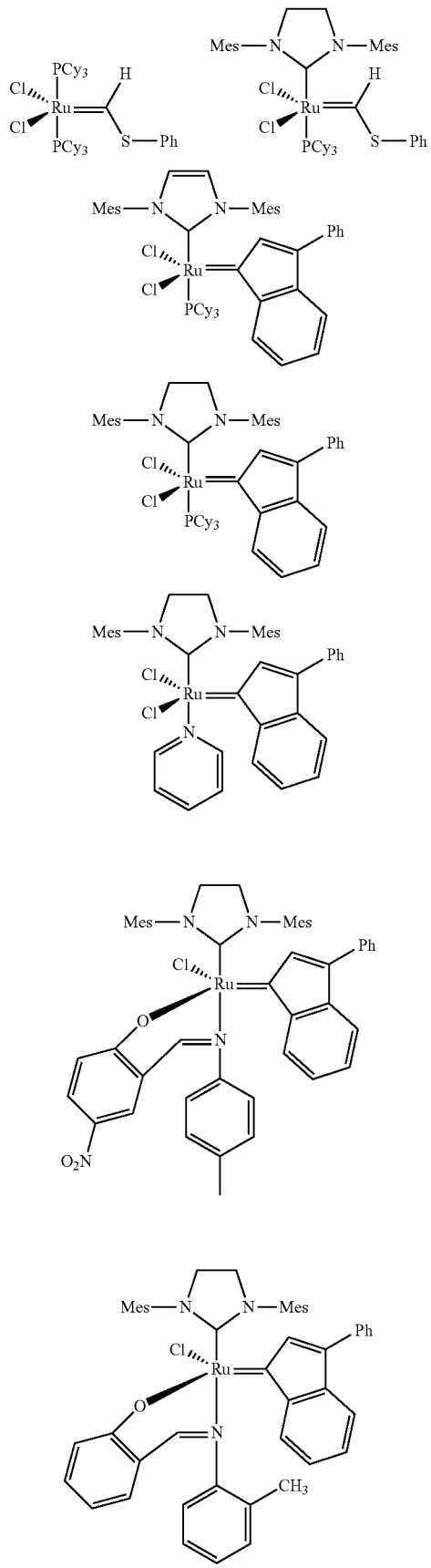

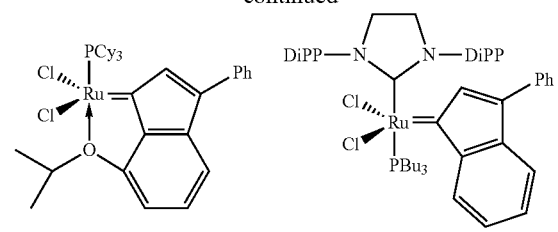

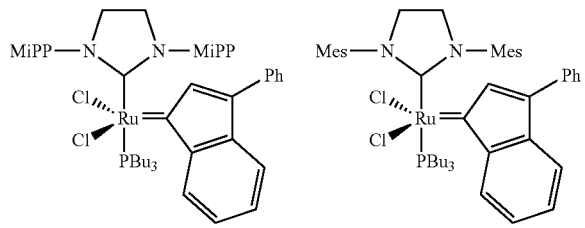

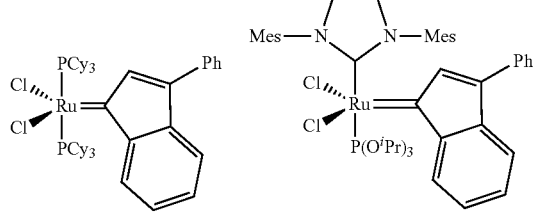

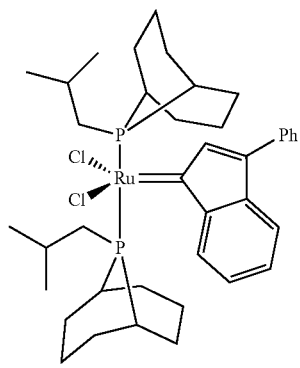

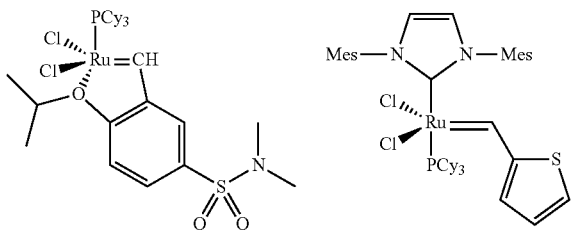

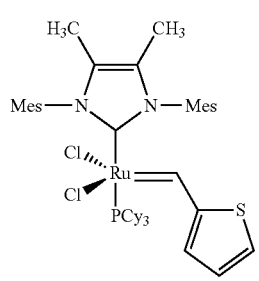

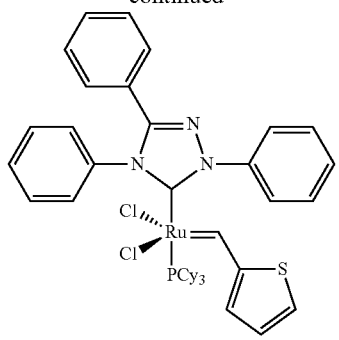

In general, the transition metal complexes used as catalysts herein can be prepared by several different methods, such as those described by Schwab et al. (1996) *J. Am. Chem. Soc.* 118:100-110, Scholl et al. (1999) *Org. Lett.* 6:953-956, Sanford et al. (2001) *J. Am. Chem. Soc.* 123:749-750, U.S. Pat. Nos. 5,312,940, and 5,342,909, the disclosures of each of which are incorporated herein by reference. Also see U.S. Pat. Pub. No. 2003/0055262 to Grubbs et al., WO 02/079208, and U.S. Pat. No. 6,613,910 to Grubbs et al., the disclosures of each of which are incorporated herein by reference. Preferred synthetic methods are described in WO 03/11455A1 to Grubbs et al., the disclosure of which is incorporated herein by reference.

Preferred metal carbene olefin metathesis catalysts are Group 8 transition metal complexes having the structure of formula (I) commonly called "First Generation Grubbs" catalysts, formula (III) commonly called "Second Generation Grubbs" catalysts, or formula (VII) commonly called "Grubbs-Hoveyda" catalysts.

More preferred metal carbene olefin metathesis catalysts have the structure of formula (I)

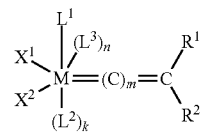

(I)

in which:

M is a Group 8 transition metal;

$L^1$, $L^2$, and $L^3$ are neutral electron donor ligands;

n is 0 or 1;

m is 0, 1, or 2;

k is 0 or 1;

$X^1$ and $X^2$ are anionic ligands;

$R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support;

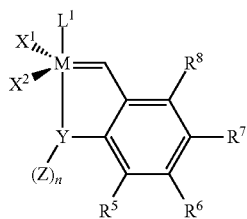

(VII)

wherein,

M is a Group 8 transition metal;

$L^1$ is a neutral electron donor ligand;

$X^1$ and $X^2$ are anionic ligands;

Y is a heteroatom selected from O or N;

$R^5$, $R^6$, $R^7$, and $R^8$ are independently selected from hydrogen, hydrocarbyl, substituted hydrocarbyl, heteroatom-containing hydrocarbyl, substituted heteroatom-containing hydrocarbyl, and functional groups;

n is 0, 1, or 2; and

Z is selected from hydrogen, hydrocarbyl, substituted hydrocarbyl, heteroatom-containing hydrocarbyl, substituted heteroatom-containing hydrocarbyl, and functional groups, wherein any combination of Y, Z, $R^5$, $R^6$, $R^7$, and $R^8$ can be linked to form one or more cyclic groups, and further wherein any combination of $X^1$, $X^2$, $L^1$, Y, Z, $R^5$, $R^6$, $R^7$, and $R^8$ may be attached to a support.

Most preferred metal carbene olefin metathesis catalysts have the structure of formula (I)

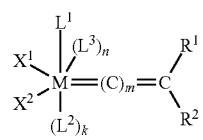

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride;

$R^1$ is hydrogen and $R^2$ is phenyl or —CH=C(CH$_3$)$_2$ or thienyl; or $R^1$ and $R^2$ are taken together to form 3-phenyl-1H-indene;

and formula (VII)

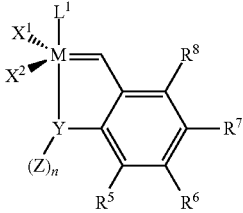

(VII)

wherein,

M is ruthenium;

$L^1$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene;

$X^1$ and $X^2$ are chloride;

Y is oxygen;

$R^5$, $R^6$, $R^7$, and $R^8$ are each hydrogen;

n is 1; and

Z is isopropyl.

An example of metal carbene olefin metathesis catalysts having the structure of formula (I)

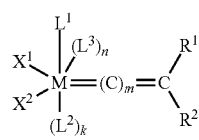

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$ or thienyl; or $R^1$ and $R^2$ are taken together to form an indenylidene moiety.

An example of metal carbene olefin metathesis catalysts having the structure of formula (I)

$$X^1\diagdown_{\substack{M \\ (L^2)_k}}^{\substack{L^1 \\ |\diagup (L^3)_n}} =(C)_m=C\diagup^{R^1}_{R^2} \quad (I)$$

in which:
M is ruthenium;
n is 0;
m is 0;
k is 1;
$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride; and
$R^1$ is hydrogen and $R^2$ is phenyl or —CH=C(CH$_3$)$_2$ or thienyl; or $R^1$ and $R^2$ are taken together to form an indenylidene moiety, where the indenylidene moiety is phenylindenylidene.

An example of metal carbene olefin metathesis catalysts having the structure of formula (I)

$$X^1\diagdown_{\substack{M \\ (L^2)_k}}^{\substack{L^1 \\ |\diagup (L^3)_n}} =(C)_m=C\diagup^{R^1}_{R^2} \quad (I)$$

in which:
M is ruthenium;
n is 0;
m is 0;
k is 1;
$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride; and
$R^1$ is hydrogen and $R^2$ is phenyl or —CH=C(CH$_3$)$_2$; or $R^1$ and $R^2$ are taken together to form an indenylidene moiety.

An example of metal carbene olefin metathesis catalysts having the structure of formula (I)

$$X^1\diagdown_{\substack{M \\ (L^2)_k}}^{\substack{L^1 \\ |\diagup (L^3)_n}} =(C)_m=C\diagup^{R^1}_{R^2} \quad (I)$$

in which:
M is ruthenium;
n is 0;
m is 0;
k is 1;
$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chloride; and
$R^1$ is hydrogen and $R^2$ is phenyl or —CH=C(CH$_3$)$_2$; or $R^1$ and $R^2$ are taken together to form an indenylidene moiety, where the indenylidene moiety is phenylindenylidene.

An example of metal carbene olefin metathesis catalysts having the structure of formula (I)

$$X^1\diagdown_{\substack{M \\ (L^2)_k}}^{\substack{L^1 \\ |\diagup (L^3)_n}} =(C)_m=C\diagup^{R^1}_{R^2} \quad (I)$$

in which:
M is ruthenium;
n is 0;
m is 0;
k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$; or $R^1$ and $R^2$ are taken together to form an indenylidene moiety.

An example of metal carbene olefin metathesis catalysts having the structure of formula (I)

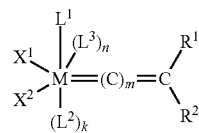

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$; or $R^1$ and $R^2$ are taken together to form an indenylidene moiety, where the indenylidene moiety is phenylindenylidene.

An example of metal carbene olefin metathesis catalysts having the structure of formula (I)

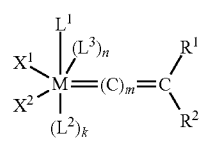

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from 1,3-bis(2,4,6-trimethylphenyl)-2-imidazolidinylidene, and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$; or $R^1$ and $R^2$ are taken together to form an indenylidene moiety.

An example of metal carbene olefin metathesis catalysts having the structure of formula (I)

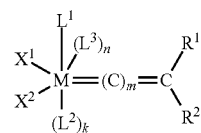

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from 1,3-bis(2,4,6-trimethylphenyl)-2-imidazolidinylidene, and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$; or $R^1$ and $R^2$ are taken together to form an indenylidene moiety, where the indenylidene moiety is phenylindenylidene.

An example of metal carbene olefin metathesis catalysts having the structure of formula (I)

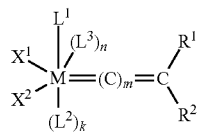

in which:
M is ruthenium;
n is 0;
m is 0;
k is 1;
$L^1$ and $L^2$ are trisubstituted phosphines independently selected from the group consisting of tri-n-butylphosphine ($Pn-Bu_3$), tricyclopentylphosphine ($PCp_3$), tricyclohexylphosphine ($PCy_3$), triisopropylphosphine ($P-i-Pr_3$), triphenylphosphine ($PPh_3$), methyldiphenylphosphine ($PMePh_2$), dimethylphenylphosphine ($PMe_2Ph$), and diethylphenylphosphine ($PEt_2Ph$); or $L^1$ is an N-heterocyclic carbene selected from 1,3-bis(2,4,6-trimethylphenyl)imidazol-2-ylidene, and $L^2$ is a trisubstituted phosphine selected from the group consisting of tri-n-butylphosphine ($Pn-Bu_3$), tricyclopentylphosphine ($PCp_3$), tricyclohexylphosphine ($PCy_3$), triisopropylphosphine ($P-i-Pr_3$), triphenylphosphine ($PPh_3$), methyldiphenylphosphine ($PMePh_2$), dimethylphenylphosphine ($PMe_2Ph$), and diethylphenylphosphine ($PEt_2Ph$);
$X^1$ and $X^2$ are chloride; and
$R^1$ is hydrogen and $R^2$ is phenyl or $-CH=C(CH_3)_2$ or thienyl; or $R^1$ and $R^2$ are taken together to form an indenylidene moiety.

An example of metal carbene olefin metathesis catalysts having the structure of formula (I)

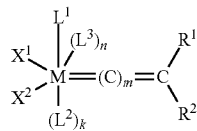

in which:
M is ruthenium;
n is 0;
m is 0;
k is 1;
$L^1$ and $L^2$ are trisubstituted phosphines independently selected from the group consisting of tri-n-butylphosphine ($Pn-Bu_3$), tricyclopentylphosphine ($PCp_3$), tricyclohexylphosphine ($PCy_3$), triisopropylphosphine ($P-i-Pr_3$), triphenylphosphine ($PPh_3$), methyldiphenylphosphine ($PMePh_2$), dimethylphenylphosphine ($PMe_2Ph$), and diethylphenylphosphine ($PEt_2Ph$); or $L^1$ is an N-heterocyclic carbene selected from 1,3-bis(2,4,6-trimethylphenyl)imidazol-2-ylidene, and $L^2$ is a trisubstituted phosphine selected from the group consisting of tri-n-butylphosphine ($Pn-Bu_3$), tricyclopentylphosphine ($PCp_3$), tricyclohexylphosphine ($PCy_3$), triisopropylphosphine ($P-i-Pr_3$), triphenylphosphine ($PPh_3$), methyldiphenylphosphine ($PMePh_2$), dimethylphenylphosphine ($PMe_2Ph$), and diethylphenylphosphine ($PEt_2Ph$);
$X^1$ and $X^2$ are chloride; and
$R^1$ is hydrogen and $R^2$ is phenyl or $-CH=C(CH_3)_2$ or thienyl; or $R^1$ and $R^2$ are taken together to form an indenylidene moiety, where the indenylidene moiety is phenylindenylidene.

An example of metal carbene olefin metathesis catalysts having the structure of formula (I)

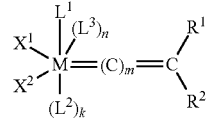

in which:
M is ruthenium;
n is 0;
m is 0;
k is 1;
$L^1$ and $L^2$ are trisubstituted phosphines independently selected from the group consisting of tri-n-butylphosphine ($Pn-Bu_3$), tricyclopentylphosphine ($PCp_3$), tricyclohexylphosphine ($PCy_3$), triisopropylphosphine ($P-i-Pr_3$), triphenylphosphine ($PPh_3$), methyldiphenylphosphine ($PMePh_2$), dimethylphenylphosphine ($PMe_2Ph$), and diethylphenylphosphine ($PEt_2Ph$); or $L^1$ is an N-heterocyclic carbene selected from 1,3-bis(2,4,6-trimethylphenyl)-2-imidazolidinylidene, and $L^2$ is a trisubstituted phosphine selected from the group consisting of tri-n-butylphosphine ($Pn-Bu_3$), tricyclopentylphosphine ($PCp_3$), tricyclohexylphosphine ($PCy_3$), triisopropylphosphine ($P-i-Pr_3$), triphenylphosphine ($PPh_3$), methyldiphenylphosphine ($PMePh_2$), dimethylphenylphosphine ($PMe_2Ph$), and diethylphenylphosphine ($PEt_2Ph$);
$X^1$ and $X^2$ are chloride; and
$R^1$ is hydrogen and $R^2$ is phenyl or $-CH=C(CH_3)_2$ or thienyl; or $R^1$ and $R^2$ are taken together to form an indenylidene moiety.

An example of metal carbene olefin metathesis catalysts having the structure of formula (I)

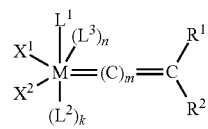

in which:
M is ruthenium;
n is 0;
m is 0;
k is 1;
$L^1$ and $L^2$ are trisubstituted phosphines independently selected from the group consisting of tri-n-butylphosphine ($Pn-Bu_3$), tricyclopentylphosphine ($PCp_3$), tricyclohexylphosphine ($PCy_3$), triisopropylphosphine ($P-i-Pr_3$), triphenylphosphine ($PPh_3$), methyldiphenylphosphine ($PMePh_2$), dimethylphenylphosphine ($PMe_2Ph$), and diethylphenylphosphine ($PEt_2Ph$); or $L^1$ is an N-heterocyclic carbene selected from 1,3-bis(2,4,6-trimethylphenyl)-2-imidazolidinylidene, and $L^2$ is a trisubstituted phosphine selected from the group consisting of tri-n-butylphosphine ($Pn-Bu_3$), tricyclopentylphosphine ($PCp_3$), tricyclohexylphosphine ($PCy_3$), triisopropylphosphine ($P-i-Pr_3$), triphenylphosphine ($PPh_3$), methyldiphenylphosphine ($PMePh_2$), dimethylphenylphosphine ($PMe_2Ph$), and diethylphenylphosphine ($PEt_2Ph$);
$X^1$ and $X^2$ are chloride; and $R^1$ is hydrogen and $R^2$ is phenyl or —CH=C(CH$_3$)$_2$ or thienyl; or $R^1$ and $R^2$ are taken together to form an indenylidene moiety, where the indenylidene moiety is phenylindenylidene.

An example of metal carbene olefin metathesis catalysts having the structure of formula (VII)

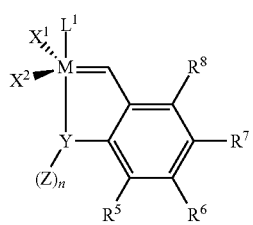

(VII)

wherein,

M is ruthenium;

$L^1$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene;

$X^1$ and $X^2$ are chloride;

Y is oxygen;

$R^5$, $R^6$, $R^7$, and $R^8$ are each hydrogen;

n is 1; and

Z is isopropyl.

An example of metal carbene olefin metathesis catalysts having the structure of formula (I)

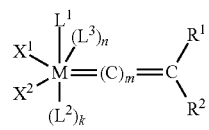

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$ or thienyl.

An example of metal carbene olefin metathesis catalysts having the structure of formula (I)

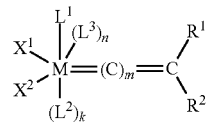

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

$X^1$ and $X^2$ are chloride; and $R^1$ is hydrogen and $R^2$ is phenyl or —CH=C(CH$_3$)$_2$ or thienyl.

An example of metal carbene olefin metathesis catalysts having the structure of formula (I)

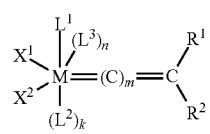

(I)

in which:

M is ruthenium;

n is 0;

m is 0;

k is 1;

$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or $L^1$ is an N-heterocyclic carbene selected from 1,3-bis(2,4,6-trimethylphenyl)-2-imidazolidinylidene, and $L^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

X$^1$ and X$^2$ are chloride; and

R$^1$ is hydrogen and R$^2$ is phenyl or —CH=C(CH$_3$)$_2$ or thienyl.

An example of metal carbene olefin metathesis catalysts having the structure of formula (I)

$$X^1 \diagdown \overset{\overset{L^1}{|} \diagup (L^3)_n}{\underset{\underset{(L^2)_k}{|}}{M}} = (C)_m = C \diagup^{R^1}_{R^2} \qquad (I)$$

in which:
M is ruthenium;
n is 0;
m is 0;
k is 1;
L$^1$ and L$^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or L$^1$ is an N-heterocyclic carbene selected from 1,3-bis(2,4,6-trimethylphenyl)imidazol-2-ylidene, and L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

X$^1$ and X$^2$ are chloride; and

R$^1$ is hydrogen and R$^2$ is phenyl or —CH=C(CH$_3$)$_2$ or thienyl.

An example of metal carbene olefin metathesis catalysts having the structure of formula (I)

$$X^1 \diagdown \overset{\overset{L^1}{|} \diagup (L^3)_n}{\underset{\underset{(L^2)_k}{|}}{M}} = (C)_m = C \diagup^{R^1}_{R^2} \qquad (I)$$

in which:
M is ruthenium;
n is 0;
m is 0;
k is 1;
L$^1$ and L$^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or L$^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

X$^1$ and X$^2$ are chloride; and

R$^1$ is hydrogen and R$^2$ is phenyl or —CH=C(CH$_3$)$_2$.

An example of metal carbene olefin metathesis catalysts having the structure of formula (I)

$$X^1 \diagdown \overset{\overset{L^1}{|} \diagup (L^3)_n}{\underset{\underset{(L^2)_k}{|}}{M}} = (C)_m = C \diagup^{R^1}_{R^2} \qquad (I)$$

in which:
M is ruthenium;
n is 0;
m is 0;
k is 1;
L$^1$ and L$^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or L$^1$ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

X$^1$ and X$^2$ are chloride; and

R$^1$ is hydrogen and R$^2$ is phenyl or —CH=C(CH$_3$)$_2$.

An example of metal carbene olefin metathesis catalysts having the structure of formula (I)

$$X^1 \diagdown \overset{\overset{L^1}{|} \diagup (L^3)_n}{\underset{\underset{(L^2)_k}{|}}{M}} = (C)_m = C \diagup^{R^1}_{R^2} \qquad (I)$$

in which:
M is ruthenium;
n is 0;
m is 0;
k is 1;
L$^1$ and L$^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or L$^1$ is an N-heterocyclic carbene selected from 1,3-bis(2,4,6-trimethylphenyl)-2-imidazolidinylidene, and L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

X$^1$ and X$^2$ are chloride; and

R$^1$ is hydrogen and R$^2$ is phenyl or —CH=C(CH$_3$)$_2$.

An example of metal carbene olefin metathesis catalysts having the structure of formula (I)

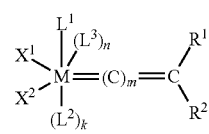

(I)

in which:

M is ruthenium;

n is 0;

m is 0;

k is 1;

L$^1$ and L$^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or L$^1$ is an N-heterocyclic carbene selected from 1,3-bis(2,4,6-trimethylphenyl)imidazol-2-ylidene, and L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);

X$^1$ and X$^2$ are chloride; and

R$^1$ is hydrogen and R$^2$ is phenyl or —CH=C(CH$_3$)$_2$.

An example of a metal carbene olefin metathesis catalyst having the structure of formula (XV):

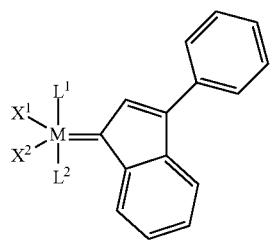

(XV)

wherein,

M is ruthenium;

X$^1$ and X$^2$ are chloride; and

L$^1$ and L$^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or L$^1$ is an N-heterocyclic carbene selected from the group consisting of 1,3-bis(2,4,6-trimethylphenyl)-2-imidazolidinylidene, 1,3-bis(2,4,6-trimethylphenyl)imidazol-2-ylidene, 1,3-bis(2,6-di-isopropylphenyl)-2-imidazolidinylidene, and 1,3-bis(2,6-di-isopropylphenyl)imidazol-2-ylidene and L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph).

An example of a metal carbene olefin metathesis catalyst having the structure of formula (XV):

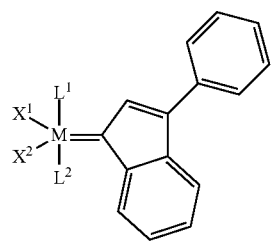

(XV)

wherein,

M is ruthenium;

X$^1$ and X$^2$ are chloride; and

L$^1$ and L$^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or L$^1$ is an N-heterocyclic carbene selected from the group consisting of 1,3-bis(2,4,6-trimethylphenyl)-2-imidazolidinylidene, and 1,3-bis(2,4,6-trimethylphenyl)imidazol-2-ylidene, and L$^2$ is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph).

An example of a metal carbene olefin metathesis catalyst having the structure of formula (XV):

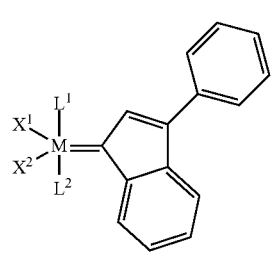

(XV)

wherein,

M is ruthenium;

X$^1$ and X$^2$ are chloride; and

L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)-2-imidazolidinylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph).

An example of a metal carbene olefin metathesis catalyst having the structure of formula (XV):

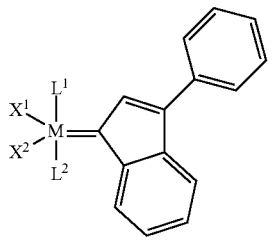

(XV)

wherein,
M is ruthenium;
X¹ and X² are chloride; and
L¹ and L² are trisubstituted phosphines independently selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph); or L¹ is an N-heterocyclic carbene selected from 1,3-bis(2,4,6-trimethylphenyl)imidazol-2-ylidene, and L² is a trisubstituted phosphine selected from the group consisting of tri-n-butylphosphine (Pn-Bu₃), tricyclopentylphosphine (PCp₃), tricyclohexylphosphine (PCy₃), triisopropylphosphine (P-i-Pr₃), triphenylphosphine (PPh₃), methyldiphenylphosphine (PMePh₂), dimethylphenylphosphine (PMe₂Ph), and diethylphenylphosphine (PEt₂Ph).

Suitable supports for any of the catalysts described herein may be of synthetic, semi-synthetic, or naturally occurring materials, which may be organic or inorganic, e.g., polymeric, ceramic, or metallic. Attachment to the support will generally, although not necessarily, be covalent, and the covalent linkage may be direct or indirect. Indirect covalent linkages are typically, though not necessarily, through a functional group on a support surface. Ionic attachments are also suitable, including combinations of one or more anionic groups on the metal complexes coupled with supports containing cationic groups, or combinations of one or more cationic groups on the metal complexes coupled with supports containing anionic groups.

When utilized, suitable supports may be selected from silicas, silicates, aluminas, aluminum oxides, silica-aluminas, aluminosilicates, zeolites, titanias, titanium dioxide, magnetite, magnesium oxides, boron oxides, clays, zirconias, zirconium dioxide, carbon, polymers, cellulose, cellulosic polymers amylose, amylosic polymers, or a combination thereof. The support preferably comprises silica, a silicate, or a combination thereof.

In certain embodiments, it is also possible to use a support that has been treated to include functional groups, inert moieties, and/or excess ligands. Any of the functional groups described herein are suitable for incorporation on the support, and may be generally accomplished through techniques known in the art. Inert moieties may also be incorporated on the support to generally reduce the available attachment sites on the support, e.g., in order to control the placement, or amount, of a complex linked to the support.

The catalyst compositions comprising at least one metal carbene olefin metathesis catalyst may be utilized in olefin metathesis reactions according to techniques known in the art. The catalyst compositions comprising at least one metal carbene olefin metathesis catalyst are typically added to the resin composition as a solid, a solution, or as a suspension. When the catalyst composition comprising at least one metal carbene olefin metathesis catalyst is added to the resin composition as a suspension, the at least one metal carbene olefin metathesis catalyst is suspended in a dispersing carrier such as mineral oil, paraffin oil, soybean oil, tri-isopropylbenzene, or any hydrophobic liquid which has a sufficiently high viscosity so as to permit effective dispersion of the catalyst(s), and which is sufficiently inert and which has a sufficiently high boiling point so that is does not act as a low-boiling impurity in the olefin metathesis reaction. It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the olefinic substrate.

When expressed as the molar ratio of monomer to catalyst, the catalyst (the "monomer to catalyst ratio"), loading will generally be present in an amount that ranges from a low of about 10,000,000:1, 1,000,000:1, or 200,00:1, to a high of about 100,000:1 66,667:1, 40,000:1, 20,000:1, 10,000:1, 5,000:1, or 1,000:1.

Cyclic Olefin (Resin) Compositions, Articles, and Insulated Objects

Resin compositions of the present invention comprise a cyclic olefin composition. For example, in one embodiment a resin composition according to the present invention comprises a cyclic olefin composition, wherein the cyclic olefin composition comprise 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn). Other embodiments of cyclic olefin resin compositions may be used to in resin compositions of the invention herein as well. Additionally, resin compositions of the invention may also comprise at least one substrate material. Additionally, resin compositions according to the invention may also comprise at least one adhesion promoter, where the resin composition is combined with a catalyst composition comprising at least one olefin metathesis catalyst to form a ROMP composition, and the resulting ROMP composition is applied to at least one substrate material. Additionally, resin compositions according to the invention may also comprise a cyclic olefin composition and at least one adhesion promoter comprising at least one compound containing at least two isocyanate groups, where the resin composition is combined with at least one olefin metathesis catalyst, and the resulting ROMP composition is applied to at least one substrate material, wherein the substrate material may be functionalized substrate material, such as, for example, a heteroatom-functionalized substrate, such as, for example, an amino-functionalized substrate. Additionally, resin compositions according to the invention may also comprise at least one adhesion promoter comprising at least one compound containing at least two isocyanate groups, where the resin composition is combined with at least olefin metathesis catalyst, and the resulting resin composition is applied to at least one substrate material, such as, for example, a glass substrate material or carbon substrate material. In another embodiment, resin compositions, particularly ROMP compositions according to the invention comprise at a cyclic olefin composition, at least one olefin metathesis catalyst, at least one adhesion promoter comprising at least one compound containing at least two isocyanate groups, and at least one heteroatom-functionalized substrate material.

The amounts of the adhesion promoter in the resin composition may vary over a wide range and may vary depending on the manufacturing operation or the particular end-use application. Generally, any level of adhesion promoter which produces a desired increase in mechanical properties is of particular interest. When formulated or combined with a resin composition, the concentration of the adhesion promoter typically ranges from 0.001-50 phr, particularly 0.05-10 phr, more particularly 0.1-10 phr, or even more particularly 0.5-4.0 phr.

In particular aspects of the present invention, substrate materials may advantageously comprise an aminosilane-treated substrate.

In another embodiment, resin compositions according to the invention may additionally comprise an exogenous inhibitor. Exogenous inhibitors or "gel modification additives", for use in the present invention are disclosed in U.S. Pat. No. 5,939,504, the contents of which are incorporated herein by reference. In another embodiment, resin compositions according to the invention may additionally comprise a hydroperoxide gel modifier. Hydroperoxide gel modifiers (e.g. cumene hydroperoxide) for use in the present invention are disclosed in International Pat. App. No. PCT/US2012/042850.

In another embodiment, the resin compositions according to the invention may additionally comprise an adhesion promoter. Adhesion promoters for use in the present invention are disclosed in International Pat. App. No. PCT/US2012/042850.

Resin compositions of the invention may be optionally formulated with additives. Suitable additives include, but are not limited to, gel modifiers, hardness modulators, antioxidants, antiozonants, stabilizers, crosslinkers, fillers, binders, coupling agents, thixotropes, wetting agents, biocides, plasticizers, pigments, flame retardants, dyes, fibers and reinforcement materials, including sized reinforcements and substrates, such as those treated with finishes, coatings, coupling agents, film formers and/or lubricants. Furthermore, the amount of additives present in the resin compositions may vary depending on the particular type of additive used. The concentration of the additives in the resin compositions typically ranges from, for example, 0.001-85 percent by weight, particularly, from 0.1-75 percent by weight, or even more particularly, from 2-60 percent by weight.

Resin compositions of the invention may be optionally formulated with or without a crosslinker, for example, a crosslinker selected from dialkyl peroxides, diacyl peroxides, and peroxyacids.

Additionally, suitable impact modifiers or elastomers include without limitation natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate, and nitrile rubbers. Preferred impact modifiers or elastomers are polybutadiene Diene 55AC10 (Firestone), polybutadiene Diene 55AM5 (Firestone), EPDM Royalene 301T, EPDM Buna T9650 (Bayer), styrene-ethylene/butylene-styrene copolymer Kraton G1651H, Polysar Butyl 301 (Bayer), polybutadiene Taktene 710 (Bayer), styrene-ethylene/butylene-styrene Kraton G1726M, Ethylene-Octene Engage 8150 (DuPont-Dow), styrene-butadiene Kraton D1184, EPDM Nordel 1070 (DuPont-Dow), and polyisobutylene Vistanex MML-140 (Exxon). Such materials are normally employed in the resin composition at levels of about 0.10 phr to 10 phr, but more preferably at levels of about 0.1 phr to 5 phr. Various polar impact modifiers or elastomers can also be used.

Antioxidants and antiozonants include any antioxidant or antiozonant used in the rubber or plastics industry. An "Index of Commercial Antioxidants and Antiozonants, Fourth Edition" is available from Goodyear Chemicals, The Goodyear Tire and Rubber Company, Akron, Ohio 44316. Suitable stabilizers (i.e., antioxidants or antiozonants) include without limitation: 2,6-di-tert-butyl-4-methylphenol (BHT); styrenated phenol, such as Wingstay® S (Goodyear); 2- and 3-tert-butyl-4-methoxyphenol; alkylated hindered phenols, such as Wingstay C (Goodyear); 4-hydroxymethyl-2,6-di-tert-butylphenol; 2,6-di-tert-butyl-4-sec-butylphenol; 2,2'-methylenebis(4-methyl-6-tert-butylphenol); 2,2'-methylenebis(4-ethyl-6-tert-butylphenol); 4,4'-methylenebis(2,6-di-tert-butylphenol); miscellaneous bisphenols, such as Cyanox® 53 (Cytec Industries Inc.) and Permanax WSO; 2,2'-ethylidenebis(4,6-di-tert-butylphenol); 2,2'-methylenebis(4-methyl-6-(1-methylcyclohexyl)phenol); 4,4'-butylidenebis(6-tert-butyl-3-methylphenol); polybutylated Bisphenol A; 4,4'-thiobis(6-tert-butyl-3-methylphenol); 4,4'-methylenebis(2,6-dimethylphenol); 1,1'-thiobis(2-naphthol); methylene bridged polyalkylphenol, such as Ethyl antioxidant 738; 2,2'-thiobis(4-methyl-6-tert-butylphenol); 2,2'-isobutylidenebis(4,6-dimethylphenol); 2,2'-methylenebis(4-methyl-6-cyclohexylphenol); butylated reaction product of p-cresol and dicyclopentadiene, such as Wingstay L; tetrakis(methylene-3,5-di-tert-butyl-4-hydroxyhydrocinnamate) methane, i.e., Irganox® 1010 (BASF); 1,3,5-trimethyl-2,4,6-tris (3,5-di-tert-butyl-4-hydroxybenzyl) benzene, e.g., Ethanox® 330 (Albemarle Corporation); 4,4'-methylenebis (2,6-di-tertiary-butylphenol), e.g., Ethanox 4702 or Ethanox 4710; 1,3,5-tris(3,5-di-tert-butyl-4-hydroxybenzyl)isocyanurate, i.e., Good-rite® 3114 (Emerald Performance Materials), 2,5-di-tert-amylhydroquinone, tert-butylhydroquinone, tris(nonylphenylphosphite), bis(2,4-di-tert-butyl) pentaerythritol)diphosphite, distearyl pentaerythritol diphosphite, phosphited phenols and bisphenols, such as Naugard® 492 (Chemtura Corporation), phosphite/phenolic antioxidant blends, such as Irganox B215; di-n-octadecyl(3, 5-di-tert-butyl-4-hydroxybenzyl)phosphonate, such as Irganox 1093; 1,6-hexamethylene bis(3-(3,5-di-tert-butyl-4-hydroxyphenylpropionate), such as Irganox 259, and octadecyl-3,5-di-tert-butyl-4-hydroxyhydrocinnamate, i.e., Irganox 1076, tetrakis(2,4-di-tert-butylphenyl)4,4'-biphenylylenediphosphonite, diphenylamine, and 4,4'-dimethoxydiphenylamine. Such materials are normally employed in the resin composition at levels of about 0.10 phr to 10 phr, but more preferably at levels of about 0.1 phr to 5 phr.

Suitable reinforcing materials include those that add to the strength or stiffness of a polymer composite when incorporated with the polymer. Reinforcing materials can be in the form of filaments, fibers, rovings, mats, weaves, fabrics, knitted material, cloth, or other known structures. Suitable reinforcement materials include glass fibers and fabrics, carbon fibers and fabrics, aramid fibers and fabrics, polyolefin fibers or fabrics (including ultrahigh molecular weight polyethylene fabrics such as those produced by Honeywell under the Spectra® trade name), and polyoxazole fibers or fabrics (such as those produced by the Toyobo Corporation under the Zylon® trade name). Reinforcing materials containing surface finishes, sizings, or coatings are particularly suitable for the described invention including Ahlstrom glass roving (R338-2400), Johns Manville glass roving (Star ROV®-086), Owens Corning rovings (OCV 366-AG-207, R25H-X14-2400, SE1200-207, SE1500-2400, SE2350-250), PPG glass rovings (Hybon® 2002, Hybon® 2026), Toho Tenax® carbon fiber tow (HTR-40), and Zoltek carbon fiber tow (Panex® 35). Furthermore, any fabrics prepared using reinforcing materials containing surface finishes, sizings or coatings are suitable for the invention. Advantageously, the invention does not require the expensive process of removing of surface finishes, sizings, or coatings from the reinforcing materials. Additionally, glass fibers or fabrics may include without limitation A-glass, E-glass or S-glass, S-2 glass, C-glass, R-glass, ECR-glass, M-glass, D-glass, and quartz, and silica/quartz. Preferred glass fiber reinforcements are those with finishes formulated for use with epoxy, vinyl ester, and/or polyurethane resins. When formulated for use with a combination of these resin types, the reinforcements are sometimes described as "multi-compatible." Such reinforcements are generally treated during their manufacture with organosilane coupling agents comprising vinyl, amino, glycidoxy, or methacryloxy functional groups (or various combinations thereof) and are coated with a finish to protect the fiber surface and facilitate handling and processing (e.g., spooling and weaving). Finishes typically comprise a mixture of chemical and polymeric compounds such as film formers, surfactants, and lubricants. Especially preferred glass reinforcements are those containing some amount of amino-functionalized silane coupling agent. Especially preferred finishes are those comprising and epoxy-based and/or polyurethane-based film formers. Examples of preferred glass-fiber reinforcements are those based on Hybon® 2026, 2002, and 2001 (PPG) multi-compatible rovings; Ahlstrom R338 epoxysilane-sized rovings; StarRov® 086 (Johns Manville) soft silane sized multi-compatible rovings; OCV™ 366, SE 1200, and R25H (Owens Corning) multi-compatible rovings; OCV™ SE 1500 and 2350 (Owens Corning) epoxy-compatible rovings; and Jushi Group multi-compatible glass rovings (752 type, 396 type, 312 type, 386 type). Additional suitable polymer fibers and fabrics may include without limitation one or more of polyester, polyamide (for example, NYLON polamide available from E.I. DuPont, aromatic polyamide (such as KEVLAR aromatic polyamide available from E.I. DuPont, or P84 aromatic polyamide available from Lenzing Aktiengesellschaft), polyimide (for example KAPTON polyimide available from E.I. DuPont, polyethylene (for example, DYNEEMA polyethylene from Toyobo Co., Ltd.). Additional suitable carbon fibers may include without limitation AS2C, AS4, AS4C, AS4D, AS7, IM6, IM7, IM9, and PV42/850 from Hexcel Corporation; TORAYCA T300, T300J, T400H, T600S, T700S, T700G, T800H, T800S, T1000G, M35J, M40J, M46J, M50J, M55J, M60J, M30S, M30G and M40 from Toray Industries, Inc.; HTS12K/24K, G30-500 3k/6K/12K, G30-500 12K, G30-700 12K, G30-7000 24K F402, G40-800 24K, STS 24K, HTR 40 F22 24K 1550 tex from Toho Tenax, Inc.; 34-700, 34-700WD, 34-600, 34-600WD, and 34-600 unsized from Grafil Inc.; T-300, T-650/35, T-300C, and T-650/35C from Cytec Industries. Additionally suitable carbon fibers may include without limitation AKSACA (A42/D011), AKSACA (A42/D012), Blue Star Starafil (10253512-90), Blue Star Starafil (10254061-130), SGL Carbon (C30 T050 1.80), SGL Carbon (C50 T024 1.82), Grafil (347R1200U), Grafil (THR 6014A), Grafil (THR 6014K), Hexcel Carbon (AS4C/EXP 12K), Mitsubishi (Pyrofil TR 50S 12L AF), Mitsubishi (Pyrofil TR 50S 12L AF), Toho Tenax (T700SC 12000-50C), Toray (T700SC 12000-90C), Zoltek (Panex 35 50K, sizing 11), Zoltek (Panex 35 50K, sizing 13). Additional suitable carbon fabrics may include without limitation Carbon fabrics by Vectorply (C-L 1800) and Zoltek (Panex 35 UD Fabic-PX35UD0500-1220). Additionally suitable glass fabrics may include without limitation glass fabrics as supplied by Vectorply (E-LT 3500-10) based on PPG Hybon® 2026; Saertex (U14EU970-01190-T2525-125000) based on PPG Hybon® 2002; Chongqing Polycomp Internation Corp. (CPIC® Fiberglass) (EKU 1150(0)/50-600); and Owens Corning (L1020/07A06 Xweft 200 tex).

Other suitable fillers include, for example, metallic density modulators, microparticulate density modulators, such as, for example, microspheres, and macroparticulate density modulators, such as, for example, glass or ceramic beads. Metallic density modulators include, but are not limited to, powdered, sintered, shaved, flaked, filed, particulated, or granulated metals, metal oxides, metal nitrides, and/or metal carbides, and the like. Preferred metallic density modulators include, among others, tungsten, tungsten carbide, aluminum, titanium, iron, lead, silicon oxide, aluminum oxide, boron carbide, and silicon carbide. Microparticulate density modulators include, but are not limited to, glass, metal, thermoplastic (either expandable or pre-expanded) or thermoset, and/or ceramic/silicate microspheres. Macroparticulate density modulators include, but are not limited to, glass, plastic, or ceramic beads; metal rods, chunks, pieces, or shot; hollow glass, ceramic, plastic, or metallic spheres, balls, or tubes; and the like.

The invention is also directed to articles manufactured from a resin composition comprising at least one cyclic olefin, at least one metal carbene olefin metathesis catalyst, wherein the article is a thermal insulation material. The invention is also directed to articles manufactured from a resin composition comprising at least one cyclic olefin, at least one olefin metathesis catalyst, at least one adhesion promoter comprising at least one compound containing at least two isocyanate groups, and at least one substrate material, wherein the article is a thermal insulation material. Additionally, the invention is directed to articles manufactured from a resin composition comprising at least one cyclic olefin, at least one olefin metathesis catalyst, and at least one adhesion promoter comprising at least one compound containing at least two isocyanate groups, where the resin composition is combined with at least one olefin metathesis catalyst, and the resulting ROMP composition is applied to at least one substrate material, which may be, for example, a functionalized substrate, such as, for example, a heteroatom-functionalized substrate, such as, for example, an amino-functionalized substrate, wherein the article is a thermal insulation material.

The invention is also directed to articles manufactured from a resin composition comprising a cyclic olefin composition and a catalyst composition comprising at least one metal carbene olefin metathesis catalyst.

The invention is also directed to articles manufactured from a resin composition comprising a cyclic olefin composition and a catalyst composition comprising at least one metal carbene olefin metathesis catalyst, wherein the article is a thermal insulation material.

The invention is also directed to articles manufactured from a resin composition comprising a cyclic olefin composition, a catalyst composition comprising at least one metal carbene olefin metathesis catalyst, and at least one adhesion promoter comprising at least one compound containing at least two isocyanate groups, where the resin composition is combined with at least one olefin metathesis catalyst, and the resulting ROMP composition is applied to at least one substrate material.

The invention is also directed to articles manufactured from a resin composition comprising a cyclic olefin composition, at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn), wherein the article is a thermal insulation material. The invention is also directed to articles manufactured from a resin composition comprising a cyclic olefin composition, at least one olefin metathesis catalyst, at least one adhesion promoter comprising at least one compound containing at least two isocyanate groups, and at least one substrate material, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn), wherein the article is a thermal insulation material. Additionally, the invention is directed to articles manufactured from a resin composition comprising a cyclic olefin composition, at least one olefin metathesis catalyst, and at least one adhesion promoter comprising at least one compound containing at least two isocyanate groups, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn), where the resin composition is combined with at least one olefin metathesis catalyst, and the resulting ROMP composition is applied to at least one substrate material, which may be, for example, a functionalized substrate, such as, for example, a heteroatom-functionalized substrate, such as, for example, an amino-functionalized substrate, wherein the article is a thermal insulation material.

Additionally, the invention is directed to objects at least partially coated with a thermal insulation material, wherein the thermal insulation material is a ROMP polymer. Additionally, the invention is directed to objects at least partially coated with a thermal insulation material, wherein the thermal insulation material is a ROMP polymer composite.

The invention is directed to objects at least partially coated with a thermal insulation material, wherein the thermal insulation material is a ROMP polymer, wherein the ROMP polymer is a reaction product of a resin composition comprising a cyclic olefin composition and a catalyst composition comprising at least one metal carbene olefin metathesis catalyst.

The invention is directed to objects at least partially coated with a thermal insulation material, wherein the thermal insulation material is a ROMP polymer composite, wherein the ROMP polymer composite is a reaction product of a resin composition comprising a cyclic olefin composition and a catalyst composition comprising at least one metal carbene olefin metathesis catalyst.

Additionally, the invention is directed to objects at least partially coated with a thermal insulation material, wherein the thermal insulation material is a ROMP polymer, wherein the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —(Z*)$_n$-Fn where n is zero or 1, Z* and Fn, and functional groups (Fn). Additionally, the invention is directed to objects at least partially coated with a thermal insulation material, wherein the thermal insulation material is a ROMP polymer composite, wherein the ROMP polymer composite is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

Additionally, the invention is directed to objects at least partially encased by a thermal insulation material, wherein the thermal insulation material is a ROMP polymer. Additionally, the invention is directed to objects at least partially encased by a thermal insulation material, wherein the thermal insulation material is a ROMP polymer composite.

Additionally, the invention is directed to objects at least partially encased by a thermal insulation material, wherein the thermal insulation material is a ROMP polymer, wherein the ROMP polymer is a reaction product of a resin composition comprising a cyclic olefin composition and a catalyst composition comprising at least one metal carbene olefin metathesis catalyst.

Additionally, the invention is directed to objects at least partially encased by a thermal insulation material, wherein the thermal insulation material is a ROMP polymer composite, wherein the ROMP polymer composite is a reaction product of a resin composition comprising a cyclic olefin composition and a catalyst composition comprising at least one metal carbene olefin metathesis catalyst.

Additionally, the invention is directed to objects at least partially encased by a thermal insulation material, wherein the thermal insulation material is a ROMP polymer, wherein the ROMP polymer is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn). Additionally, the invention is directed to objects at least partially encased by a thermal insulation material, wherein the thermal insulation material is a ROMP polymer composite, wherein the ROMP polymer composite is a reaction product of a resin composition comprising a cyclic olefin composition and a catalyst composition comprising at least one metal carbene olefin metathesis catalyst, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn).

Additionally, the invention is directed to a process for a ROMP polymer coating for offshore applications, the process comprising, providing an object surface to be at least partially coated, providing a resin composition comprising at least one cyclic olefin, providing a catalyst composition comprising at least one metal carbene olefin metathesis catalyst, combining the resin composition comprising at least one cyclic olefin and catalyst composition comprising at least one metal carbene olefin metathesis catalyst to form a ROMP composition, contacting the object surface with the ROMP composition, and subjecting the ROMP composition to conditions effective to polymerize the ROMP composition.

Additionally, the invention is directed to a process for a ROMP polymer coating for offshore applications, the process comprising, providing an object surface to be at least partially coated, providing a resin composition comprising a cyclic olefin composition, providing a catalyst composition comprising at least one metal carbene olefin metathesis catalyst, combining the resin composition comprising the cyclic olefin composition and catalyst composition comprising at least one metal carbene olefin metathesis catalyst to form a ROMP composition, contacting the object surface with the ROMP composition, and subjecting the ROMP composition to conditions effective to polymerize the ROMP composition.

Additionally, the invention is directed to a process for a ROMP polymer coating for offshore applications, the process comprising, providing an object surface to be at least partially coated, providing a resin composition comprising a cyclic olefin composition, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —$(Z^*)_n$-Fn where n is zero or 1, $Z^*$ and Fn, and functional groups (Fn), providing a catalyst composition comprising at least one metal carbene olefin metathesis catalyst, combining the resin composition comprising a cyclic olefin composition and catalyst composition comprising at least one metal carbene olefin metathesis catalyst to form a ROMP composition, contacting the object surface with the ROMP composition, and subjecting the ROMP composition to conditions effective to polymerize the ROMP composition.

Additionally, the invention is directed to a process for a ROMP polymer coating for offshore applications, the process comprising, providing an object surface to be at least partially coated, providing a resin composition comprising at least one cyclic olefin, providing a catalyst composition comprising at least one metal carbene olefin metathesis catalyst, combining the resin composition comprising at least one cyclic olefin and catalyst composition comprising at least one metal carbene olefin metathesis catalyst to form a ROMP composition, applying the ROMP composition to the object surface, and subjecting the ROMP composition to conditions effective to polymerize the ROMP composition.

Additionally, the invention is directed to a process for a ROMP polymer coating for offshore applications, the process comprising, providing an object surface to be at least partially coated, providing a resin composition comprising a cyclic olefin composition, providing a catalyst composition comprising at least one metal carbene olefin metathesis catalyst, combining the resin composition comprising the cyclic olefin composition and catalyst composition comprising at least one metal carbene olefin metathesis catalyst to form a ROMP composition, applying the ROMP composition to the object surface, and subjecting the ROMP composition to conditions effective to polymerize the ROMP composition.

Additionally, the invention is directed to a process for a ROMP polymer coating for offshore applications, the process comprising, providing an object surface to be at least partially coated, providing a resin composition comprising a cyclic olefin composition, wherein the cyclic olefin composition comprises 10.0 mol % to 80.0 mol % of at least one cyclic olefin containing multiunsaturation, and up to 90.0 mol % of at least one cyclic olefin containing monounsaturation, wherein the at least one cyclic olefin containing multiunsaturation may be substituted or unsubstituted, and wherein the at least one cyclic olefin containing monounsaturation may be substituted or unsubstituted, and wherein the substituents are independently selected from hydrogen, hydrocarbyl, substituted hydrocarbyl, heteroatom-containing hydrocarbyl, substituted heteroatom-containing hydrocarbyl, —($Z^*$)$_n$-Fn where n is zero or 1, $Z^*$ and Fn, and functional groups (Fn), providing a catalyst composition comprising at least one metal carbene olefin metathesis catalyst, combining the resin composition comprising a cyclic olefin composition and catalyst composition comprising at least one metal carbene olefin metathesis catalyst to form a ROMP composition, applying the ROMP composition to the object surface, and subjecting the ROMP composition to conditions effective to polymerize the ROMP composition.

The ROMP polymers and/or ROMP polymer composites of the invention may be applied to an object using a variety of methods known in the art. In one method, a form or mold is placed or constructed around the object to be insulated. The resin composition comprising at least one cyclic olefin and the catalyst composition comprising at least one cyclic olefin are combined to form a ROMP composition and the ROMP composition is the applied between the object and the mold and the ROMP composition is then subjected to conditions effective to cure the ROMP composition. Once the ROMP composition has cured, the mold is removed.

The application of the ROMP composition to the object surface to be at least partially coated is carried out by methods known in the art, examples include, but are not limited to casting, centrifugal casting, pultrusion, molding, rotational molding, open molding, reaction injection molding (RIM), resin transfer molding (RTM), pouring, vacuum impregnation, surface coating, filament winding, cell casting, dip casting, continuous casting, embedding, potting, encapsulation, film casting or solvent casting, gated casting, mold casting, slush casting, extrusion, mechanical foaming, chemical foaming, physical foaming, compression molding or matched die molding, spray up, spraying, Vacuum Assisted Resin Transfer Molding (VARTM), Seeman's Composite Resin Infusion Molding Process (SCRIMP), blow molding, in mold coating, in-mold painting or injection, vacuum forming, Reinforced Reaction Injection Molding (RRIM), Structural Reaction Injection Molding (SRIM), thermal expansion transfer molding (TERM), resin injection recirculation molding (RICM), controlled atmospheric pressure resin infusion (CAPRI), hand-layup. For manufacturing techniques requiring the use of a RIM or impingement style mixhead, including without limitation RIM, SRIM, and RRIM, articles of manufacture may be molded using a single mixhead or a plurality of mixheads as well as a plurality of material injection streams (e.g., two resin streams and one catalyst stream).

The ROMP polymer and/or ROMP polymer composite thermal insulation materials of the invention need not necessarily be molded around an object to be insulated. In the alternative, a ROMP polymer article and/or ROMP polymer composite article may be independently prepared by a variety of methods known in the art and then subsequently affixed to or placed around an object to thermally insulate the object from the surrounding environment. Moreover, the means for affixing a ROMP polymer article and/or ROMP polymer composite article to an object may be by any known means including an adhesive means and/or mechanical means such as fasteners, bolts, screws, etc. For example, a ROMP polymer thermal insulation material and/or a ROMP polymer composite thermal insulation material can be pre-made into sections which are shaped to complement the object to be insulated. The pre-made sections may then be secured or affixed to the object using any known means.

Additionally, the object to be insulated may be pretreated with any known tie coat or primer, which is suitable to improve and/or enhance the adhesion of the ROMP polymer and/or ROMP polymer composite thermal insulation material to the object. For example, the tie coat or primer may be first applied to the object to be insulated, then a ROMP composition may be applied to the object, and the ROMP composition is subsequently subjected to conditions effective to polymerize the ROMP composition. Furthermore, the tie coat or primer may be applied to the object to be insulated, and a pre-made ROMP polymer thermal insulation material and/or pre-made ROMP polymer composite thermal insulation material may be subsequently affixed to the object.

The thermal insulation and/or thermal insulation coating may be of any configuration, weight, size, thickness, or geometric shape. Furthermore, the thermal insulation and/or thermal insulation coating is not limited to a single polymer layer, but also include multiple polymer layers, where each polymer layer may comprise the same or different composition.

The objects to be encased, coated and/or insulated may be of any configuration, weight, size, thickness, or geometric shape. Furthermore, the objects to be encased, coated and/or insulated may be constructed of any material including but not limited to metal, metal alloys, plastic, rubber, polymer, wood, ceramic, glass, carbon, cement, concrete, etc.

The objects to be encased, coated and/or insulated may be partially or fully encased, coated, and/or insulated.

In particular, ROMP polymers and/or ROMP polymer composites of the present invention are suitable for thermal insulation of objects, such as oil pipelines in cold water (e.g. cold sea water, cold fresh water) and for insulating wellhead equipment. The ROMP polymers and/or ROMP polymer composites of the present invention may also be used for insulating other objects including but not limited to pipes, pipelines, pipe fittings, hose, hose fitting, tanks, containers, drums, manifolds, risers, field joints, configurations designated as Christmas tree (oil field Christmas tree, subsea Christmas tree), jumpers, spool pieces, configurations designated as pipeline end termination (PLET), configurations designated as pipeline end manifolds (PLEM), and other sub-sea architectures and equipment. The ROMP polymers and/or ROMP polymer composites of the present invention may also be used to coat other objects such as robotic parts, devices and vehicles used in sub-sea applications. Moreover, ROMP polymers and/or ROMP polymer composites of the present invention may be used to construct thermal insulation structures such as configurations designated as subsea dog houses.

ROMP polymers and/or ROMP polymer composites of the present invention may be used for insulating objects such as well-head equipment.

ROMP polymers and/or ROMP polymer composites of the present invention may be used for insulating objects such as pipes.

ROMP polymers and/or ROMP polymer composites of the present invention may be used for insulating objects such as sub-sea pipes.

ROMP polymers and/or ROMP polymer composites of the present invention may be used for insulating objects such as oil pipelines.

ROMP polymers and/or ROMP polymer composites of the present invention may be used for insulating objects such as subsea oil pipelines.

ROMP polymers and/or ROMP polymer composites of the present invention may be used for insulating objects such as pipelines.

ROMP polymers and/or ROMP polymer composites of the present invention may be used for insulating objects such as subsea pipelines.

ROMP polymers and/or ROMP polymer composites of the present invention may be used for insulating objects such as field joints.

ROMP polymers and/or ROMP polymer composites of the present invention may be used for insulating objects such as pipe fittings.

ROMP polymers and/or ROMP polymer composites of the present invention may be used for insulating objects such as manifolds.

ROMP polymers and/or ROMP polymer composites of the present invention may be used for insulating objects such as risers.

ROMP polymers and/or ROMP polymer composites of the present invention may be used for insulating objects such as oil field Christmas tree.

ROMP polymers and/or ROMP polymer composites of the present invention may be used for insulating objects such as subsea Christmas tree.

ROMP polymers and/or ROMP polymer composites of the present invention may be used for insulating objects such as jumpers.

ROMP polymers and/or ROMP polymer composites of the present invention may be used for insulating objects such as spool pieces.

ROMP polymers and/or ROMP polymer composites of the present invention may be used for insulating objects such configurations designated as pipeline end termination (PLET).

ROMP polymers and/or ROMP polymer composites of the present invention may be used for insulating objects such configurations designated as pipeline end manifolds (PLEM).

ROMP polymers and/or ROMP polymer composites of the present invention may be used for insulating objects such as subsea architectures.

ROMP polymers and/or ROMP polymer composites of the present invention may be used for insulating objects such as subsea equipment.

ROMP polymers and/or ROMP polymer composites of the present invention may be used for insulating objects such as hose.

ROMP polymers and/or ROMP polymer composites of the present invention may be used for insulating objects such as hose fitting.

ROMP polymers and/or ROMP polymer composites of the present invention may be used for insulating objects such as tanks.

ROMP polymers and/or ROMP polymer composites of the present invention may be used for insulating objects such as containers.

ROMP polymers and/or ROMP polymer composites of the present invention may be used for insulating objects such as drums.

Pipe coated with the ROMP polymer and/or ROMP polymer composite of the invention can have any outer diameter, inner diameter, and length.

While ROMP polymers and/or ROMP polymer composites of the invention are well suited for coating objects or thermally insulating objects which are to be submerged in water (e.g. fresh water, salt water, sea water, etc.) the ROMP polymers and/or ROMP polymer composites may also be used to coat objects or thermally insulate objects which are which are not exposed to an aqueous environment.

Resin compositions according to the invention may further comprise a sizing composition, or be used to provide improved adhesion to substrate materials that are sized with certain commercial silanes commonly used in the industry. As is known in the art, glass fibers are typically treated with a chemical solution (e.g., a sizing composition) soon after their formation to reinforce the glass fibers and protect the strands' mechanical integrity during processing and composite manufacture. Sizing treatments compatible with olefin metathesis catalysts and polydicyclopentadiene composites have been described in U.S. Pat. Nos. 6,890,650 and 6,436,476, the disclosures of both of which are incorporated herein by reference. However, these disclosures are based on the use of specialty silane treatments that are not commonly used in industrial glass manufacture. By comparison, the current invention may provide improved mechanical properties for polymer-glass composites that are sized with silanes commonly used in the industry.

Glass sizing formulations typically comprise at least one film former (typically a film forming polymer), at least one silane, and at least one lubricant. Any components of a sizing formulation that do not interfere with or substantially decrease the effectiveness of the metathesis catalyst or olefin polymerization reaction are considered to be compatible with the current invention and may generally be used herein.

Film formers that are compatible with ROMP catalysts include epoxies, polyesters, polyurethanes, polyolefins, and/or polyvinyl acetates. Other common film formers that do not adversely affect the performance of the olefin metathesis catalyst may also be used. Film formers are typically used as nonionic, aqueous emulsions. More than one film former may be used in a given sizing formulation, to achieve a desired balance of glass processability and composite mechanical properties.

More particularly, the film former may comprise a low molecular weight epoxy emulsion, defined as an epoxy monomer or oligomer with an average molecular weight per epoxide group (EEW) of less than 500, and/or a high molecular weight epoxy emulsion, defined as an epoxy monomer or oligomer with an average molecular weight per epoxide group (EEW) of greater than 500. Examples of suitable low molecular weight products include aqueous epoxy emulsions produced by Franklin International, including Franklin K8-0203 (EEW 190) and Franklin E-102 (EEW 225-275). Other examples of low molecular weight epoxy emulsions are available from Hexion, including EPI-REZ™ 3510-W-60 (EEW 185-215), and EPI-REZ™ 3515-W-60 (EEW 225-275). Further examples of low molecular weight epoxy emulsions are available from COIM, including Filco 309 (EEW 270) and Filco 306 (EEW 330). Further examples of low molecular weight epoxy emulsions are available from DSM, including Neoxil® 965 (EEW 220-280) and Neoxil® 4555 (EEW 220-260). Examples of suitable high molecular weight epoxy emulsion products include epoxy emulsions produced by Hexion, including EPI-REZ™ 3522-W-60 (EEW 615-715).

Aqueous emulsions of modified epoxies, polyesters, and polyurethanes may also be used in the film former. Examples of suitable modified epoxy products include emulsions produced by DSM, including Neoxil® 2626 (a plasticized epoxy with an EEW of 500-620), Neoxil® 962/D (an epoxy-ester with an EEW of 470-550), Neoxil® 3613 (an epoxy-ester with an EEW of 500-800), Neoxil® 5716 (an epoxy-novolac with an EEW of 210-290), Neoxil® 0035 (a plasticized epoxy-ester with an EEW of 2500), and Neoxil® 729 (a lubricated epoxy with an EEW of 200-800). Further examples of modified epoxy emulsions are available from COIM, including Filco 339 (an unsaturated polyester-epoxy with an EEW of 2000) and Filco 362 (an epoxy-ester with an EEW of 530). Examples of suitable polyester products include emulsions produced by DSM, including Neoxil® 954/D, Neoxil® 2635, and Neoxil® 4759 (unsaturated bisphenolic polyesters). Additional suitable products from DSM include Neoxil® 9166 and Neoxil® 968/60 (adipate polyesters). Further examples of suitable products include emulsions produced by COIM, including Filco 354/N (unsaturated bisphenolic polyester), Filco 350 (unsaturated polyester), and Filco 368 (saturated polyester). Examples of suitable polyurethane products include emulsions produced by Bayer Material Science, including Baybond® 330 and Baybond® 401.

The film former may also comprise polyolefins or polyolefin-acrylic copolymers, polyvinylacetates, modified polyvinylacetates, or polyolefin-acetate copolymers. Suitable polyolefins include, but are not limited to, polyethylenes, polypropylenes, polybutylenes, and copolymers thereof, and the polyolefins may be oxidized, maleated, or otherwise treated for effective film former use. Examples of suitable products include emulsions produced by Michelman, including Michem® Emulsion 91735, Michem® Emulsion 35160, Michem® Emulsion 42540, Michem® Emulsion 69230, Michem® Emulsion 34040M1, Michem® Prime 4983R, and Michem® Prime 4982SC. Examples of suitable products include emulsions produced by HB Fuller, including PD 708H, PD 707, and PD 0166. Additional suitable products include emulsions produced by Franklin International, including Duracet® 637. Additional suitable products include emulsions produced by Celanese, including Vinamul® 8823 (plasticized polyvinylacetate), Dur-O-Set® E-200 (ethylene-vinyl acetate copolymer), Dur-O-Set® TX840 (ethylene-vinyl acetate copolymer), and Resyn® 1971 (epoxy-modified polyvinylacetate).

While not limited thereto, preferred film formers include low- and high-molecular weight epoxies, saturated and unsaturated polyesters, and polyolefins, such as Franklin K80-203, Franklin E-102, Hexion 3510-W-60, Hexion 3515-W-60, and Michelman 35160.

Nonionic lubricants may also be added to the sizing composition. Suitable nonionic lubricants that are compatible with ROMP compositions include esters of polyethylene glycols and block copolymers of ethylene oxide and propylene oxide. More than one nonionic lubricant may be used in a given sizing formulation if desired, e.g., to achieve a desired balance of glass processability and composite mechanical properties.

Suitable lubricants may contain polyethylene glycol (PEG) units with an average molecular weight between 200 and 2000, preferably between 200-600. These PEG units can be esterified with one or more fatty acids, including oleate, tallate, laurate, stearate, and others. Particularly preferred lubricants include PEG 400 dilaurate, PEG 600 dilaurate, PEG 400 distearate, PEG 600 distearate, PEG 400 dioleate, and PEG 600 dioleate. Examples of suitable products include compounds produced by BASF, including MAPEG® 400 DO, MAPEG® 400 DOT, MAPEG® 600 DO, MAPEG® 600 DOT, and MAPEG® 600 DS. Additional suitable products include compounds produced by Zschimmer & Schwarz, including Mulsifan 200 DO, Mulsifan 400 DO, Mulsifan 600 DO, Mulsifan 200 DL, Mulsifan 400 DL, Mulsifan 600 DL, Mulsifan 200 DS, Mulsifan 400 DS, and Mulsifan 600 DS. Additional suitable products include compounds produced by Cognis, including Agnique® PEG 300 DO, Agnique® PEG 400 DO, and Agnique® PEG 600 DO.

Suitable nonionic lubricants also include block copolymers of ethylene oxide and propylene oxide. Examples of suitable products include compounds produced by BASF, including Pluronic® L62, Pluronic® L101, Pluronic® P103, and Pluronic® P105.

Cationic lubricants may also be added to the sizing composition. Cationic lubricants that are compatible with ROMP include modified polyethyleneimines, such as Emery 6760L produced by Pulcra Chemicals.

Silane coupling agent may optionally be added to the sizing composition, non-limiting examples including, methacrylate, acrylate, amino, or epoxy functionalized silanes along with alkyl, alkenyl, and norbornenyl silanes.

Optionally, the sizing composition may contain one or more additives for modifying the pH of the sizing resin. One preferred pH modifier is acetic acid.

The sizing composition may optionally contain other additives useful in glass sizing compositions. Such additives may include emulsifiers, defoamers, cosolvents, biocides, antioxidants, and additives designed to improve the effectiveness of the sizing composition. The sizing composition can be prepared by any method and applied to substrate materials for use herein, such as glass fibers or fabric, by any technique or method.

In a preferred embodiment, the metathesis reactions disclosed herein are carried out under a dry, inert atmosphere. Such an atmosphere may be created using any inert gas, including such gases as nitrogen and argon. The use of an inert atmosphere is optimal in terms of promoting catalyst activity, and reactions performed under an inert atmosphere typically are performed with relatively low catalyst loading.

The reactions disclosed herein may also be carried out in an oxygen-containing and/or a water-containing atmosphere, and in one embodiment, the reactions are carried out under ambient conditions. The presence of oxygen or water in the reaction may, however, necessitate the use of higher catalyst loadings as compared with reactions performed under an inert atmosphere. Where the vapor pressure of the reactants allows, the reactions disclosed herein may also be carried out under reduced pressure.

The reactions disclosed herein may be carried out in a solvent, and any solvent that is inert towards cross-metathesis may be employed. Generally, solvents that may be used in the metathesis reactions include organic, protic, or aqueous solvents, such as aromatic hydrocarbons, chlorinated hydrocarbons, ethers, aliphatic hydrocarbons, alcohols, water, or mixtures thereof. Example solvents include benzene, toluene, p-xylene, methylene chloride, 1,2-dichloroethane, dichlorobenzene, chlorobenzene, tetrahydrofuran, diethyl ether, pentane, methanol, ethanol, water, or mixtures thereof. In a preferred embodiment, the reactions disclosed herein are carried out neat, i.e., without the use of a solvent.

It will be appreciated that the temperature at which a metathesis reaction according to methods disclosed herein is conducted can be adjusted as needed, and may be at least about −78° C., −40° C., −10° C., 0° C., 10° C., 20° C., 25° C., 35° C., 50° C., 70° C., 100° C., or 150° C., or the temperature may be in a range that has any of these values as the upper or lower bounds. In a preferred embodiment, the reactions are carried out at a temperature of at least about 35° C., and in another preferred embodiment, the reactions are carried out at a temperature of at least about 50° C.

In another embodiment the invention provides a thermal insulation material comprising a ROMP polymer, wherein the ROMP polymer is a reaction product of a resin composition comprising a cyclic olefin composition and a catalyst composition comprising at least one metal carbene olefin metathesis catalyst, where the ROMP polymer has an elongation at break that ranges from at least 20%, from at least 50%, from at least 75%, from at least 100%, from at least 125%, from at least 150%, from at least 175%, from at least 200%, from at least 225%, from at least 250%, from at least 275%, from at least 300%, or from at least 400%.

In another embodiment the invention provides a thermal insulation material comprising a ROMP polymer, wherein the ROMP polymer is a reaction product of a resin composition comprising a cyclic olefin composition and a catalyst composition comprising at least one metal carbene olefin metathesis catalyst, where the ROMP polymer has an elongation at break that ranges from 20% to 400%, 20% to 300%, 20% to 275%, 20% to 250%, 20% to 225%, 20% to 200%, 20% to 175%, 20% to 150%, 20% to 125%, 20% to 100%, 20% to 75%, 20% to 50%, 50% to 300%, 50% to 275%, 50% to 250%, 50% to 225%, 50% to 200%, 50% to 175%, 50% to 150%, 50% to 125%, 50% to 100%, 50% to 75%, 75% to 400%, 75% to 300%, 75% to 275%, 75% to 250%, 75% to 225%, 75% to 200%, 75% to 175%, 75% to 150%, 75% to 125%, 75% to 100%, 100% to 400%, 100% to 300%, 100% to 275%, 100% to 250%, 100% to 225%, 100% to 200%, 100% to 175%, 100% to 150%, 100% to 125%, 125% to 400%, 125% to 300%, 125% to 275%, 125% to 250%, 125% to 225%, 125% to 200%, 125% to 175%, 125% to 150%, 150% to 400%, 150% to 300%, 150% to 275%, 150% to 250%, 150% to 225%, 150% to 200%, 150% to 175%, 175% to 400%, 175% to 300%, 175% to 275%, 175% to 250%, 175% to 225%, 175% to 200%, 200% to 400%, 200% to 300%, 200% to 275%, 200% to 250%, 200% to 225%, 225% to 400%, 225% to 300%, 225% to 275%, 225% to 250%, 250% to 400%, 250% to 300%, 250% to 275%, 275% to 400%, or 275% to 300%.

It is to be understood that while the invention has been described in conjunction with specific embodiments thereof, the description above as well as the examples that follow are intended to illustrate and not limit the scope of the invention. Other aspects, advantages, and modifications within the scope of the invention will be apparent to those skilled in the art to which the invention pertains.

Experimental

In the following examples, efforts have been made to ensure accuracy with respect to numbers used (e.g., amounts, temperature, etc.) but some experimental error and deviation should be accounted for. Unless indicated otherwise, temperature is in degrees Celsius (° C.), pressure is at or near atmospheric, viscosity is in centipoise (cP). Additives added to the cyclic olefin compositions to form resin compositions are reported as ppm, which is defined as the weight in grams of additive per million grams of cyclic olefin composition, or as phr, which is defined as the weight in grams of the additive per hundred grams of cyclic olefin composition.

The following examples are to be considered as not being limiting of the invention as described herein, and are instead provided as representative examples of compositions of the invention and methods for their use, and articles made from such compositions and methods.

EXAMPLES

Materials and Methods

All glassware was oven dried and reactions were performed under ambient conditions unless otherwise noted. All solvents and reagents were purchased from commercial suppliers and used as received unless otherwise noted.

Mol percent (mol %) of dicyclopentadiene (DCPD), tricyclopentadiene (TCPD), tetracyclopentadiene (TeCPD), decyl norbornene (DNB), hexyl norbornene (HNB), tolyl norbornene (Tolyl-NB), or octyl norbornene (ONB) present in the cyclic olefin compositions were calculated from the weight percent (wt %) values obtained by gas chromatography (GC).

DCPD (Ultrene® 99) was obtained from Cymetech Corporation. A representative lot of Ultrene® 99 comprised DCPD (99.83 weight percent) and TCPD (0.17 weight percent) as measured by GC. A modified DCPD base resin (DCPD-HT) containing 20-25 wt % TCPD (and small amounts of higher cyclopentadiene (CPD) homologs) was prepared by heat treatment of Ultrene® 99 generally as described in U.S. Pat. No. 4,899,005. A modified DCPD base resin (DCPD-6T) containing 5-7 wt % TCPD (and small amounts of higher CPD homologs) was prepared by heat treatment of Ultrene® 99 generally as described in U.S. Pat. No. 4,899,005.

A representative lot of DCPD-6T comprised DCPD (94.0 weight percent) and TCPD (6.0 weight percent) as measured by GC. A representative lot of DCPD-HT comprised DCPD (74.5 weight percent), TCPD (23.6 weight percent), and TeCPD (1.9 weight percent) as measured by GC.

Tricyclopentadiene (TCPD) was prepared as generally described in European Pat. No. EP0271007B2 and purified to greater than 95% by vacuum distillation.

Preparation of a Representative ONB/TCPD Resin Mixture: 1-Decene (3 equivalents) and modified DCPD containing 20-25% tricyclopentadiene (1 equivalent) were combined in a 3-neck flask and heated to 160° C. on a heating mantle under an argon atmosphere for 12 hours. The temperature was increased to 170° C. for an additional 24 hours. After completion of the reaction, residual 1-decene and DCPD were removed from the reaction mixture by vacuum distillation at 70-80° C. Following removal of 1-decene and DCPD, the remaining mixture was heated to 100° C. and a 3:1 mixture of octyl norborene:tricyclopentadiene was distilled overhead and collected as a homogeneous liquid. The collected octyl norbornene/tricyclopentadiene liquid mixture was treated with a small amount of butylated hydroxytoluene and stored under an argon atmosphere. A representative lot of ONB/TCPD mixture comprised ONB (71.7 wt %) and TCPD (28.2 wt %) and small amounts of higher CPD homologs as measured by GC.

5-Tolyl-2-norbornene (Tolyl-NB)/TCPD mixture was prepared as generally described in U.S. Pat. No. 5,138,003. A representative lot of Tolyl-NB/TCPD mixture comprised Tolyl-NB (70.5 wt %) and TCPD (28.6 wt %) and DCPD (0.147 wt %) and small amounts of higher CPD homologs as measured by GC.

5-Hexyl-2-norbornene (HNB) was prepared by Diels-Alder reaction of CPD with 1-octene as generally known in the art. A representative lot of HNB comprised HNB (99.9 wt %) and small amounts of higher CPD homologs as measured by GC.

5-Decyl-2-norbornene (DNB)/TCPD mixture was prepared by Diels-Alder reaction of CPD with 1-dodecene as generally known in the art. A representative lot of DNB/TCPD mixture comprised DNB (91.3 wt %) and TCPD (8.4 wt %) and small amounts of higher CPD homologs as measured by GC.

Irganox® 1076 antioxidant (BASF) was used where indicated.

Cumene hydroperoxide (CHP) was used as received unless otherwise indicated from Sigma Aldrich (88% purity), Syrgis Performance Initiators (Norox® CHP, 85%), or Trigonox K-90®, Akzo Nobel, 88%). CHP was used as a 1,000 ppm or 10,000 ppm concentration stock solution in DCPD, or as received.

Butylated hydroxytoluene (BHT) was used where indicated.

Triphenylphosphine (TPP) was used as received from Arkema.

1-Decene was used as received from CP Chem.

K-20 glass microspheres were purchased from 3M and used where indicated.

Metal carbene olefin metathesis catalysts were prepared by standard methods and include [1,3-bis-(2,4,6-trimethylphenyl)-2-imidazolidinylidene]dichloro(3-methyl-2-butenylidene) (tricyclohexylphosphine) ruthenium(II) (C827); [1,3-bis-(2,4,6-trimethylphenyl)-2-imidazolidinylidene]dichloro(benzylidene) (tricyclohexylphosphine)ruthenium(II) (C848); [1,3-bis-(2,4,6-trimethylphenyl)-2-imidazolidinylidene]dichloro(3-methyl-2-butenylidene)(methyldiphenylphosphine)ruthenium(II) (C747); [1,3-bis-(2,4,6-trimethylphenyl)-2-imidazolidinylidene]dichloro(benzylidene)(tri-n-butylphosphine)ruthenium(II) (C771); ruthenium (II) dichloro(3-methyl-2-butenylidene) bis(tricyclohexylphosphine) (C801); [1,3-bis-(2,4,6-trimethylphenyl)-2-imidazolidinylidene]dichloro(o-isopropoxyphenylmethylene)ruthenium(II) (C627); [1,3-bis-(2,4,6-trimethylphenyl)-2-imidazolidinylidene]dichloro (phenylindenylidene) (diethylphenylphosphine)ruthenium(II) (C835); and [1,3-bis-(2,4,6-trimethylphenyl)-2-imidazolidinylidene]dichloro (phenylindenylidene)(tricyclohexylphosphine)ruthenium (II) (C949).

Cyclic Olefin Composition (A): ONB/TCPD mixture was combined with DCPD-HT. Cyclic olefin composition (A) comprised ONB (43.1 mol %), DCPD (35.5 mol %), TCPD from ONB mixture (13.5 mol %), and TCPD from DCPD mixture (7.7 mol %).

Cyclic Olefin Composition (B): ONB/TCPD mixture was combined with DCPD-HT. Cyclic olefin composition (B) comprised ONB (40.9 mol %), DCPD (39.6 mol %), and TCPD (19.5 mol %).

Cyclic Olefin Composition (C): ONB/TCPD mixture (910 grams) was combined with DCPD-HT (490 grams). Cyclic olefin composition (C) comprised ONB (42.99 mol %), DCPD (35.79 mol %), TCPD (21.17 mol %), TeCPD (0.05 mol %).

Cyclic Olefin Composition (D): DNB/TCPD mixture (94 grams), TCPD (25 grams), and DCPD-HT (55 grams) were combined. Cyclic olefin composition (D) comprised DNB (42.47 mol %), DCPD (35.08 mol %), TCPD (21.84 mol %), and TeCPD (0.62 mol %).

Cyclic Olefin Composition (E): DNB/TCPD mixture (165.3 grams), TCPD (59.7 grams), and DCPD-HT (66.1 grams) were combined. Cyclic olefin composition (E) comprised DNB (47.4 mol %), DCPD (25.38 mol %), TCPD (26.6 mol %), and TeCPD (0.61 mol %).

Cyclic Olefin Composition (F): DNB/TCPD mixture (90 grams), TCPD (41 grams), and DCPD-HT (45 grams) were combined. Cyclic olefin composition (F) comprised DNB (41.87 mol %), DCPD (28.03 mol %), TCPD (29.42 mol %), and TeCPD (0.68 mol %).

Cyclic Olefin Composition (G): HNB (82 grams), TCPD (28 grams), and DCPD-HT (66 grams) were combined. Cyclic olefin composition (G) comprised HNB (43.58 mol %), DCPD (35.09 mol %), TCPD (20.72 mol %), and TeCPD (0.62 mol %).

Cyclic Olefin Composition (H): HNB (90 grams), TCPD (24 grams), and DCPD-HT (62 grams) were combined. Cyclic olefin composition (H) comprised HNB (47.96 mol %), DCPD (33.04 mol %), TCPD (18.43 mol %), and TeCPD (0.56 mol %).

Cyclic Olefin Composition (I): Tolyl-NB/TCPD mixture (345 grams), TCPD (30 grams), and DCPD (135 grams) were combined. Cyclic olefin composition (I) comprised Tolyl-NB (42.88 mol %), DCPD (34.21 mol %), TCPD (21.23 mol %), and TeCPD (0.03 mol %).

Cyclic Olefin Composition (J): DNB/TCPD mixture (156 grams), HNB (106 grams), TCPD (106 grams), and DCPD (131 grams) were combined. Cyclic olefin composition (J) comprised DNB (21.3 mol %), HNB (21.3 mol %), DCPD (36.0 mol %), TCPD (21.1 mol %), and TeCPD (0.03 mol %).

Cyclic Olefin Composition (K): ONB/TCPD mixture (11050 grams) was combined with DCPD-HT (6950 grams). Cyclic olefin composition (K) comprised ONB (40.2 mol %), DCPD (37.43 mol %), TCPD (21.6 mol %), TeCPD (0.67 mol %).

Cyclic Olefin Composition (L): ONB/TCPD mixture (7259 grams) was combined with DCPD-HT (3907 grams). Cyclic olefin composition (L) comprised ONB (42.66 mol %), DCPD (35.46 mol %), TCPD (21.39 mol %), TeCPD (0.49 mol %).

Cyclic Olefin Composition (M): ONB/TCPD mixture (115.4 kg) was combined with DCPD-HT (60.2 kg). Cyclic olefin composition (M) comprised ONB (42.02 mol %), DCPD (35.05 mol %), TCPD (22.36 mol %), TeCPD (0.57 mol %).

Cyclic Olefin Composition (N): ONB/TCPD mixture was combined with DCPD-HT. Cyclic olefin composition (N) comprised ONB (42.0 mol %), DCPD (35.1 mol %), TCPD (22.4 mol %), TeCPD (0.5 mol %).

Cyclic Olefin Composition (O): DNB/TCPD mixture, TCPD, and DCPD-HT were combined. Cyclic olefin composition (O) comprised DNB (42.4 mol %), DCPD (36.2 mol %), TCPD (21.0 mol %), TeCPD (0.4 mol %).

Cyclic Olefin Composition (P): DCPD-HT and Ultrene® 99 were combined. Cyclic olefin composition (P) comprised DCPD (91.4 mol %), TCPD (8.1 mol %), TeCPD (0.5 mol %).

Resin Composition (A): Irgonox® 1076, BASF (1 phr) and CHP (Trigonox® K-90, Akzo Nobel) (5 ppm) were added to cyclic olefin composition (A) at room temperature.

Resin Composition (B): Irgonox® 1076, BASF (1 phr) and CHP (Trigonox® K-90, Akzo Nobel) (5 ppm) were added to cyclic olefin composition (B) at room temperature.

Resin Composition (C): Irgonox® 1076, BASF (1 phr) was added to cyclic olefin composition (B) at room temperature.

Resin Composition (D): Irgonox® 1076 (1 phr) and CHP (5 ppm) were added to cyclic olefin composition (C) at room temperature.

Resin Composition (E): Irgonox® 1076 (1 phr) and CHP (5 ppm) were added to cyclic olefin composition (D) at room temperature.

Resin Composition (F): Irgonox® 1076 (1 phr) and CHP (5 ppm) were added to cyclic olefin composition (E) at room temperature.

Resin Composition (G): Irgonox® 1076 (1 phr) and CHP (5 ppm) were added to cyclic olefin composition (F) at room temperature.

Resin Composition (H): Irgonox® 1076 (1 phr) and CHP (5 ppm) were added to cyclic olefin composition (G) at room temperature.

Resin Composition (I): Irgonox® 1076 (1 phr) and CHP (5 ppm) were added to cyclic olefin composition (H) at room temperature.

Resin Composition (J): Irgonox® 1076 (1 phr) and CHP (5 ppm) were added to cyclic olefin composition (I) at room temperature.

Resin Composition (K): Irgonox® 1076 (1 phr) and CHP (5 ppm) were added to cyclic olefin composition (J) at room temperature.

Resin Composition (L1): Irgonox® 1076 (1 phr) was added to cyclic olefin composition (K) at room temperature.

Resin Composition (L2): Irgonox® 1076 (1 phr) and TPP (0.4 phr) were added to cyclic olefin composition (K) at room temperature.

Resin Composition (L3): Irgonox® 1076 (1 phr) and TPP (1.0 phr) were added to cyclic olefin composition (K) at room temperature.

Resin Composition (M1): Irgonox® 1076 (1 phr) and TPP (0.1 phr) were added to cyclic olefin composition (L) at room temperature.

Resin Composition (M2): Irgonox® 1076 (1 phr) and CHP (20 ppm) were added to cyclic olefin composition (L) at room temperature.

Resin Composition (N1): Irgonox® 1076 (1 phr) was added to cyclic olefin composition (M) at room temperature.

Resin Composition (N2): Irgonox® 1076 (1 phr) and TPP (0.2 phr) were added to cyclic olefin composition (M) at room temperature.

Resin Composition (N3): Irgonox® 1076 (1 phr) and CHP (150 ppm) were added to cyclic olefin composition (M) at room temperature.

Resin Composition (N4): Irgonox® 1076 (1 phr) and TPP (0.3 phr) were added to cyclic olefin composition (M) at room temperature.

Resin Composition (N5): Irgonox® 1076 (1 phr) and TPP (0.1 phr) were added to cyclic olefin composition (M) at room temperature.

Resin Composition (O): K-20 glass microspheres (23.8 PHR) and Cab-O-Sil (0.5 PHR) were added to Resin Composition (A) at room temperature.

Resin Composition (P): Irganox® 1076 (1 phr) and CHP (5 ppm) were added to cyclic olefin composition (N) at room temperature.

Resin Composition (Q): Irganox® 1076 (1 phr) and TPP (0.6 phr) were added to cyclic olefin composition (N) at room temperature.

Resin Composition (R): Irganox® 1076 (1 phr) and CHP (5 ppm) were added to cyclic olefin composition (O) at room temperature.

Resin Composition (S): Irganox® 1076 (1 phr) and CHP (5 ppm) were added to Ultrene® 99 at 40° C. The Ultrene® 99 comprised DCPD (99.9 mol %) and TCPD (0.1 mol %).

Resin Composition (T): Irganox® 1076 (1 phr) and CHP (5 ppm) were added to DCPD-6T at room temperature. The DCPD-6T comprised DCPD (95.9 mol %) and TCPD (4.1 mol %).

Resin Composition (U): Irganox® 1076 (1 phr) and CHP (5 ppm) were added to cyclic olefin composition (P) at room temperature.

Resin Composition (V): Irganox® 1076 (1 phr) and CHP (5 ppm) were added to DCPD-HT at room temperature. The DCPD-HT comprised DCPD (81.7 mol %), TCPD (17.3 mol %), and TeCPD (1.0 mol %).

Catalyst Composition (A) was prepared by suspending C827 (monomer to catalyst ratio 45,000:1) and C848 (monomer to catalyst ratio 500,000:1) in mineral oil (Crystal Plus 500 FG) containing 2 phr CAB-O-SIL® TS610 (Cabot Corporation). Catalyst composition (A) was prepared so as to have a monomer to catalyst ratio of 45,000:1 for C827 and 500,000:1 for C848 at 2 grams of catalyst suspension per 100 grams of DCPD monomer.

Catalyst Composition (B): C747 was suspended in mineral oil (Crystal Plus 500 FG) containing 2 phr CAB-O-SIL® TS610. Catalyst composition (B) was prepared so as to have a monomer to catalyst ratio of 60,000:1 at 2 grams of catalyst suspension per 100 grams of DCPD monomer.

Catalyst Composition (C): C771 was suspended in mineral oil (Crystal Plus 500 FG) containing 2 phr CAB-O-SIL® TS610. Catalyst composition (C) was prepared so as to have a monomer to catalyst ratio of 45,000:1 at 2 grams of catalyst suspension per 100 grams of DCPD monomer.

Catalyst Composition (D): C801 was suspended in mineral oil (Crystal Plus 500 FG) containing 2 phr CAB-O-SIL® TS610. Catalyst composition (D) was prepared so as to have a monomer to catalyst ratio of 5,000:1 at 2 grams of catalyst suspension per 100 grams of DCPD monomer.

Catalyst Composition (E): C627 was suspended in mineral oil (Crystal Plus 500 FG) containing 2 phr CAB-O-SIL® TS610. Catalyst composition (E) was prepared so as to have a monomer to catalyst ratio of 60,000:1 at 2 grams of catalyst suspension per 100 grams of DCPD monomer.

Catalyst Composition (F): C827 was suspended in mineral oil (Crystal Plus 500 FG) containing 2 phr CAB-O-SIL® TS610. Catalyst composition (F) was prepared so as to have a monomer to catalyst ratio of 30,000:1 at 2 grams of catalyst suspension per 100 grams of DCPD monomer.

Catalyst Composition (G): C835 was suspended in mineral oil (Crystal Plus 500 FG) containing 2 phr CAB-O-SIL® TS610. Catalyst composition (G) was prepared so as to have a monomer to catalyst ratio of 30,000:1 at 2 grams of catalyst suspension per 100 grams of DCPD monomer.

Catalyst Composition (H): C827 was suspended in mineral oil (Crystal Plus 500 FG) containing 2 phr CAB-O-SIL® TS610. Catalyst composition (H) was prepared so as to have a monomer to catalyst ratio of 45,000:1 at 2 grams of catalyst suspension per 100 grams of DCPD monomer.

Catalyst Composition (I): C848 was suspended in mineral oil (Crystal Plus 500 FG) containing 2 phr CAB-O-SIL® TS610. Catalyst composition (I) was prepared so as to have a monomer to catalyst ratio of 60,000:1 at 2 grams of catalyst suspension per 100 grams of DCPD monomer.

Catalyst Composition (J): C949 was suspended in mineral oil (Crystal Plus 500 FG) containing 2 phr CAB-O-SIL® TS610. Catalyst composition (J) was prepared so as to have a monomer to catalyst ratio of 45,000:1 at 2 grams of catalyst suspension per 100 grams of DCPD monomer.

Catalyst Composition (K): C835 and C848 were suspended in mineral oil (Crystal Plus 500 FG) containing 2 phr CAB-O-SIL® TS610. Catalyst composition (K) was prepared so as to have a monomer to catalyst ratio of 45,000:1 for C835 and 200,000:1 for C848 at 2 grams of catalyst suspension per 100 grams of DCPD monomer.

Catalyst Composition (L): C949 and C827 were suspended in mineral oil (Crystal Plus 500 FG) containing 2 phr CAB-O-SIL® TS610. Catalyst composition (L) was prepared so as to have a monomer to catalyst ratio of 90,000:1 for C949 and 90,000:1 for C827 at 2 grams of catalyst suspension per 100 grams of DCPD monomer.

Catalyst Composition (M): C827 and C848 was suspended in mineral oil (Crystal Plus 70 FG) containing 2 phr CAB-O-SIL® TS610. Catalyst composition (M) was prepared so as to have a monomer to catalyst ratio of 45,000:1 for C827 and 500,000:1 for C848 at 2 grams of catalyst suspension per 100 grams of DCPD monomer.

Catalyst Composition (N): C949 was suspended in mineral oil (Crystal Plus 70 FG) containing 2 phr CAB-O-SIL® TS610. Catalyst composition (N) was prepared so as to have a monomer to catalyst ratio of 30,000:1 at 2 grams of catalyst suspension per 100 grams of DCPD monomer.

Example 1

ROMP Polymer Coated Pipe

Resin Composition (A) (800 grams) was placed into a 3-neck round bottom flask and degassed under vacuum for 20 minutes with stirring. The flask was sealed under vacuum and the resin composition (A) was heated to 35° C. in an oven. A three inch long piece of 5.5 inch O.D. low carbon steel pipe was cut and polished on each face. The outer surface layer of the pipe was removed by blasting with hard steel grit (GH 25) until the depth profile was at least 2.0 mils as determined by replica tape (ASTM 4417). The grit-blasted pipe surface was cleaned by spraying with acetone and scrubbing with a towel followed by air drying. The pipe was heated to 50° C. in an oven. Simultaneously, a cylindrical mold with a solid steel bottom was heated to 35° C. in an oven. The pipe and mold were removed from the oven(s) and the pipe was placed inside the mold with an o-ring positioned underneath the pipe face to seal the interior of the pipe from the pipe exterior. The pipe was centered in the mold. Resin composition (A) was catalyzed by the addition of catalyst composition (A) (16 grams) and the catalyzed resin was poured into the mold. The temperature of the catalyzed resin was monitored during the polymerization process. The catalyzed resin achieved a peak exotherm temperature of 180° C. at approximately 4 minutes after catalyzation. The ROMP polymer coated pipe was cooled to room temperature and then machined on a lathe to reduce the thickness of the pipe and the ROMP polymer to a uniform thickness of 0.75 inches.

TABLE 1

Measured properties of the ROMP polymer from Example 1.

| Property | Method | Units | ROMP Polymer (Example 1) |
|---|---|---|---|
| Glass transition temperature ($T_g$) | ASTM E1356 | ° C. | 51 |
| Thermal conductivity | ASTM C518 | W/m · K | 0.175 |
| Hardness | ASTM D2240 | Shore D | 74 |
| Tensile strength (20 in/min) | ASTM D638 | MPa | 35 |
| Tensile modulus | ASTM D638 | MPa | 1302 |
| Elongation @ yield | ASTM D638 | % | 7 |
| Elongation @ break | ASTM D638 | % | 179 |
| Compressive modulus (0.5"/min) | ASTM D695 | MPa | 1017 |
| Compressive strength (5% strain) | ASTM D695 | MPa | 29 |
| Compressive strength (10% strain) | ASTM D695 | MPa | 23 |
| Density | | g/cm$^3$ | 10.981 |
| Impact strength | ASTM D256 | J/m | 95 |
| Flash point (uncatalyzed resin) | ASTM D93 | ° C. | 61 |
| CTE (below Tg) | ASTM E831 | 1/° C. | $159 \cdot 10^{-6}$ |
| CTE (above Tg) | ASTM E831 | 1/° C. | $198 \cdot 10^{-6}$ |
| Heat of cure | ASTM E1356 | kJ/kg | 239 |

Example 2

ROMP Polymer Coated Pipe and ROMP Polymer Coated Field Joint

A 1.5" outside diameter (O.D.), 24" long grade SAE 4130 steel pipe was blasted with G25 steel grit until the blast profile was 2.0 mils and all visible dark corrosion/mill scale was removed. Dust was removed from the pipe surface using compressed air. A cylindrical, 24" aluminum mold was heated to 35° C. in an oven. The blasted pipe was heated to 60° C. in an oven. The heated pipe was removed from the oven and quickly assembled in the aluminum mold. Resin Composition (B) (6,590 grams) was degassed for 1 hour under vacuum and heated to 35° C. The degassed Resin Composition (B) (6,590 grams) was catalyzed by the addition of catalyst composition (A) (132 grams) and the catalyzed resin was poured in the hot aluminum mold containing the hot steel pipe. The catalyzed resin was allowed to exotherm to form a cured polymer. The ROMP polymer coated pipe was cooled to room temperature.

A section of cured polymer was machined (i.e., cut away) from the center of the polymer coated pipe to expose an 8" section of pipe thereby forming two independent opposing sections of polymer coated pipe. Next, additional amounts of polymer was further removed from the two independent opposing sections of polymer coated pipe to form a 45° chamfer of the polymer from the pipe surface to the outer diameter of each independent opposing section of polymer. This machining process formed what we referred to as the "field joint assembly". The field joint assembly possessing what we referred to as the "field joint gap" (see FIG. 1). The field joint gap being the 8" section of exposed pipe located between the two independent opposing sections of polymer coated pipe. The field joint gap was designed to simulate an actual field joint as defined herein. Overall, the field joint assembly possessed a dumbbell like shape.

The 8" section of exposed pipe was re-blasted with G25 steel grit to remove residual polymer and flash rust. To each of the two independent opposing sections of polymer, the chamfer region of the polymer and 4" of the O.D. extending away from the edge of the chamfer was sanded with 80 grit sandpaper in a cross-hatch pattern. O-rings were fitted 4" from the edge of the chamfer and the field joint assembly was heated to 60° C. in an oven.

Figure 2:
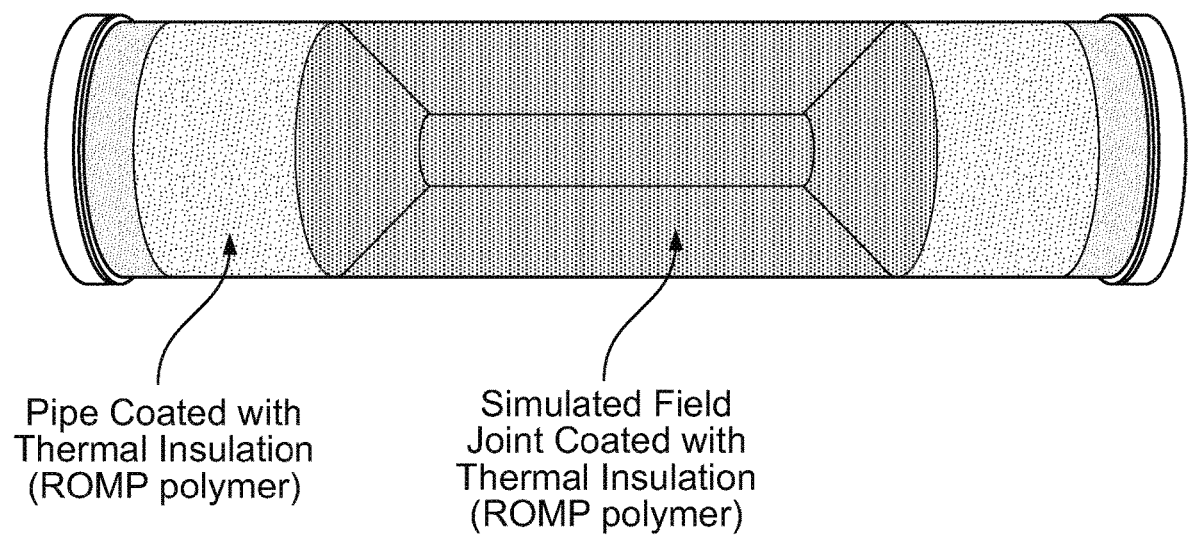
FIG. 2 shows a pipe coated with a thermal insulation material comprising a ROMP polymer of Example 2, where the previously exposed section of the pipe simulating a field joint (FIG. 1) is now coated with (encased by) a thermal insulation material comprising a ROMP polymer of Example 2.

Sudan blue pigment (0.0003 phr) was added to Resin Composition (C) (3,900 grams). The pigmented Resin Composition (C) was degassed for 1 hour under vacuum and heated to 35° C. The field joint assembly was removed from the 60° C. oven, placed in a horizontal orientation, and fitted with a flexible metal molding to form a sealed cylindrical cavity around the entire field joint assembly with an open trench at the top of the mold for adding catalyzed resin. The degassed Resin Composition (C) (3,900 grams) was catalyzed by the addition of catalyst composition (A) (78.0 grams) and the catalyzed resin was poured in the open trench at the top of the mold. The catalyzed resin was allowed to exotherm to form a cured polymer, and the cured polymer was cooled to room temperature. The mold was removed to provide a ROMP polymer coated field joint as described herein, where the field joint (e.g., simulated field joint) was encased by (or coated with) a thermal insulation material of the invention (e.g. a ROMP polymer or ROMP composition). Furthermore, the thermal insulation material used to coat the field joint (e.g. simulated field joint) not only coated the field joint, but also partially coated (partially encased) the two independent opposing sections of polymer used to originally coat the pipe (see FIG. 2).

Examples 3-8

Resin Compositions (D)-(I) were separately degassed under vacuum for 20 minutes at ambient temperature (20-25° C.). Degassed Resin Compositions (D)-(I) were each separately catalyzed at ambient temperature by the addition of Catalyst Composition (A) (2 phr) to form ROMP Compositions (D)-(I). ROMP Compositions (D)-(I) were separately degassed for 1 minute under vacuum at ambient temperature. Each degassed ROMP Composition (D)-(I) was poured into a separate set of two aluminum molds preheated to 35° C. in a laboratory oven, the first mold being rectangular and having dimensions (10"×10"×⅛") and the second mold being cylindrical and having dimensions (0.81"×15"). After the molds were filled, the ROMP compositions (D)-(I) were held at 35° C. for 15 minutes and then heated from 35° C. to 140° C. at a heating rate of 3.5° C./min, and then held at 140° C. for 2 hours, and then allowed to cool to ambient temperature and demolded. The mechanical and thermal properties of the demolded ROMP polymer articles corresponding to ROMP Compositions (D)-(I) were measured according to the methods designated in Tables 2 and 3.

TABLE 2

Measured properties of the ROMP polymers from ROMP Compositions (D)-(F)

| | | | Example | | |
|---|---|---|---|---|---|
| | | | 3 | 4 | 5 |
| | | | ROMP Composition (D) | ROMP Composition (E) | ROMP Composition (F) |
| Property | Method | Units | | | |
| Glass transition temperature (Tg) | ASTM E1356 | ° C. | 51 | 45 | 50 |
| Tensile strength (2"/min) | ASTM D638 | MPa | 38 | 26 | 29 |
| Tensile modulus | ASTM D638 | MPa | 1148 | 1237 | 1261 |
| Elongation @ yield | ASTM D638 | % | 6 | 6 | 6 |
| Elongation @ break | ASTM D638 | % | 284 | 66 | 218 |
| Compressive modulus (0.5"/min) | ASTM D695 | MPa | 1017 | 1032 | 1083 |
| Compressive strength (5% strain) | ASTM D695 | MPa | 29 | 28 | 30 |
| Compressive strength (10% strain) | ASTM D695 | MPa | 23 | 24 | 24 |
| Thermal conductivity | ASTM C518 | W/m * K | 0.176[a] | Not Measured | Not Measured |

[a]Thermal conductivity was measured using a heat flow instrument (FOX-50, LaserComp).

TABLE 3

Measured properties of the ROMP polymers from ROMP Compositions (G)-(I)

| Property | Method | Units | Example 6 ROMP Composition (G) | Example 7 ROMP Composition (H) | Example 8 ROMP Composition (I) |
|---|---|---|---|---|---|
| Glass transition temperature (Tg) | ASTM E1356 | °C. | 67 | 80 | 62 |
| Tensile strength (2"/min) | ASTM D638 | MPa | 35 | 35 | 31 |
| Tensile modulus | ASTM D638 | MPa | 1447 | 1492 | 1355 |
| Elongation @ yield | ASTM D638 | % | 7 | 7 | 6 |
| Elongation @ break | ASTM D638 | % | 204 | 121 | 144 |
| Compressive modulus (0.5"/min) | ASTM D695 | MPa | 1238 | 1333 | 1258 |
| Compressive strength (5% strain) | ASTM D695 | MPa | 37 | 44 | 38 |
| Compressive strength (10% strain) | ASTM D695 | MPa | 32 | 37 | 32 |
| Thermal conductivity | ASTM C518 | W/m * K | Not Measured | Not Measured | Not Measured |

Examples 9-10

Resin Compositions (J), (K) were separately degassed under vacuum for 20 minutes at ambient temperature (20-25° C.) and then heated to 35° C. under vacuum. Degassed Resin Compositions (J), (K) were each separately catalyzed at 35° C. under vacuum by the addition of Catalyst Composition (A) (2 phr) to form ROMP Compositions (J), (K).

Each ROMP Composition (J), (K) was poured into a separate set of three aluminum molds preheated to 35° C. in a laboratory oven, the first mold being rectangular and having dimensions (10"×10"×⅛") and the second mold being cylindrical and having dimensions (0.81"×15") and the third mold being rectangular and having dimensions (4"×6"×0.032").

After the molds were filled, the ROMP compositions (J), (K) were held at 35° C. for 30 minutes and then heated from 35° C. to 140° C. at a heating rate of 3.5° C./min, and then held at 140° C. for 2 hours, and then allowed to cool to ambient temperature and demolded. The mechanical and thermal properties of the demolded ROMP polymer articles corresponding to ROMP Compositions (J), (K) were measured according to the methods designated in Table 4.

TABLE 4

Measured properties of the ROMP polymers from ROMP Compositions (J), (K)

| Property | Method | Units | Example 9 ROMP Composition (J) | Example 10 ROMP Composition (K) |
|---|---|---|---|---|
| Glass transition temperature (Tg) | ASTM E1356 | °C. | 119 | 45 |
| Tensile strength (2"/min) | ASTM D638 | MPa | 65 | 31 |
| Tensile modulus | ASTM D638 | MPa | 2279 | 1349 |
| Elongation @ yield | ASTM D638 | % | 7.7 | 6.7 |
| Elongation @ break | ASTM D638 | % | 21 | 66 |
| Compressive modulus (0.5"/min) | ASTM D695 | MPa | 1928 | 1112 |
| Compressive strength (5% strain) | ASTM D695 | MPa | 77 | 32 |
| Compressive strength (10% strain) | ASTM D695 | MPa | 66 | 25 |
| Thermal conductivity | ASTM C518 | W/m * K | Not Measured | Not Measured |

Examples 11-16

Resin Compositions (L1) (two separate portions), (L2), (L3), (M1), (M2) were separately degassed under vacuum for 20 minutes at ambient temperature (20-25° C.) and then heated to 35° C. under vacuum. Degassed Resin Compositions (L1) (two separate portions), (L2), (L3), (M1), (M2) were each separately catalyzed at 35° C. under vacuum by the addition of a catalyst composition (2 phr) as indicated in Tables 5 and 6 to form ROMP Compositions (L1A), (L1B), (L2), (L3), (M1), (M2). Each ROMP Composition (L1A), (L1B), (L2), (L3), (M1), (M2) was poured into a separate set of three aluminum molds preheated to 35° C. in a laboratory oven, the first mold being rectangular and having dimensions (10"×10"×⅛") and the second mold being cylindrical and having dimensions (0.81"×15") and the third mold being rectangular and having dimensions (4"×6"×0.032"). After the molds were filled, the ROMP compositions (L1A), (L1B), (L2), (L3), (M1), (M2) were held at 35° C. for 30 minutes and then heated from 35° C. to 140° C. at a heating rate of 3.5° C./min, and then held at 140° C. for 2 hours, and then allowed to cool to ambient temperature and demolded. The mechanical and thermal properties of the demolded ROMP polymer articles corresponding to ROMP Compositions (L1A), (L1B), (L2), (L3), (M1), (M2) were measured according to the methods designated in Tables 5 and 6.

TABLE 5

Measured properties of the ROMP polymers from ROMP Compositions (L1A), (L1B), (L2)

| | | | Example | | |
|---|---|---|---|---|---|
| | | | 11 | 12 | 13 |
| | | | ROMP | ROMP | ROMP |
| | | | Composition | Composition | Composition |
| Property | Method | Units | (L1A)$^a$ | (L1B)$^b$ | (L2)$^c$ |
| Glass transition temperature (Tg) | ASTM E1356 | ° C. | 59 | 61 | 51 |
| Tensile strength (2"/min) | ASTM D638 | MPa | 34 | 35 | 33 |
| Tensile modulus | ASTM D638 | MPa | 1424 | 1431 | 1359 |
| Elongation @ yield | ASTM D638 | % | 7.3 | 7.3 | 6.6 |
| Elongation @ break | ASTM D638 | % | 121 | 73 | 226 |
| Compressive modulus (0.5"/min) | ASTM D695 | MPa | 1175 | 1195 | 1174 |
| Compressive strength (5% strain) | ASTM D695 | MPa | 36 | 36 | 34 |
| Compressive strength (10% strain) | ASTM D695 | MPa | 30 | 29 | 27 |
| Thermal conductivity | ASTM C518 | W/m * K | Not Measured | Not Measured | Not Measured |

$^a$= Catalyst Composition (C);
$^b$= Catalyst Composition (G);
$^c$= Catalyst Composition (B)

TABLE 6

Measured properties of the ROMP polymers from ROMP Compositions (L3), (M1), (M2)

| | | | Example | | |
|---|---|---|---|---|---|
| | | | 14 | 15 | 16 |
| | | | ROMP | ROMP | ROMP |
| | | | Composition | Composition | Composition |
| Property | Method | Units | (L3)$^a$ | (M1)$^b$ | (M2)$^c$ |
| Glass transition temperature (Tg) | ASTM E1356 | ° C. | 52 | 49 | 51 |
| Tensile strength (2"/min) | ASTM D638 | MPa | 33 | 37 | 31 |
| Tensile modulus | ASTM D638 | MPa | 1346 | 1533 | 1345 |
| Elongation @ yield | ASTM D638 | % | 6.7 | 7.1 | 6.7 |
| Elongation @ break | ASTM D638 | % | 198 | 71 | 133 |
| Compressive modulus (0.5"/min) | ASTM D695 | MPa | 1162 | 1233 | 1096 |

TABLE 6-continued

Measured properties of the ROMP polymers from ROMP Compositions (L3), (M1), (M2)

|  |  |  | Example | | |
|---|---|---|---|---|---|
|  |  |  | 14 | 15 | 16 |
|  |  |  | ROMP Composition | ROMP Composition | ROMP Composition |
| Property | Method | Units | (L3)$^a$ | (M1)$^b$ | (M2)$^c$ |
| Compressive strength (5% strain) | ASTM D695 | MPa | 33 | 38 | 31 |
| Compressive strength (10% strain) | ASTM D695 | MPa | 27 | 30 | 25 |
| Thermal conductivity | ASTM C518 | W/m * K | Not Measured | Not Measured | Not Measured |

$^a$ = Catalyst Composition (E);
$^b$ = Catalyst Composition (D);
$^c$ = Catalyst Composition (F)

Examples 17-20

Resin Compositions (N1) (two separate portions), (N4), (N5) were separately degassed under vacuum for 20 minutes at ambient temperature (20-25° C.). Degassed Resin Compositions (N1) (two separate portions), (N4), (N5) were each separately catalyzed at ambient temperature under vacuum by the addition of a catalyst composition (2 phr) as indicated in Table 7 to form ROMP Compositions (N1A), (N1B), (N4), (N5). Each ROMP Composition (N1A), (N1B), (N4), (N5) was poured into a separate set of two aluminum molds preheated to 35° C. in a laboratory oven, the first mold being rectangular and having dimensions (1.5"×1.5"×11") and the second mold being cylindrical and having dimensions (0.79"×14"). After the molds were filled, the ROMP compositions (N1A), (N1B), (N4), (N5) were held at 35° C. for 30 minutes and then heated from 35° C. to 140° C. at a heating rate of 3.5° C./min, and then held at 140° C. for 2 hours, and then allowed to cool to ambient temperature and demolded. The mechanical and thermal properties of the demolded ROMP polymer articles corresponding to ROMP Compositions (N1A), (N1B), (N4), (N5) were measured according to the methods designated in Table 7.

TABLE 7

Measured properties of the ROMP polymers from ROMP Compositions (N1A), (N1B), (N4), (N5)

|  |  |  | Example | | | |
|---|---|---|---|---|---|---|
|  |  |  | 17 | 18 | 19 | 20 |
|  |  |  | ROMP Composition | ROMP Composition | ROMP Composition | ROMP Composition |
| Property | Method | Units | (N1A)$^a$ | (N1B)$^b$ | (N4)$^c$ | (N5)$^d$ |
| Glass transition temperature (Tg) | ASTM E1356 | ° C. | 54 | 55 | 51 | 54 |
| Tensile strength (2"/min) | ASTM D638 | MPa | 31 | 31 | 30 | 30 |
| Tensile modulus | ASTM D638 | MPa | 1419 | 1373 | 1347 | 1358 |
| Elongation @ yield | ASTM D638 | % | 6.8 | 6.6 | 6.6 | 6.5 |
| Elongation @ break | ASTM D638 | % | 133 | 119 | 154 | 151 |
| Compressive modulus (0.5"/min) | ASTM D695 | MPa | 977 | 984 | 966 | 972 |
| Compressive strength (5% strain) | ASTM D695 | MPa | 31 | 31 | 29 | 30 |
| Compressive strength (10% strain) | ASTM D695 | MPa | 25 | 25 | 24 | 24 |
| Thermal conductivity | ASTM C518 | W/m*K | Not Measured | Not Measured | Not Measured | Not Measured |

$^a$ = Catalyst Composition (J);
$^b$ = Catalyst Composition (L);
$^c$ = Catalyst Composition (I);
$^d$ = Catalyst Composition (K)

Examples 21-22

Resin Compositions (N2), (N3) were separately degassed under vacuum for 20 minutes at ambient temperature (20-25° C.). Degassed Resin Compositions (N2), (N3) were each separately catalyzed at ambient temperature under vacuum by the addition of a catalyst composition (2 phr) as indicated in Table 8 to form ROMP Compositions (N2), (N3). Each ROMP Composition (N2), (N3) was poured into a separate set of two aluminum molds preheated to 35° C. in a laboratory oven, the first mold being rectangular and having dimensions (1.5"×1.5"×11") and the second mold being cylindrical and having dimensions (0.79"×14"). After the molds were filled, the ROMP compositions (N2), (N3) were heated from 35° C. to 140° C. at a heating rate of 3.5° C./min, and then held at 140° C. for 2 hours, and then allowed to cool to ambient temperature and demolded. The mechanical and thermal properties of the demolded ROMP polymer articles corresponding to ROMP Compositions (N2), (N3) were measured according to the methods designated in Table 8.

TABLE 8

Measured properties of the ROMP polymers from ROMP Compositions (N2), (N3)

| Property | Method | Units | Example 21 ROMP Composition (N2)[a] | Example 22 ROMP Composition (N3)[b] |
|---|---|---|---|---|
| Glass transition temperature (Tg) | ASTM E1356 | °C. | 51 | 51 |
| Tensile strength (2"/min) | ASTM D638 | MPa | 31 | 30 |
| Tensile modulus | ASTM D638 | MPa | 1396 | 1353 |
| Elongation @ yield | ASTM D638 | % | 6.7 | 6.6 |
| Elongation @ break | ASTM D638 | % | 128 | 167 |
| Compressive modulus (0.5"/min) | ASTM D695 | MPa | 970 | 956 |
| Compressive strength (5% strain) | ASTM D695 | MPa | 30 | 29 |
| Compressive strength (10% strain) | ASTM D695 | MPa | 25 | 23 |
| Thermal conductivity | ASTM C518 | W/m * K | Not Measured | Not Measured |

[a] = Catalyst Composition (H);
[b] = Catalyst Composition (E)

Examples 23-25

Resin Compositions (N1), (N2), (N3) were separately degassed under vacuum for 20 minutes at ambient temperature (20-25° C.). Degassed Resin Compositions (N1), (N2), (N3) were each separately catalyzed at ambient temperature under vacuum by the addition of a catalyst composition (2 phr) as indicated in Table 9 to form ROMP Compositions (N1C), (N2), (N3). Each ROMP Composition (N1C), (N2), (N3) was poured into a separate set of two aluminum molds preheated to 35° C. in a laboratory oven, the first mold being rectangular and having dimensions (1.5"×1.5"×11") and the second mold being cylindrical and having dimensions (0.79"×14"). After the molds were filled, the temperature of the oven was held at 35° C. and the ROMP compositions (N1C), (N2), (N3) were allowed to polymerize (exotherm) and then allowed to cool to ambient temperature and demolded. The mechanical and thermal properties of the demolded ROMP polymer articles corresponding to ROMP Compositions (N1C), (N2), (N3) were measured according to the methods designated in Table 9.

TABLE 9

Measured properties of the ROMP polymers from ROMP Compositions (N1C), (N2), (N3)

| Property | Method | Units | Example 23 ROMP Composition (N1C)[a] | Example 24 ROMP Composition (N2)[b] | Example 25 ROMP Composition (N3)[c] |
|---|---|---|---|---|---|
| Glass transition temperature (Tg) | ASTM E1356 | °C. | 54 | 54 | 50 |
| Tensile strength (2"/min) | ASTM D638 | MPa | 31 | 31 | 29 |
| Tensile modulus | ASTM D638 | MPa | 1342 | 1366 | 1299 |
| Elongation @ yield | ASTM D638 | % | 6.8 | 6.6 | 6.6 |
| Elongation @ break | ASTM D638 | % | 142 | 148 | 172 |
| Compressive modulus (0.5"/min) | ASTM D695 | MPa | 998 | 979 | 964 |
| Compressive strength (5% strain) | ASTM D695 | MPa | 32 | 31 | 30 |
| Compressive strength (10% strain) | ASTM D695 | MPa | 25 | 25 | 23 |
| Thermal conductivity | ASTM C518 | W/m * K | Not Measured | Not Measured | Not Measured |

[a] = Catalyst Composition (A);
[b] = Catalyst Composition (H);
[c] = Catalyst Composition (E)

Example 26

Resin Composition (O) was degassed under vacuum for 20 minutes at ambient temperature (20-25° C.). Degassed Resin Composition (O) was catalyzed at ambient temperature under vacuum by the addition of catalyst composition (A) (2 phr) to form ROMP Composition (O). ROMP Composition (O) was poured into a set of two aluminum molds preheated to 35° C. in a laboratory oven, the first mold being rectangular and having dimensions (1.5"×1.5"×11") and the second mold being cylindrical and having dimensions (0.79"×14"). After the molds were filled, the temperature of the oven was held at 35° C. and ROMP Composition (O) was allowed to polymerize (exotherm) and then allowed to cool to ambient temperature and demolded. The mechanical and thermal properties of the demolded ROMP polymer composite articles (e.g., syntactic foam) corresponding to ROMP Composition (O) were measured according to the methods designated in Table 10.

TABLE 10

Measured properties of the ROMP polymer composites (e.g. syntactic foam) from ROMP Composition (O).

| Property | Method | Units | Example 26 ROMP Composition (O) |
|---|---|---|---|
| Glass transition temperature (Tg) | ASTM E1356 | ° C. | Not Measured |
| Tensile strength (2"/min) | ASTM D638 | MPa | 10.3 |
| Tensile modulus | ASTM D638 | MPa | 1658 |
| Elongation @ yield | ASTM D638 | % | 0.21 |
| Elongation @ break | ASTM D638 | % | 1.5 |
| Compressive modulus (0.5"/min) | ASTM D695 | MPa | 1099 |
| Compressive strength (5% strain) | ASTM D695 | MPa | 19 |
| Compressive strength (10% strain) | ASTM D695 | MPa | NA |
| Thermal conductivity | ASTM C518 | W/m * K | Not Measured |

Example 27

A common test in pipeline insulation testing is a simulated service test (SST) designed to determine the thermal insulating capacity and structural integrity of the polymeric material coating the pipe after exposure to anticipated service conditions (high temperature/high pressure) after a predetermined time period. Two steel pipe samples (A and B) coated with thermal insulation of the invention were prepared for this activity. Insulated Pipe Sample (A) was prepared in a manner that allowed it to be exposed to high temperature high pressure (HTHP) conditions (i.e., aged) of the simulated service test and Insulated Pipe Sample (B) was prepared as a control sample (i.e., un-aged) that was not exposed to the HTHP conditions of the simulated service test.

Pipe Sample (A):

A 6.625" OD, 5.125" ID, 8 ft length steel pipe, equipped with a pressure rated flange fitting at one end and closed off by a steel cap at the other end (Pipe Sample A), was stripped of a prior fusion bonded epoxy (FBE) coating and rust by blasting with garnet (silicates) before texturing to NACE "white" specification with G25 steel grit to a blast profile of 4.5 mils. The blast profile was checked with replica tape before coating Pipe Sample (A) with thermal insulation material of the invention. Particulates were removed from Pipe Sample (A) after blasting by blowing on the pipe with >50 psi compressed air. Pipe Sample (A) and a mold were pre-heated to 60° C. and 40° C., respectively, in insulated and temperature regulated heating boxes. Insulated pipe sample (A): 91.80 kg of resin composition (D) was added to a 30 gallon stainless steel pressure vessel with a bottom drain for dispensing the resin composition. Resin composition (D) was heated to 40° C. in the stainless steel pressure vessel and degassed for 2 hours under vacuum. Before dispensing resin composition (D), the stainless steel pressure vessel was backfilled with nitrogen gas. Resin composition (D) was dispensed and mixed with Catalyst composition (A) using GS Manufacturing metering equipment attached to a static mixer. Resin composition (D) was mixed with catalyst composition (A) at a ratio of 50:1 (resin to catalyst) as the resin stream entered the mix head of the mixed metering equipment. The catalyzed resin composition (ROMP composition) flowed into the heated mold surrounding pipe sample (A) under air atmosphere. The thickness of cured ROMP polymer (thermal insulation material) applied to the pipe sample (A) was 2". It was undesirable for part quality to monitor the temperatures of the pipe surface, mold surface, and ROMP composition inside the mold cavity using thermocouples. However, it was anticipated that peak temperature and time to exotherm values were similar to those observed and recorded for Pipe Sample (B) below.

Figure 3:
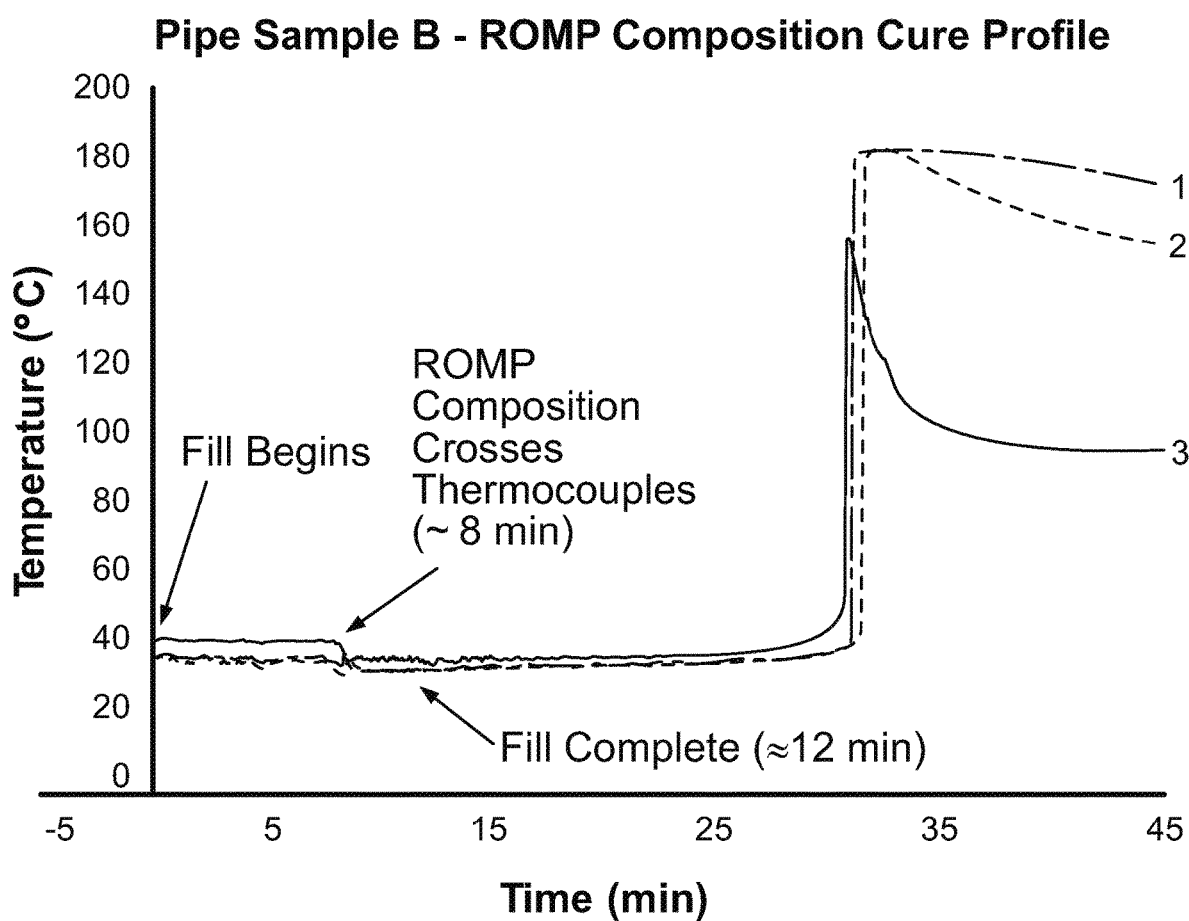
FIG. 3 is a graph of a cure profile of a ROMP composition (thermal insulation composition) applied to Pipe Sample (B). The peak temperatures at the three thermocouple positions: thermocouple (1)—positioned in the middle of the ROMP composition (1" from the mold and the pipe), thermocouple (2)—positioned at the ROMP composition/mold interface, and thermocouple (3)—positioned at the ROMP composition/pipe interface, were 183° C., 182° C., and 158° C., respectively.

Pipe Sample (B):

Another steel pipe (Pipe Sample B) having the same dimensions as Pipe Sample (A) was prepared in the same manner as Pipe Sample (A). The blast profile was checked with replica tape before coating Pipe Sample (B) with thermal insulation material of the invention. Particulates were removed from Pipe Sample (B) after blasting by blowing on the pipe with >50 psi compressed air. Pipe Sample (B) and a mold were pre-heated to 60° C. and 40° C., respectively, in insulated and temperature regulated heating boxes. Insulated pipe sample (B): 104.0 kg of resin composition (D) was added to a 30 gallon stainless steel pressure vessel with a bottom drain for dispensing the resin composition. Resin composition (D) was heated to 40° C. in the stainless steel pressure vessel and degassed for 2 hours under vacuum. Before dispensing resin composition (D), the stainless steel pressure vessel was backfilled with nitrogen gas. Resin composition (D) was dispensed and mixed with Catalyst composition (A) using GS Manufacturing metering equipment attached to a static mixer. Resin composition (D) was mixed with catalyst composition (A) at a ratio of 50:1 (resin to catalyst) as the resin stream entered the mix head of the mixed metering equipment. The catalyzed resin composition (ROMP composition) flowed into the heated mold surrounding the pipe sample (B) under air atmosphere. The thickness of cured ROMP polymer (thermal insulation material) applied to the pipe sample (B) was 2". During the application of the ROMP composition to Pipe Sample (B), temperature readings were collected every 3 seconds by K-type thermocouples positioned in the part at 28" from the outlet port. One thermocouple (3) was positioned at the ROMP composition/pipe interface, one thermocouple (1) was positioned in the middle of the ROMP composition (1" from the mold and the pipe) and one thermocouple (2) was positioned at the ROMP composition/mold interface. The peak temperatures measured at the three thermocouple positions during curing of the ROMP composition: thermocouple (1), thermocouple (2), and thermocouple (3) were 183° C., 182° C., and 158° C., respectively. The ROMP composition cure profile of Pipe Sample (B) at the three different thermocouple positions was recorded as shown in FIG. 3. In addition, the temperature of the pipe, the temperature of the mold, and the temperature of the ROMP composition immediately prior to applying the ROMP composition to Pipe Sample (B) were also recorded and were found to be 47° C., 33° C., and 34° C., respectively. The time required to fill the mold was 12 minutes. The ROMP composition had a cure time (time to exotherm following catalyzation) of 31 minutes.

Simulated Service Test (HTHP Conditions):

Insulated pipe sample (A) was attached to a heat source via the flange fitting and submersed in a large chamber filled with simulated sea water. The chamber was pressurized hydrostatically with a hydrostatic pump to 4500 psia. Simulated sea water in the chamber was cooled to 39° F. (4° C.). The pipe was heated such that the hottest measured pipe/polymer interface temperature was equal to 400° F. (204° C.). These conditions were maintained for 28 days at which point the heat source was removed and the sample allowed to cool to 39° F. (4° C.). The cool down profile was recorded using thermocouples at 8 separate locations. The hottest thermocouple cooled from 400° F. to 100° F. in about 10 hours. The insulated pipe sample (A) was removed from the chamber at 39° F. (4° C.). Adhesion of the insulation material (ROMP polymer) to Insulated Pipe Sample (A) after the simulated service test was excellent by visual inspection.

Samples of the ROMP polymer (thermal insulation) were obtained from insulated Pipe Sample A (aged) and insulated Pipe Sample B (unaged) at three different locations designated as follows: Inner (I)=ROMP polymer/pipe interface; Outer (0): Exterior surface of ROMP polymer; and Center (C): ROMP polymer with inner surface and exterior surface removed. The following properties of the ROMP polymer samples were tested: tensile (elongation at yield, elongation at break, maximum tensile strength), compression (maximum compression strength), hardness (Shore D) and density. Test results for aged samples (Insulated Pipe Sample A) and unaged samples (Insulated Pipe Sample B) are presented below in Tables 11-14.

TABLE 11

Hardness determination with Shore D Indenter (ASTM D2240) for ROMP polymer (thermal insulation) samples obtained from insulated Pipe Sample (A) and insulated Pipe Sample (B).

| Condition | Outer (O) | Center (C) | Inner (I) |
|---|---|---|---|
| Unaged (Insulated Pipe Sample B) | 72 | 73 | 72 |
| Aged (Insulated Pipe Sample A) | 72 | 72 | 71 |

TABLE 12

Density measurements (g/cm³) for ROMP polymer (thermal insulation) samples obtained from insulated Pipe Sample (A) and insulated Pipe Sample (B).

| Condition | Outer (O) | Inner (I) |
|---|---|---|
| Unaged (Insulated Pipe Sample B) | 0.99 | 0.99 |
| Aged (Insulated Pipe Sample A) | 0.99 | 0.99 |

TABLE 13

Tensile property data for ROMP polymer (thermal insulation) samples obtained from insulated Pipe Sample (A) and insulated Pipe Sample (B). ASTM D638 Type I samples. 2"/min strain rate.

| Condition | Location | % elongation at yield | % elongation at break | Max tensile strength (psi) |
|---|---|---|---|---|
| Unaged | Outer (O) | 4.83 | 119 | 4911 |
| Insulated | Center (C) | 4.79 | 102 | 4907 |
| Pipe Sample B | Inner (I) | 4.54 | 117 | 4830 |
| Aged | Outer (O) | 4.75 | 138 | 5051 |
| Insulated | Center (C) | 4.25 | 111 | 4771 |
| Pipe Sample A | Inner (I) | 4.89 | 141 | 4852 |

TABLE 14

Compression properties. ASTM D695. 0.5"/min strain rate. for ROMP polymer (thermal insulation) samples obtained from insulated Pipe Sample (A) and insulated Pipe Sample (B).

| Condition | Location | % compression at yield | Max compression strength (psi) |
|---|---|---|---|
| Unaged | Outer (O) | 4.50 | 5780 |
| Insulated Pipe Sample B | Inner (I) | 4.45 | 5678 |
| Aged | Outer (O) | 4.38 | 5481 |
| Insulated Pipe Sample A | Inner (I) | 4.47 | 5435 |

Example 28

Hot/wet aging. An extreme service condition of thermal insulation on a subsea pipeline is taken to be direct contact of hot insulation material with salt water at full hydrostatic pressure. Thus, tensile and compression samples of a ROMP polymer (thermal insulation) of the invention were subjected to hydrostatic hot/wet aging.

Resin composition (A) was degassed under vacuum for 20 minutes at ambient temperature (20-25° C.). Degassed resin composition (A) was catalyzed at ambient temperature under vacuum by the addition of catalyst composition (A) (2 phr) to form a ROMP composition. The ROMP composition was poured into an aluminum mold having dimension s (24"×24"×⅛") preheated to 35° C. in a laboratory oven. After the mold was filled, the ROMP composition was held at 35° C. for 15 minutes and then heated from 35° C. to 140° C. at a heating rate of 3.5° C./min, and then held at 140° C. for 2 hours, and then allowed to cool to ambient temperature, where the resulting ROMP polymer panel was demolded.

ASTM D638 Type I tensile test samples and cylindrical 0.79" diameter×1.58" long ASTM D695 compression test samples obtained from the molded ROMP polymer panel were aged in simulated seawater for 6 months at 400° F./204° C. in a test chamber. Weight change, hardness, $T_g$, tensile and compression properties of the ROMP polymer test samples were monitored by occasionally opening the test chamber to remove ROMP polymer test samples then resealing the test chamber. Dissolved oxygen content in the simulated sea water was monitored by sampling the simulated sea water in the test chamber prior to and after completion of each aging duration (prior to an after a test sample was removed) and was observed to be between 2-6 ppm, which was consistent with anticipated subsea conditions. Test results for the hot/wet aging of the ROMP polymer of Example 28 are presented below in Tables 15-18.

TABLE 15

Compression data for hydrostatic aging (ASTM D695, 0.5"/min strain rate) of the ROMP polymer from Example 28.

| Aging duration (days) | Compressive strength at 5% strain (MPa) | Compressive strength at 10% strain (MPa) | Compressive modulus (MPa) | Compressive Peak Stress (MPa) |
|---|---|---|---|---|
| 0 | 32.6 | 25.3 | 1112 | 34.5 |
| 15 | 33.8 | 27.2 | 1087 | 34.3 |
| 30 | 34.2 | 27.9 | 1094 | 34.7 |
| 60 | 38.4 | 31.8 | 1178 | 38.7 |
| 120 | 38.0 | 34.0 | 1139 | 38.0 |
| 180 | 38.8 | 37.1 | 1154 | 39.1 |

TABLE 16

Tensile data for hydrostatic aging (ASTM D638 Type I samples, 2"/min strain rate) of the ROMP polymer from Example 28.

| Aging duration (days) | Elongation at break (%) | Elongation at yield (%) | Tensile strength (MPa) | Tensile modulus (MPa) |
|---|---|---|---|---|
| 0 | 258.3 | 6.3 | 36.7 | 1313 |
| 30 | 36.9 | 6.6 | 32.1 | 1185 |
| 60 | 9.8 | 6.7 | 34.2 | 1420 |
| 120 | 12.9 | 7.2 | 34.7 | 1298 |
| 180 | 16.9 | 7.7 | 35.9 | 1394 |

TABLE 17

$T_g$ data for hydrostatic aging (by DSC, ASTM E1356) of the ROMP polymer from Example 28.

| Aging duration (days) | Glass transition temperature ($T_g$, ° C.) |
|---|---|
| 0 | 50.04 |
| 15 | 52.37 |
| 30 | 54.96 |
| 60 | 56.72 |
| 120 | 66.18 |
| 180 | 77.35 |

TABLE 18

Weight change and hardness (ASTM D2240) data for hydrostatic aging of the ROMP polymer from Example 28.

| Aging duration (days) | Wt. Change (%) | Hardness Change (Shore D) EXP-1464 |
|---|---|---|
| 15 | 0.50 | 1.0 |
| 30 | 0.41 | 0.5 |
| 60 | 0.29 | 0.5 |
| 120 | 0.20 | 1.5 |
| 180 | 0.12 | 2.5 |

Example 29

Impact Strength Testing: A key characteristic of subsea pipeline insulation (thermal insulation) is its resistance to removal (delamination) from the pipe or catastrophic failure due to a high intensity impact that can be experienced during installation of the pipeline or during transportation and handling of insulated pipe segments prior to or during pipeline assembly and/or installation.

An approximately 3-foot long section of insulated Pipe Sample (B) (unaged) as described above herein, was secured to a fixture and impacted with a free swinging mass at an energy of 22 kJ. The impacted sample survived with minimal surface damage; most notably, an approximately ½"×6" area was indented on the outside diameter of the pipe insulation approximately ¼" deep. There was no tearing or catastrophic failure of the insulation material and the insulated pipe sample (B) was considered to be suitable for installation following the impact test.

Examples 30-32

Resin Compositions (P), (Q), (R), (T), (U), and (V) were separately degassed under vacuum for 20 minutes at ambient temperature (20-25° C.). Resin Composition (S) was degassed under vacuum for 20 minutes at 40° C. Degassed Resin Compositions (P), (R), (T), (U), and (V) were each separately catalyzed at ambient temperature by the addition of Catalyst Composition (M) (2 phr) to form ROMP Compositions (P1), (R1), (T1), (U1), and (V1). Degassed Resin Composition (Q) was catalyzed at ambient temperature by the addition of Catalyst Composition (N) (2 phr) to form ROMP Composition (Q1). Degassed Resin Composition (S) was catalyzed at 40° C. by the addition of Catalyst Composition (M) (2 phr) to form ROMP Composition (S1). ROMP Compositions (P1), (Q1), (R1), (T1), (U1), and (V1) were separately degassed for 1 minute under vacuum at ambient temperature. ROMP Composition (S1) was degassed for 1 minute under vacuum at 40° C.

Each degassed ROMP Composition (P1), (Q1), (R1), (S1), (T1), (U1), and (V1) was poured into a separate set of two aluminum molds preheated to 35° C. in a laboratory oven, the first mold being rectangular and having dimensions (1.5"×1.5"×11") and the second mold being cylindrical and having dimensions (0.79"×14"). After the molds were filled, the ROMP compositions (P1), (Q1), (R1), (S1), (T1), (U1), and (V1) were held at 35° C. for 30 minutes and then heated from 35° C. to 140° C. at a heating rate of 3.5° C./min, and then held at 140° C. for 2 hours, and then allowed to cool to ambient temperature and demolded.

The mechanical and thermal properties of the demolded ROMP polymer articles corresponding to ROMP Compositions (P1), (Q1), (R1), (S1), (T1), (U1), and (V1) were measured according to the methods designated in Tables 19 and 20. In Table 19, ROMP Compositions (P1), (Q1), and (R1) and the ROMP polymers prepared therefrom are provided as examples of the present invention and are labeled as Examples (30), (31), and (32), respectively. In Table 20, ROMP Compositions (S1), (T1), (U1), and (V1) and the ROMP polymers prepared therefrom are provided as Comparative Examples (1CE), (2CE), (3CE), and (4CE), respectively.

TABLE 19

Measured properties of the ROMP polymers from ROMP Compositions (P1), (Q1), and (R1).

| | | | Example | | |
|---|---|---|---|---|---|
| | | | 30 ROMP Composition (P1)[a] | 31 ROMP Composition (Q1)[b] | 32 ROMP Composition (R1)[a] |
| Property | Method | Units | | | |
| Glass Transition temperature (Tg) | ASTM E1356 | ° C. | 54.8 | 53.1 | 35.3 |
| Tensile strength (2"/min) | ASTM D638 | MPa | 32.2 | 31.9 | 26.2 |

TABLE 19-continued

Measured properties of the ROMP polymers from ROMP Compositions (P1), (Q1), and (R1).

| | | | Example | | |
|---|---|---|---|---|---|
| Property | Method | Units | 30 ROMP Composition (P1)[a] | 31 ROMP Composition (Q1)[b] | 32 ROMP Composition (R1)[a] |
| Tensile modulus | ASTM D638 | MPa | 1,393 | 1,349 | 1,753 |
| Elongation @ yield | ASTM D638 | % | 6.6 | 6.9 | 7.6 |
| Elongation @ break | ASTM D638 | % | 161.2 | 171.7 | 298.6 |
| Compressive modulus (0.5"/min) | ASTM D695 | MPa | 1,064 | 1,003 | 436 |
| Compressive strength (5% strain) | ASTM D695 | MPa | 34 | 32.5 | 12.2 |
| (Compressive strength 10% strain) | ASTM D695 | MPa | 27 | 25.2 | 11.4 |
| Hardness | ASTM D2240 | Shore D | 75 | 70 | 65 |

[a] = Catalyst Composition (M);
[b] = Catalyst Composition (N)

TABLE 20

Measured properties of the ROMP polymers from ROMP Compositions (S1), (T1), (U1), and (V1).

| | | | Comparative Example | | | |
|---|---|---|---|---|---|---|
| Property | Method | Units | 1CE ROMP Composition (S1)[a] | 2CE ROMP Composition (T1)[a] | 3CE ROMP Composition (U1)[a] | 4CE ROMP Composition (V1)[a] |
| Glass Transition temperature (Tg) | ASTM E1356 | °C. | 134.6 | 148.3 | 149.8 | 171.6 |
| Tensile strength (2"/min) | ASTM D638 | MPa | 61.8 | 64.6 | 65.4 | 71.1 |
| Tensile modulus | ASTM D638 | MPa | 2,058 | 2,106 | 2,200 | 2,255 |
| Elongation @ yield | ASTM D638 | % | 9.3 | 9.6 | 9.3 | 10.1 |
| Elongation @ break | ASTM D638 | % | 10.2 | 14.0 | 10.3 | 12.2 |
| Compressive modulus (0.5"/min) | ASTM D695 | MPa | 1,649 | 1,627 | 1,736 | 1,768 |
| Compressive strength (5% strain) | ASTM D695 | MPa | 72.9 | 69.7 | 73 | 77.3 |
| (Compressive strength 10% strain) | ASTM D695 | MPa | 68.9 | 66.5 | 72.6 | 76.9 |
| Hardness | ASTM D2240 | Shore D | 80 | 79 | 84 | 82 |

[a] = Catalyst Composition (M)

Thermal Cycling Tests

Examples 33-35

Heater Core Assembly

A heater core assembly described as follows was used in the thermal cycling tests. An ASTM 4130 low carbon steel cylindrical core (1.5 inch diameter×4.125 inch length) was prepared. The center of the cylindrical core possessed a cylindrical cavity extending from an opening in the top/center section of the cylindrical core to approximately 1 inch from the bottom/center section of the cylindrical core. Two opposing thermocouple wells (0.125 inch diameter) originating from the opening in the top/center section of the cylindrical core were drilled into the sides of the cylindrical core. A type-K thermocouple was inserted into each of the two opposing thermocouple wells drilled into the sides of the cylindrical core for measuring the temperature of the outer section of the cylindrical core.

A cartridge heater (Marathon; Model HR25030KZ; 0.25 inch diameter×3 inch length) was inserted into the cylindrical cavity of the cylindrical core. A type-K thermal couple and electrical wiring for a power plug connection were attached to the cartridge heater. The two type-K thermocouples for measuring the temperature of the outer section of the cylindrical core, and the type-K thermal couple and electrical wiring for a power plug connection attached to the cartridge heater were inserted through the inner diameter of a section of 316 stainless steel pipe (0.5 inch diameter×5.5 inch length), and the 316 stainless steel pipe was threaded onto the cylindrical core. The exterior surface of the cylindrical core and the surface of the 316 stainless steel pipe extending 3" from the top of the cylindrical core were blasted with GH25 steel grit immediately prior to use.

Mold Assembly

A mold assembly described as follows was used in the thermal cycling tests. An aluminum plate (12 inch length×12 inch width×0.5 inch thick) having a center hole (0.625 inch diameter) was prepared. The top surface of the aluminum plate contained a 0.125 inch O-ring groove (8 inch diameter) affixed with a 0.125 inch Viton® O-ring (8 inch diameter) positioned concentrically around the center hole of the aluminum plate. A corner hole (0.25 inch diameter) was cut into the aluminum plate near each of the four corners of the aluminum plate and a threaded rod (14 inch length) was threaded into each of the four corner holes.

An aluminum positioning block (4 inch length×2 inch wide×2 inch thick) having a center hole (0.5 inch diameter) cut through the center of the positioning block was prepared. The positioning block also had a threaded set screw inserted through the side of the positioning block that opened into the center hole. The positioning block was placed on a leveling table, which contained a center hole cutout. The positioning block was placed on the leveling table so that the center hole of the positioning block aligned with the center hole cutout in the leveling table. The aluminum plate was placed on the positioning block so that the center hole of the aluminum plate aligned with the center hole of the positioning block. Solid aluminum spacer blocks (4 inch length×2 inch wide×2 inch thick) were positioned between the bottom surface of the aluminum plate and the top surface of the leveling table.

The stainless steel pipe, thermocouples, and electrical wiring for the power plug connection of the heater core assembly were fed through the center hole on the top surface of the aluminum plate, the center hole of the positioning block, and the center hole cutout in the leveling table. Using the positioning block, the top surface of the cylindrical core of the heater core assembly was positioned 3 inches above the top surface of the aluminum plate and held in place by the set screw in the positioning block.

A cylindrical acrylic mold (7.5 inch inner diameter×¼ thick wall×12 inch length) was placed on the top surface of the aluminum plate and aligned with the O-ring groove/O-ring on the top surface of the aluminum plate. An acrylic plate (12 inch length×12 inch width×0.375 inch thickness) having a 1.5 inch center hole cut through the plate and a corner hole (0.25 inch diameter) near each of the four corners of the acrylic plate was placed on top of the cylindrical acrylic mold and connected to the threaded rods previously connected to the aluminum plate. The mold assembly was secured to the leveling table by C-clamps and the mold assembly was leveled.

Test Specimen Preparation

Test specimens described as follows were molded and used in the thermal cycling tests. The electrical wiring for the power plug connection of the cartridge heater of the heater core assembly was connected to a power plug and the power plug was connected to a variable transformer (Staco Energy Products; Model 3PN501B). The K-type thermocouples for measuring the temperature of the outer section of the cylindrical core of the heater core assembly were attached to a Multi-Channel Temperature Recorder/Data Logger (General; Model DT4208SD). The variable transformer was adjusted so as to maintain a temperature of 50+/−2° C. as read from the K-type thermocouples attached to the recorder/data logger.

Resin Compositions (P), (Q), (R), (T), (U), and (V) (8.5 kg per resin composition) were separately degassed under vacuum with stirring for at least two hours at ambient temperature (20-25° C.). Resin Composition (S) (8.5 kg) was degassed under vacuum with stirring for at least two hours at (40° C.). Degassed Resin Compositions (P), (R), (T), (U), and (V) were each separately catalyzed at ambient temperature by the addition of Catalyst Composition (M) (2 phr) to form ROMP Compositions (P2), (R2), (T2), (U2), and (V2). Degassed Resin Composition (Q) was catalyzed at ambient temperature by the addition of Catalyst Composition (N) (2 phr) to form ROMP Composition (Q2). Degassed Resin Composition (S) was catalyzed at 40° C. by the addition of Catalyst Composition (M) (2 phr) to form ROMP Composition (S2).

Each ROMP composition (P2), (Q2), (R2), (S2), (T2), (U2), and (V2) was poured in to a separate acrylic mold/mold assembly as described above herein until the level of the ROMP composition reached a height of approximately 10.5 inches from the surface of the aluminum plate; thereby completely encapsulating the cylindrical core and a section of the stainless steel pipe threaded to the cylindrical core. After pouring, the variable transformer was adjusted to 50% of the maximum output voltage. Any bubbles that formed during the pouring/casting of the ROMP composition were manually removed immediately after pouring.

After the acrylic mold/mold assembly was filled, the ROMP compositions (P2), (Q2), (R2), (S2), (T2), (U2), and (V2) were allowed to exotherm/cure to form ROMP polymer articles for use as test specimens in the thermal cycling tests. During the molding of the ROMP polymer thermal cycling test specimens, it was observed that initiation of the ROMP reaction originated from the cylindrical core for each of the ROMP compositions (P2), (Q2), (R2), (S2), (T2), (U2), and (V2). The variable transformer was turned off once initiation of the ROMP reaction was observed. The ROMP polymer thermal cycling test specimens corresponding to ROMP Compositions (P2), (Q2), (R2), (S2), (T2), (U2), and (V2) were allowed to cool to ambient temperature (20-25° C.) and demolded.

Thermal Cycling Tests

The test specimens described above were used in the following thermal cycling tests. The ROMP polymer thermal cycling test specimens were connected to a temperature controller (Glas-Col; Model 104APLSM124) through the power plug connection and the K-type thermocouple connected to the cartridge heater of the heater core assembly. The K-type thermocouples for measuring the temperature of the outer section of the cylindrical core were plugged into to a Multi-Channel Temperature Recorder/Data Logger (General; Model DT4208SD). The temperature controller was adjusted until the temperature recorder/data logger display showed the desired temperature according to the following heating/cooling (thermal cycling) test schedule: Thermal Cycle 1 (began at ambient temperature (20-25° C.), then heated to 220° C. and held at 220° C. for 8 hours, then cooled to ambient temperature (20-25° C.)); Thermal Cycle 2 (began at ambient temperature (20-25° C.), then heated to 220° C. and held at 220° C. for 8 hours, then cooled to ambient temperature (20-25° C.)); Thermal Cycle 3 (began at ambient temperature (20-25° C.), then heated to 240° C. and held at 240° C. for 8 hours, then cooled to ambient temperature (20-25° C.)); Thermal Cycle 4 (began at ambient temperature (20-25° C.), then heated to 270° C. and held at 270° C. for 8 hours, then cooled to ambient temperature (20-25° C.)); and Thermal Cycle 5 (began at ambient temperature (20-25° C.), heated to 270° C. and held at 270° C. for 48 hours, then cooled to ambient temperature (20-25° C.)).

The molded ROMP polymer thermal cycling test specimens were classified has having failed the thermal cycling test if at any time during the described heating/cooling cycles of the test schedule a visual defect (e.g., a crack) originating from the encapsulated cylindrical core (including any encapsulated section of stainless steel pipe attached to the cylindrical core) formed in the ROMP polymer test specimen, where the visual defect extended more than 1.5 inches from the exterior surface of the cylindrical core or stainless steel pipe attached to the cylindrical core.

The molded ROMP polymer thermal cycling test specimens were classified as having passed the thermal cycling test if (i) at no time during the described heating/cooling cycles of the test schedule did a visual defect (e.g., a crack) originating from the encapsulated cylindrical core (including any encapsulated section of stainless steel pipe attached to the cylindrical core) form in the ROMP polymer test specimen; or (ii) at any time during the described heating/cooling cycles of the test schedule a visual defect (e.g., a crack) originating from the encapsulated cylindrical core (including any encapsulated section of stainless steel pipe attached to the cylindrical core) formed in the ROMP polymer test specimen, where the visual defect extended less than or equal to 1.5 inches from the exterior surface of the cylindrical core or stainless steel pipe attached to the cylindrical core. The results of the thermal cycling tests are shown below in Table 21. In Table 21, ROMP Compositions (P2), (Q2), and (R2) and the ROMP polymer test specimens prepared therefrom are provided as examples of the present invention and are labeled as Examples (33), (34), and (35), respectively. In Table 21, ROMP Compositions (S2), (T2), (U2), and (V2) and the ROMP polymer test specimens prepared therefrom are provided as Comparative Examples (5CE), (6CE), (7CE), and (8CE), respectively.

TABLE 21

Thermal Cycling Test Results

|  | Example (33) ROMP Composition (P2)[a] | Example (34) ROMP Composition (Q2)[b] | Example (35) ROMP Composition (R2)[a] | Comparative Example (5CE) ROMP Composition (S2)[a] | Comparative Example (6CE) ROMP Composition (T2)[a] | Comparative Example (7CE) ROMP Composition (U2)[a] | Comparative Example (8CE) ROMP Composition (V2)[a] |
|---|---|---|---|---|---|---|---|
| Thermal Cycle 1 | PASSED | PASSED | PASSED | FAILED | PASSED | FAILED | FAILED |
| Thermal Cycle 2 | PASSED | PASSED | Not Tested | NA | PASSED | NA | NA |
| Thermal Cycle 3 | PASSED | PASSED | PASSED | NA | PASSED | NA | NA |
| Thermal Cycle 4 | PASSED | PASSED | PASSED | NA | PASSED | NA | NA |
| Thermal Cycle 5 | PASSED | PASSED | PASSED | NA | FAILED | NA | NA |

NA = Not Applicable;
[a] = Catalyst Composition (M);
[b] = Catalyst Composition (N).

From Table 21, it is learned that in thermal cycling tests the ROMP polymer test specimens prepared from resin compositions (ROMP compositions) of the present invention (Examples 33, 34, 35) performed better than ROMP polymer test specimens prepared from resin compositions (ROMP compositions) of the Comparative Examples 5CE, 6CE, 7CE, 8CE. The results in Table 21, further demonstrate that the ROMP polymer test specimens prepared from resin compositions (ROMP compositions) of the present invention (Examples 33, 34, 35) possess improved thermal stability over ROMP polymer test specimens prepared from resin compositions (ROMP compositions) of the Comparative Examples 5CE, 6CE, 7CE, 8CE.

It is to be understood that while the invention has been described in conjunction with specific embodiments thereof, that the description above as well as the examples that follow are intended to illustrate and not limit the scope of the invention. Other aspects, advantages, and modifications within the scope of the invention will be apparent to those skilled in the art to which the invention pertains.

The claimed invention is:

1. A method of coating at least a portion of at least one surface of an object with a thermal insulation material, comprising:
    combining a resin composition comprising a cyclic olefin composition with a catalyst composition comprising at least one metal carbene olefin metathesis catalyst, thereby forming a ROMP composition,
        wherein the cyclic olefin composition comprises 10.0 mol % to 80.0 mol % of at least one cyclic olefin containing multiunsaturation, and up to 90.0 mol % of at least one cyclic olefin containing monounsaturation,
        wherein the at least one cyclic olefin containing multiunsaturation may be substituted or unsubstituted;
        wherein the at least one cyclic olefin containing monounsaturation may be substituted or unsubstituted;
    contacting the ROMP composition with at least a portion of at least one surface of the object; and
    subjecting the ROMP composition to conditions effective to promote a ROMP reaction of the cyclic olefin composition in the presence of the at least one metal carbene olefin metathesis catalyst, wherein the thermal insulation material is a ROMP polymer or a ROMP polymer composite.

2. The method according to claim 1, wherein the object is a pipe, pipeline, pipe fitting, hose, hose fitting, tank, container, drum, manifold, riser, field joint, a subsea Christmas tree, jumper, spool piece, pipeline end termination, pipeline end manifold, robotic part, a robotic device, a robotic vehicle, wellhead equipment, a subsea dog house, or a combination thereof.

3. The method according to claim 1, wherein the at least one cyclic olefin containing multiunsaturation is selected from dicyclopentadiene, tricyclopentadiene, cyclopentadiene tetramer, cyclopentadiene pentamer, 5-vinyl-2-norbornene, 5-ethylidene-2-norbornene, 5-isopropenyl-2-norbornene, 5-propenyl-2-norbornene, and 5-butenyl-2-norbornene.

4. The method according to claim 1, wherein the at least one cyclic olefin containing monounsaturation is selected from 5-tolyl-2-norbornene, 5-phenyl-2-norbornene, 5-butyl-2-norbornene, 5-hexyl-2-norbornene, 5-octyl-2-norbornene, 5-decyl-2-norbornene, and 5-dodecyl-2-norbornene.

5. The method according to claim 1, wherein the at least one cyclic olefin containing multiunsaturation is selected from dicyclopentadiene, tricyclopentadiene, cyclopentadiene tetramer, cyclopentadiene pentamer, 5-vinyl-2-norbornene, 5-ethylidene-2-norbornene, 5-isopropenyl-2-norbornene, 5-propenyl-2-norbornene, and 5-butenyl-2-norbornene; and
    wherein the at least one cyclic olefin containing monounsaturation is selected from 5-tolyl-2-norbornene, 5-phenyl-2-norbornene, 5-butyl-2-norbornene, 5-hexyl-2-norbornene, 5-octyl-2-norbornene, 5-decyl-2-norbornene, and 5-dodecyl-2-norbornene.

6. The method according to claim 1, wherein the at least one cyclic olefin containing multiunsaturation is selected from dicyclopentadiene, tricyclopentadiene and cyclopentadiene tetramer; and wherein the at least one cyclic olefin containing monounsaturation is selected from 5-tolyl-2-norbornene, 5-phenyl-2-norbornene, and 5-octyl-2-norbornene.

7. The method according to claim 1, wherein the at least one at least one metal carbene olefin metathesis catalyst is a Group 8 transition metal complex having the structure of formula (I):

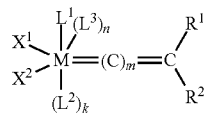

(I)

in which:
M is a Group 8 transition metal;
$L^1$, $L^2$, and $L^3$ are neutral electron donor ligands;
n is 0 or 1, such that $L^3$ may or may not be present;
m is 0, 1, or 2;
k is 0 or 1;
$X^1$ and $X^2$ are anionic ligands; and
$R^1$ and $R^2$ are independently selected from hydrogen, hydrocarbyl, substituted hydrocarbyl, heteroatom-containing hydrocarbyl,
wherein any two or more of $X^1$, $X^2$, $L^1$, $L^2$, $L^3$, $R^1$, and $R^2$ can be taken together to form one or more cyclic groups, and further wherein any one or more of $X^1$, $X^2$, $L^1$, $L^2$, $L^3$, $R^1$, and $R^2$ may be attached to a support.

8. The method according to claim 7, wherein the at least one at least one metal carbene olefin metathesis catalyst is a Group 8 transition metal complex having the structure of formula (I), wherein:
M is ruthenium
n is 0;
m is 0;
k is 1;
$L^1$ and $L^2$ are trisubstituted phosphines independently selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph); or
$L^1$ is an N-heterocyclic carbene selected from 1,3-bis(2,4,6-trimethylphenyl)-2-imidazolidinylidene, 1,3-bis(2,6-di-isopropylphenyl)-2-imidazolidinylidene, 1,3-bis(2,4,6-trimethylphenyl)-2-imidazol-2-ylidene, and 1,3-bis(2,6-di-isopropylphenyl)-2-imidazol-2-ylidene; and L2 is a trisubstituted phosphine selected from the group consisting of tri-n-butylphosphine (Pn-Bu$_3$), tricyclopentylphosphine (PCp$_3$), tricyclohexylphosphine (PCy$_3$), triisopropylphosphine (P-i-Pr$_3$), triphenylphosphine (PPh$_3$), methyldiphenylphosphine (PMePh$_2$), dimethylphenylphosphine (PMe$_2$Ph), and diethylphenylphosphine (PEt$_2$Ph);
$X^1$ and $X^2$ are chlorine; and
$R^1$ is hydrogen and $R^2$ is phenyl or —CH=C(CH$_3$)$_2$; or $R^1$ and $R^2$ are taken together to form an indenylidene moiety.

9. The method according to claim 1, wherein the at least one at least one metal carbene olefin metathesis catalyst is a Group 8 transition metal complex having the structure of formula (VII):

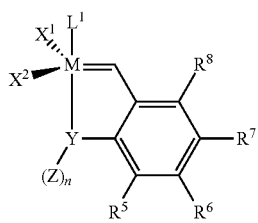

wherein,
M is a Group 8 transition metal;
$X^1$ and $X^2$ are anionic ligands;
$L^1$ is a neutral electron donor ligand;
Y is a heteroatom selected from N, O, S, and P;
$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, isocyanate, hydroxyl, ester, ether, amine, imine, amide, trifluoroamide, sulfide, disulfide, sultanate, carbamate, silane, siloxane, phosphine, phosphate, borate, or -A-Fn, wherein A is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the of arylalkylene can be substituted or unsubstituted, and wherein hetero atoms and/or functional groups may be present in either the aryl or the alkyl portions of the alkylene and
arylalkylene groups, and Fn is a functional group; and any combination of $R^5$, $R^6$, $R^7$, and $R^8$ can be linked to form one or more cyclic groups;
n is 1 or 2, such that n is 1 for the divalent heteroatoms O or S, and n is 2 for the trivalent heteroatoms N or P; and
Z is a group selected from hydrogen, alkyl, aryl, functionalized alkyl, functionalized aryl where the functional group may independently be one or more or the following: alkoxy, aryloxy, halogen, carboxylic acid, ketone, aldehyde, nitrate, isocyanate, hydroxyl, ester, ether, amine, imine, amide, trifluoroamide, sulfide, disulfide, carbamate, silane, siloxane, phosphine, phosphate, or borate; methyl, isopropyl, sec-butyl, t-butyl, neopentyl, benzyl, phenyl and trimethylsilyl; and
wherein any combination or combinations of $X^1$, $X^2$, $L^1$, V, Z, $R^5$, $R^6$, $R^7$, and $R^8$ may be linked to a support.

10. The method according to claim 1, wherein the cyclic olefin composition comprises 20.0 mol % to 80.0 mol % of the at least one cyclic olefin containing multiunsaturation, and up to 80.0 mol % of the at least one cyclic olefin containing monounsaturation.

11. The method according to claim 10, wherein the cyclic olefin composition comprises 30.0 mol % to 80.0 mol % of the at least one cyclic olefin containing multiunsaturation, and up to 70.0 mol % of the at least one cyclic olefin containing monounsaturation.

12. The method according to claim 11, wherein the cyclic olefin composition comprises 40.0 mol % to 80.0 mol % of the at least one cyclic olefin containing multiunsaturation, and up to 60.0 mol % of the at least one cyclic olefin containing monounsaturation.

13. The method according to claim 12, wherein the cyclic olefin composition comprises 40.0 mol % to 70.0 mol % of the at least one cyclic olefin containing multiunsaturation, and 30.0 mol % to 60.0 mol % of the at least one cyclic olefin containing monounsaturation.

14. The method according to claim 13, wherein the cyclic olefin composition comprises 40.0 mol % to 60.0 mol % of the at least one cyclic olefin containing multiunsaturation, and 40.0 mol % to 60.0 mol % of the at least one cyclic olefin containing monounsaturation.

15. The method according to claim 14, wherein the cyclic olefin composition comprises 50.0 mol % to 60.0 mol % of the at least one cyclic olefin containing multiunsaturation, and 40.0 mol % to 50.0 mol % of the at least one cyclic olefin containing monounsaturation.

16. The method according to claim 3, wherein the at least one cyclic olefin containing multiunsaturation is dicyclopentadiene, tricyclopentadiene, and optionally cyclopentadiene tetramer.

17. The method according to claim 4, wherein the at least one cyclic olefin containing monounsaturation is selected from 5-tolyl-2-norbornene, 5-hexyl-2-norbornene, 5-octyl-2-norbornene, and 5-decyl-2-norbornene.

18. The method according to claim 5, wherein the at least one cyclic olefin containing multiunsaturation is dicyclopentadiene, tricyclopentadiene, and optionally cyclopentadiene tetramer;
   wherein the at least one cyclic olefin containing monounsaturation is selected from 5-tolyl-2-norbornene, 5-hexyl-2-norbornene, 5-octyl-2-norbornene, and 5-decyl-2-norbornene.

19. The method according to claim 1, wherein the thermal insulation material has a thermal conductivity of less than 0.180 W/m·K.

20. The method according to claim 1, further comprising at least one additive.

* * * * *